United States Patent [19]

Yoshimura et al.

[11] Patent Number: 5,012,260

[45] Date of Patent: Apr. 30, 1991

[54] IMAGE FORMING APPARATUS FOR OSCILLATING THE RECORDING HEAD AND FIXING SAME WITH RESPECT TO A RECORDING MEDIUM

[75] Inventors: Shigeru Yoshimura, Yokohama; Tetsuo Suzuki, Kawasaki; Makoto Takemura, Tokyo, all of Japan

[73] Assignee: Canon Kabushiki Kaisha, Tokyo, Japan

[21] Appl. No.: 532,107

[22] Filed: Jun. 1, 1990

Related U.S. Application Data

[60] Continuation of Ser. No. 310,008, Feb. 9, 1989, abandoned, which is a continuation of Ser. No. 49,166, May 13, 1987, abandoned, which is a division of Ser. No. 844,132, Mar. 26, 1986, Pat. No. 4,692,778.

[30] Foreign Application Priority Data

Mar. 28, 1985 [JP] Japan .................................. 60-65103
Mar. 28, 1985 [JP] Japan .................................. 60-65106
Mar. 28, 1985 [JP] Japan .................................. 60-65108
Mar. 28, 1985 [JP] Japan .................................. 60-65112
Mar. 28, 1985 [JP] Japan .................................. 60-65114
Mar. 28, 1985 [JP] Japan .................................. 60-65116
Mar. 28, 1985 [JP] Japan .................................. 60-65117
Mar. 28, 1985 [JP] Japan .................................. 60-65118
Mar. 28, 1985 [JP] Japan .................................. 60-65119
Mar. 28, 1985 [JP] Japan .................................. 60-65120
Mar. 28, 1985 [JP] Japan .................................. 60-65121

[51] Int. Cl.⁵ .......................... B41J 2/01; G01D 15/24

[52] U.S. Cl. .................................................. 346/139 R

[58] Field of Search .................... 346/139 R, 140, 145

[56] References Cited

U.S. PATENT DOCUMENTS 4,477,823 10/1984 Matsufuji ............................ 346/140
4,559,543 12/1985 Toganoh ............................. 346/140

*Primary Examiner*—Joseph W. Hartary
*Attorney, Agent, or Firm*—Fitzpatrick, Cella, Harper, Scinto

[57] ABSTRACT

Oscillating and fixing apparatus for oscillating and fixing the recording head in an image forming machine. A recording head records an image on a recording medium which is fed to the record location by a recording medium feeding device. The feeding device has a reference surface. Oscillating apparatus oscillates the recording head toward and away from the recording medium and causes the recording head to abut the reference surface following the forward movement. A fixing device prevents the oscillation effected by the oscillating apparatus and fixes the recording head with respect to the recording medium to protect the recording head from vibration and shock.

12 Claims, 43 Drawing Sheets

FIG. 5A
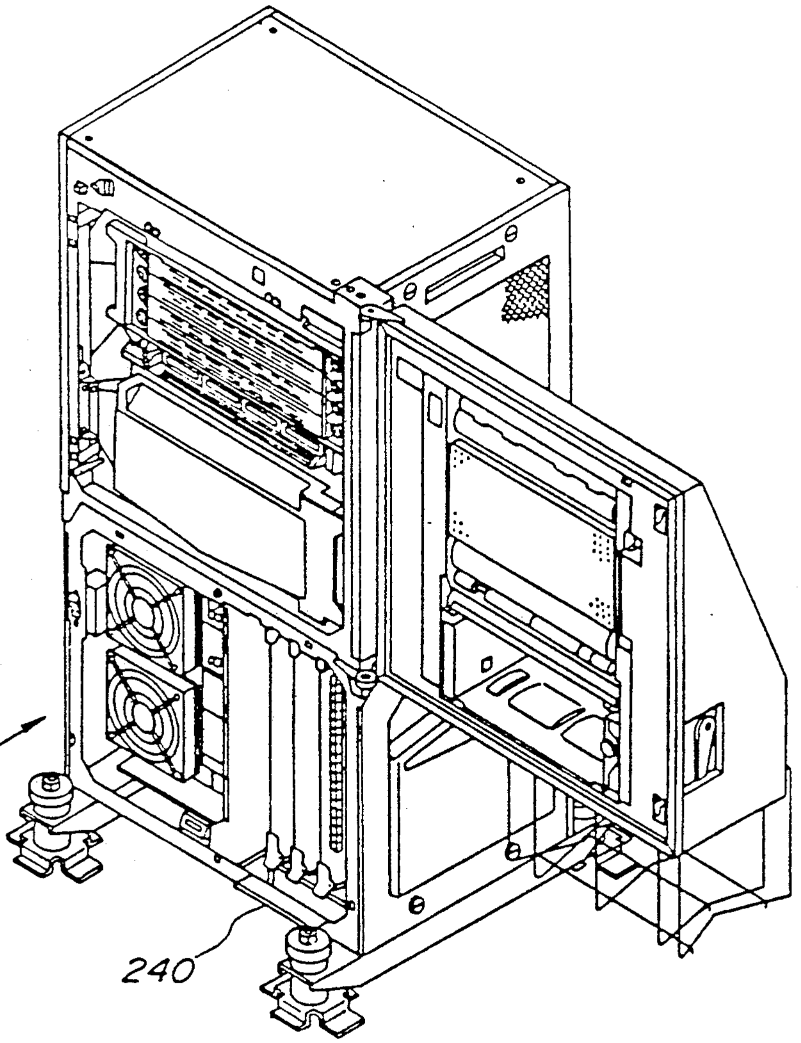
FIG. 5C
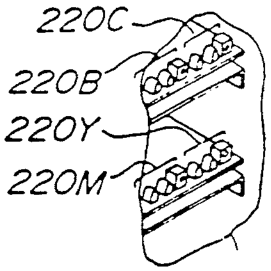
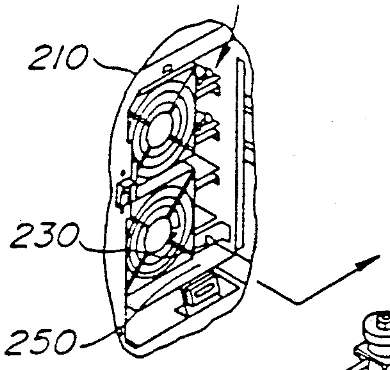
FIG. 5B

| TEST PATTERN NO. | POSITION OF SWITCH | OBJECT FOR USE |
|---|---|---|
| 0 |  | REGISTRATION ADJUSTMENT |
| 1 |  | CHECK OF COLOR TONE AND DOT SIZE |
| 2 |  | CHECK OF DISCHARGE - DISORDER (TO SPECIFY WHICH THE PORTION OF A HEAD IS UNDER DISORDER STATE) |
| 3 |  | CHECK OF NONUNIFORMITY IN PAPER FEEDING |

IMAGE FORMING APPARATUS FOR OSCILLATING THE RECORDING HEAD AND FIXING SAME WITH RESPECT TO A RECORDING MEDIUM

This application is a continuation of application Ser. No. 07/310,008 filed Feb. 9, 1989, now abandoned, which is a continuation of application Ser. No. 049,166 filed May 13, 1987, now abandoned, which in turn is a division of application Ser. No. 844,132, filed Mar. 26, 1986, now U.S. Pat. No. 4,692,778.

BACKGROUND OF THE INVENTION

1. Field of the Invention

The present invention relates to an image formation apparatus and, more particularly, to an image formation apparatus which has a convey system for a recording medium in a continuous paper form such as fan fold paper, a recording means for forming images along the entire width of the recording medium, and the like.

2. Related Background Art

Conventional image formation apparatuses of the type described above are disclosed in U.S. Pat. No. 4,651,173 whose assignee is the same as that of the present invention. The apparatus disclosed in that patent has a recording means (with a convey system and a liquid jet recording device which can be connected and disconnected with ease), and a recovery means for recovering ejection of the liquid jet recording device. When the convey system and the recording device are disconnected, replacement of the recording medium and maintenance of the respective parts is easy. When the convey system and the recording device are connected, the respective parts are appropriately arranged, and high-quality images can be formed.

SUMMARY OF THE INVENTION

It is an object of the present invention to provide an image formation apparatus in which operability is improved and drawbacks in the conventional apparatus are overcome.

It is another object of the present invention to provide an image formation apparatus comprising recording means for recording an image on a recording medium; biasing means for biasing said recording means to a reference surface associated with a recording surface of the recording medium during recording of the image; and coupling means, arranged in said recording means and in contact with the reference surface, for holding a positional relationship between said recording means and the reference surface.

It is another object of the present invention to provide an image formation apparatus comprising:

recording means; a platen for contacting and holding a rear surface of a recording medium; and means for elastically pressing at least three portions of said platen against said recording means positioned at a predetermined recording position, thereby positioning the platen with respect to the recording means, and for pivotally supporting the platen.

It is another object of the present invention to provide an image formation apparatus comprising:

convey means having convey rollers and a drive mechanism, said convey rollers being arranged on the upstream and downstream sides of a recording position for pressing and clamping a recording medium therebetween, and said drive mechanism driving said convey rollers so as to remove the recording medium from the recording position, said drive mechanism comprising:

means for setting different rotating speeds of said convey rollers at the upstream and downstream sides; and decelerating means for coupling with one of said convey rollers rotating at a higher speed during convey of the recording medium so as to decelerate said convey roller to a speed identical to that of the other convey roller.

It is another object of the present invention to provide an image formation apparatus comprising:

convey means and recovery means, said convey means having a paper feed roller for conveying a recording medium toward a recording position; a press roller, opposing said paper feed roller, for pressing the recording medium against said paper feed roller; and a support mechanism for supporting said press roller at a pivot portion thereof and for keeping said press roller detachable with respect to said paper feed roller; said recovery means forcibly pivoting said pivot portion of said support mechanism and returning said press roller to a position at which said press roller can press against said paper feed roller while said press roller is detached from said paper feed roller and said convey means is located in a recordable position.

It is another object of the present invention to provide an image formation apparatus comprising:

recording means for recording an image on a recording medium; oscillating means for oscillating said recording means in accordance with a reference surface associated with a recording surface of the recording medium during recording of the image; and fixing means for inhibiting operation of said oscillating means and for fixing a position of said recording means when no image is being recorded.

It is another object of the present invention to provide an image formation apparatus comprising:

recording means for recording an image on a recording medium; a fan; and a regulation member, arranged on a surface of said recording means which opposes the recording medium, for regulating a recording surface of the recording medium, air blown by said fan serving to abut the recording medium against said regulation member so as to form the recording surface.

It is another object of the present invention to provide an image formation apparatus comprising:

recording means for recording an image on a recording medium; oscillating means for oscillating said recording means in accordance with a reference surface associated with a recording surface of the recording medium during recording of the image; and oscillation auxiliary means for smoothly performing oscillation of said recording means.

It is another object of the present invention to provide an image formation apparatus comprising:

recording means storage means for storing recording means for recording on a recording medium at a recording position; convey means storage means for storing convey means for guiding the recording medium to the recording position and for detaching the recording medium from the recording position; open/close means for allowing opening/closure of said convey means storage means and said recording means storage means; fixing means for keeping said recording means storage means and said convey means storage means in a closed state; releasing means including an operation member for releasing the closed state obtained by said fixing means; and a sealing member for closing a mounting portion of said operation member to provide dustproof properties.

It is another object of the present invention to provide an image formation apparatus comprising: convey means having convey and pinch rollers which are arranged on the upstream and downstream sides of a recording position to press and clamp a recording medium therebetween, said convey means also having a drive mechanism for driving said convey rollers so as to remove the recording medium from the recording position, and said pinch rollers having flexible ring members which are in surface contact with said convey rollers so as to obtain a predetermined nip amount.

It is another object of the present invention to provide an image formation apparatus comprising:

a feedout port for a recording medium; a flap for opening/closing said feedout port; and means for inhibiting movement of said flap so as to hold said feedout port in an open state.

It is another object of the present invention to provide an image formation apparatus comprising:

convey means having guide members which guide both ends of a recording medium so that the recording medium is positioned on a convey path when pinch rollers for pressing the recording medium against convey rollers on the upstream side of a recording position are open.

BRIEF DESCRIPTION OF THE DRAWINGS

FIGS. 5A to 5C are views for explaining an example of the internal construction of a controller unit;

DETAILED DESCRIPTION OF THE PREFERRED EMBODIMENTS

The present invention will be described in more detail with reference to the accompanying drawings.

1.1 Outer Appearance

Figure 1:
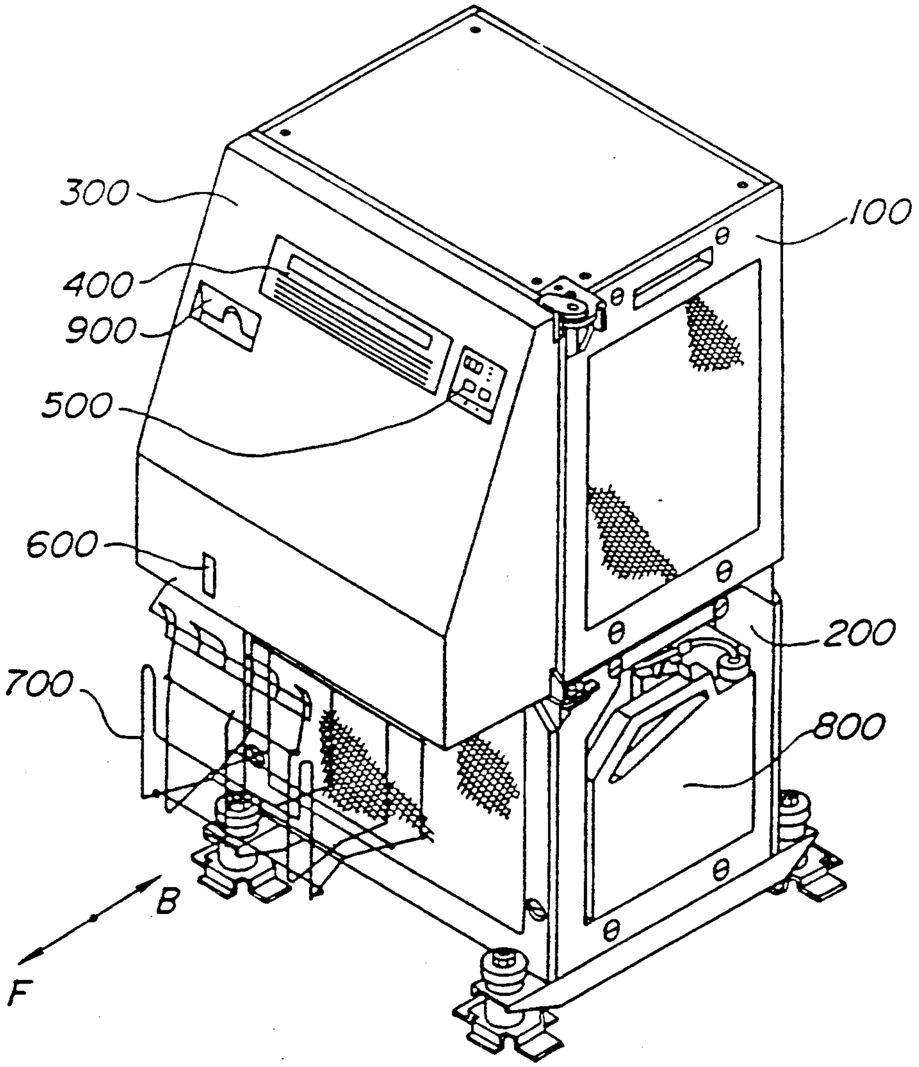
FIGS. 1, 2A, and 2B are perspective views showing an example of the schematic construction of an image formation apparatus according to the present invention.
Figures 2A, 2B:
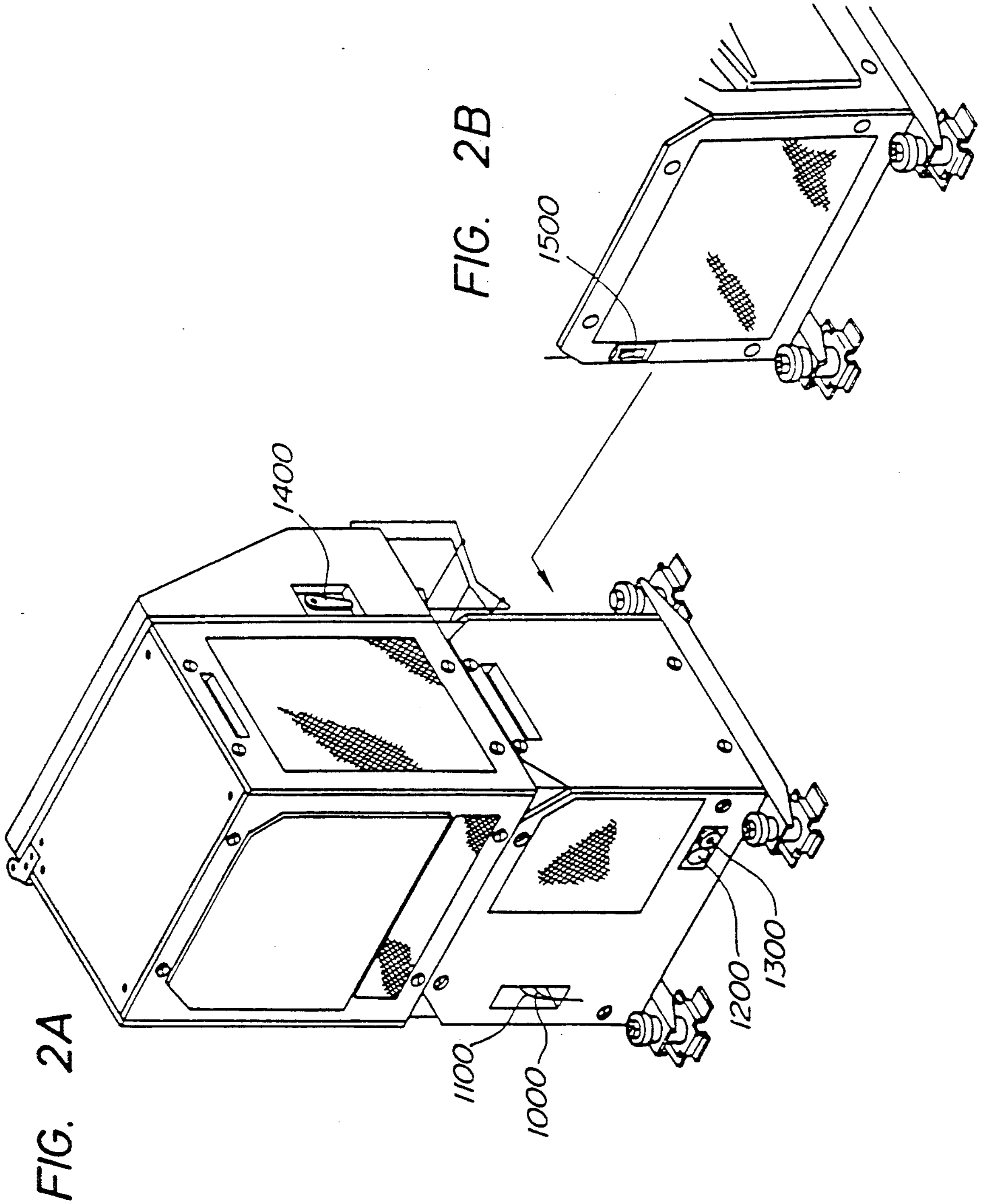

FIGS. 1, 2A and 2B show an example of the schematic construction of an image formation apparatus of the present invention. The image formation apparatus of this embodiment can be connected to a host system which supplies image information and control signals for image recording.

In FIGS. 1, 2A and 2B, the reference numerals, and the names, functions and meanings of the respective parts correspond to each other in the following

TABLE 1

| Name | Function/Meaning |
|---|---|
| 100 . . . recording system unit | Houses printing head, recovery system and the like. |
| 200 . . . controller | Houses control mechanism, power source and the like. |
| 300 . . . paper feed unit (convey system unit) | Has control panel and exhaust port for printed paper at front, and paper feed mechanism (convey system) inside. |
| 400 . . . flap | Feeds printed paper. |
| 500 . . . display panel | Has switches for paper feed and mode selection. |
| 600 . . . view window | Window for allowing the operator to look inside to check amount of remaining paper. |
| 700 . . . stacker | Stacks printed paper. Slidable in F and B directions. |
| 800 . . . drain tank | Tank for receiving exhaust liquid in a recovery operation performed when normal printing is interrupted. Replaced with a new tank when full. |
| 900 . . . pocket | Houses sheet or book giving instructions for operation of the apparatus. |
| 1000 . . . first optical fiber connector | Connects communication optical fiber from host system to the apparatus. |
| 1100 . . . second optical fiber connector | Connects communication optical fiber from the apparatus to host system. |
| 1200 . . . power input connector | AC input connector. |
| 1300 . . . power output connector | AC output connector. Supplies power to the apparatus for interfacing with host system. |
| 1400 . . . handle lever | Pulled to open paper feed unit. |
| 1500 . . . power switch | Power switch for the apparatus. |

1.2 Internal Construction

(1) Interior of Recording System

Figure 3:
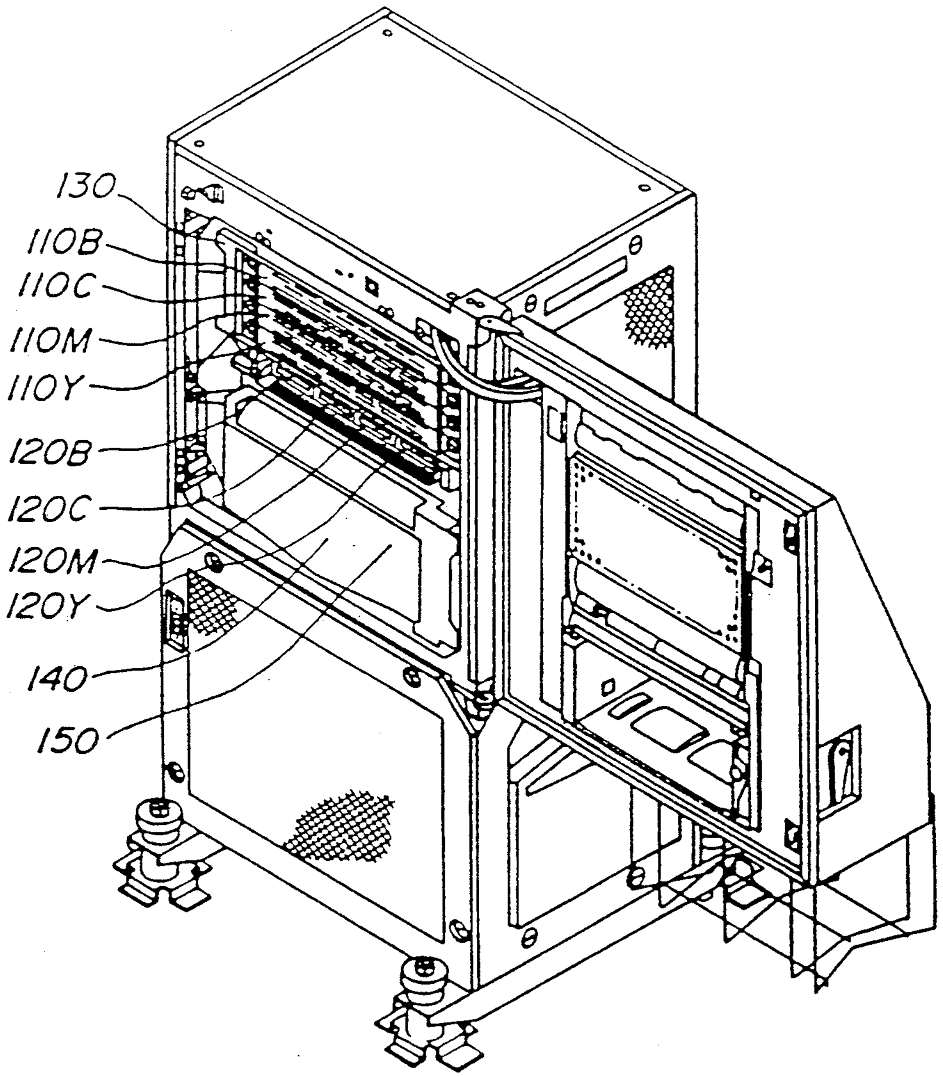
FIG. 3 is a perspective view of an open paper feed unit showing an example of the internal construction of a recording system unit 100.

FIG. 3 is a perspective view showing an open state of the paper feed unit 300 in order to show an example of its internal construction. The reference numerals, and the names, functions and meanings of the respective parts correspond as shown below. In this system, a control system including a recording head 110 and a cartridge tank 120 can be an ink-jet printer as disclosed in Japanese Patent Application Nos. 244131/1983 to 244138/1983, whose assignee is the same as that of this application.

TABLE 2

| Name | Function/Meaning |
|---|---|
| 110B, 110C, 110M, 110Y . . . recording head unit | Black, cyan, magenta and yellow inks are ejected to print images. |
| 120B, 120C, 120M 120Y . . . cartridge tank | Tanks storing inks of respective colors. Inks are replenished by replacing the tanks. |
| 130 . . . recording head assembly | Four-color recording head unit, cartridge tanks and the overall control system. The overall assembly can be detached. |
| 140 . . . cap | Cap for protecting recording head unit. Has a water absorbing material inside so as to absorb inks from the heads during recovery. |
| 150 . . . cap cover (See FIG. 29) | Covers the cap during printing. Prevents drying up of cap and attachment of dust or the like thereon. |

(2) Interior of Paper Feed Unit

Figure 4:
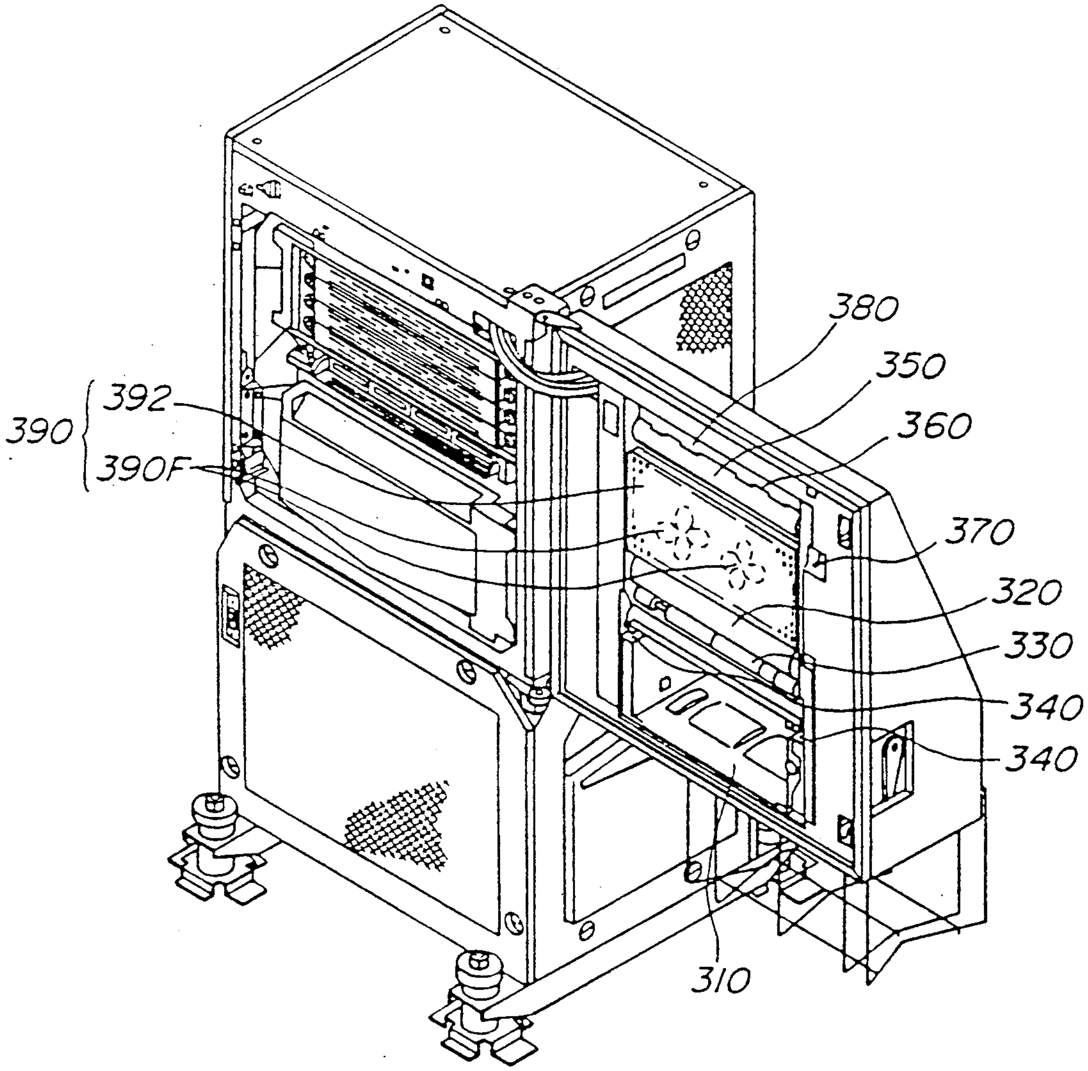
FIG. 4 is a perspective view showing the open paper feed unit for explaining its internal construction.

FIG. 4 is a perspective view showing the open paper feed unit 300 so as to show its internal construction. The reference numerals, and the names, functions and meanings of the respective parts correspond to each other as follows shown in the following Table 3.

TABLE 3

| Name | Function/Meaning |
|---|---|
| 310 . . . paper deck section | Portion having members for regulating convey path inside a storage section storing printing paper. |
| 320 . . . lower feed roller | Lower paper feed mechanism driven by motor (not shown). |
| 330 . . . lower pinch roller | |
| 340 . . . lower roller open/close mechanism | Mechanism including a lever for opening or closing lower rollers when setting paper, and the like. |
| 350 . . . upper feed roller | Upper paper feed mechanism driven by the same motor as for lower paper feed mechanism. |
| 360 . . . upper pinch roller (See FIG. 17) | |
| 370 . . . upper roller open/close mechanism | Mechanism including a lever for opening or closing upper rollers when setting paper, and the like. |
| 380 . . . paper guide | Plate for guiding paper to be set between upper rollers. |
| 390 . . . recording surface forming section | Portion including fans 390F for drawing paper to keep it flat during printing, a platen 392 for regulating recording surface, and the like. |

(3) Interior of Controller

FIGS. 5A to 5C are views for explaining an example of the internal construction of the controller unit 200. In this embodiment, the controller unit 200 is arranged below the recording system unit 100. The controller unit 200 can be maintained and inspected separately from the recording system unit 100. In addition, when ink leaks inside the unit 100, the controller unit 200 can be shielded from the leaked ink by a shielding plate (to be described later), and the ink is guided to the drain tank 800. Thus, the controller unit 200 is protected from the adverse influence of ink leakage.

In FIGS. 5A to 5C, the reference numerals, and the names, functions and meanings of the respective parts correspond to each other as shown in the following Table 4.

TABLE 4

| Name | Function/Meaning |
|---|---|
| 210 . . . power source | Supplies power to the respective parts including head units 110B, 110C, 110M and 110Y. |
| 220B, 220C, 220M, 220Y . . . Vop monitor terminal | Adjust respective head voltages. |
| 230 . . . Vop monitor switch | Upon depression, allows head voltage adjustment at Vop monitor terminals. |
| 240 . . . card rack | Rack housing control circuit board. |
| 250 . . . Overload lamp | Lamp turned on when an overload occurs (current flow exceeding rated current from DC power |

TABLE 4-continued

| Name | Function/Meaning |
|---|---|
| , | source). |

2.1 Basic Operation

The basic operation of the respective parts of the apparatus will be described below.

(1) ON/OFF of Power Source a. ON

The power source switch 1500 is switched to its upper position while the paper feed unit 300 is closed (state shown in FIG. 1). Next, a BUSY lamp to be described later is turned on, and the respective parts are checked.

If no abnormality is detected, the BUSY lamp is turned off after about 5 to 10 seconds, and image data can be printed.

If the cap 140 is not fitted to the head unit 110, the unit 110 is automatically capped.

However, if an abnormality is detected, an error code is displayed on the display panel.

When the paper feed unit 300 is open, the head unit 110 is not automatically capped, even if it is not currently capped, since it is determined that the cap is open regardless of its position, and a cap UP/DOWN switch is depressed to close the cap.

b. OFF

The power source switch 1500 is switched to its lower position.

(2) ON LINE mode and OFF LINE mode

The ON LINE mode corresponds to the ON mode of an ON LINE lamp, and the OFF LINE mode corresponds to the off state of the ON LINE lamp.

In the ON LINE mode, the host system controls to perform form feed, initialize, and printing of image data.

In the OFF LINE mode, when an internal switch is depressed, paper feed, check print, and recovery can be performed.

Normally, the ON and OFF line modes are switched by switching the ON LINE switch. However, in one of the following modes, a switch from the OFF LINE mode to the ON LINE mode cannot be made.

BUSY lamp is ON.
Paper feed unit is open.
Head is not capped.
Error display is displayed.

The apparatus is initially in the ON LINE mode immediately after it is powered.

(3) Paper Setting

Figure 6A:
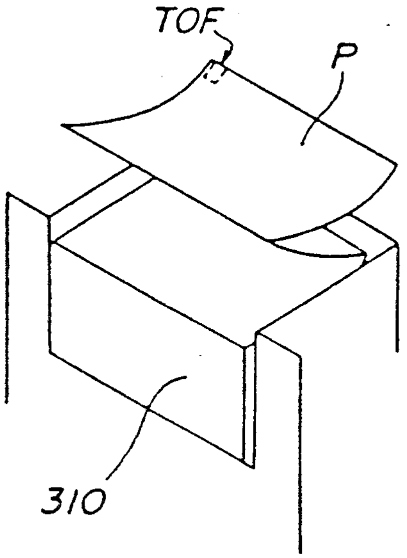
FIGS. 6A to 6D are views showing an example of the setting state of fan fold paper as a recording medium.
Figure 6C:
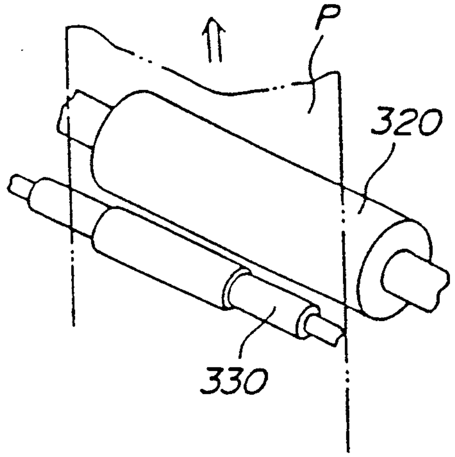
Figure 6B:
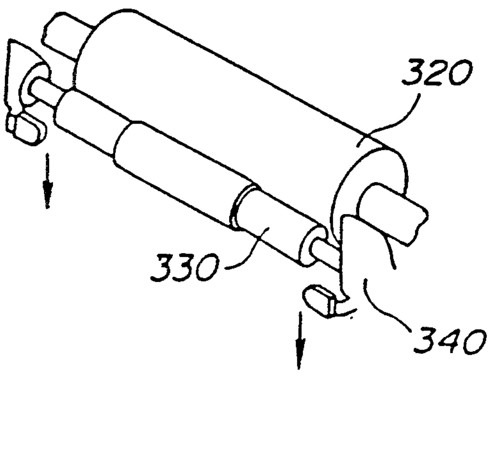

FIGS. 6A to 6C show the procedures for setting paper when fan fold paper is used as a recording medium.

Figure 6D:
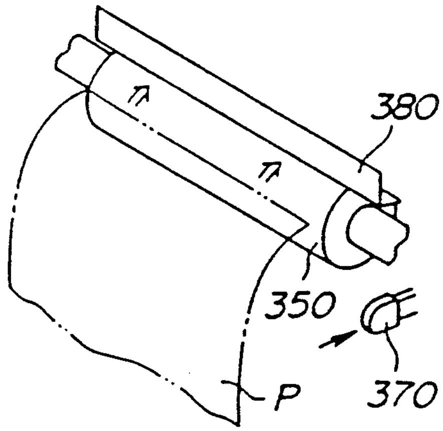

- It is checked if the power source is ON.
- It is checked if the flap 400 is open.
- The paper feed unit 300 is opened.
- Paper P is set in each deck section 310 so that a black rectangular mark (TOF mark) is at the left rear side of the paper (FIG. 6A).
- The lower paper feed mechanism is opened (FIG. 6B).
- The paper P is inserted between the lower feed roller 320 and the lower pinch rollers 330 (FIG. 6C).
- The paper P is guided along the paper guide 380 while the upper roller 350 is opened. The paper P is kept projecting out of the flap (FIG. 6D).
- The lower paper feed mechanism is closed so that the paper is not loosened.
- An FF switch is depressed to feed the paper. If the paper is set in the wrong direction, the TOF mark is not detected and the feed operation is stopped.
- The paper feed unit 300 is closed.
- It is checked if an error is displayed on the display panel.

(4) Operation of Display Panel

Figure 7:
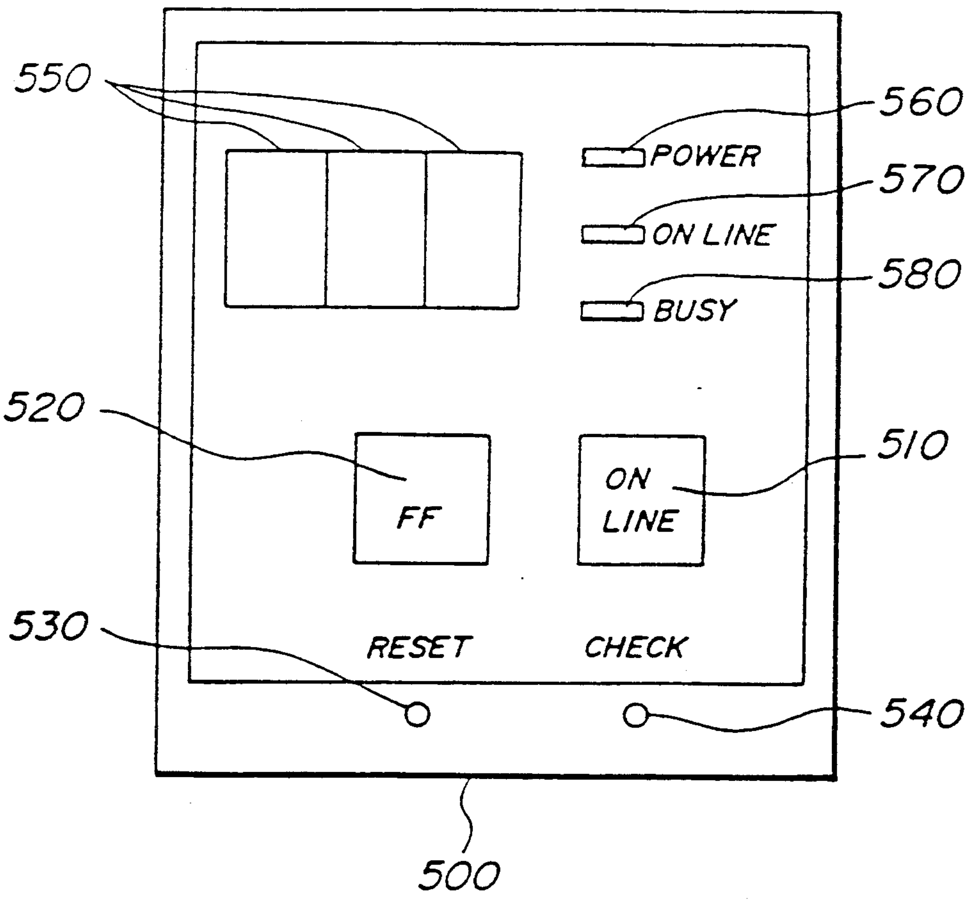
FIG. 7 is a plan view showing an example of the configuration of a display panel.

FIG. 7 shows an example of the construction of the display panel 500. The correspondence between the reference numerals of the switches and the names, functions, and the effective times, and the correspondence between the reference numerals of the displays, the names, and ON times are as follows shown in the following Table 5.

TABLE 5 a. Switches

| Name | Function | Effective Time |
|---|---|---|
| 510 . . . ON LINE switch | ON/OFF switching. Printing is interrupted if OFF LINE mode is selected by depressing ON LINE switch. OFF line mode is set when no paper error occurs during printing. | OFF LINE → ON LINE when all following conditions are satisfied: Cap 140 is closed. Paper feed unit 300 is closed. BUSY state is not set. No Error. ON LINE → OFF LINE ON LINE lamp is ON. |
| 520 . . . FF switch | Paper is fed while FF switch is depressed. When switch is released, paper is stopped upon detection of next TOF mark. Functions if any of paper jam error, no paper error, or paper set error occurs. | OFF LINE mode but not BUSY. |
| 530 . . . RESET switch | Resets the apparatus | Any time. |
| 540 . . . CHECK switch | Performs check printing. Allows selection from four patterns by switch in card rack. | When all the following conditions are satisfied: OFF LINE mode. Cap 140 is closed. Paper feed unit 300 is closed. BUSY state is not set. No ERROR. |

b. Displays

Figure 8:
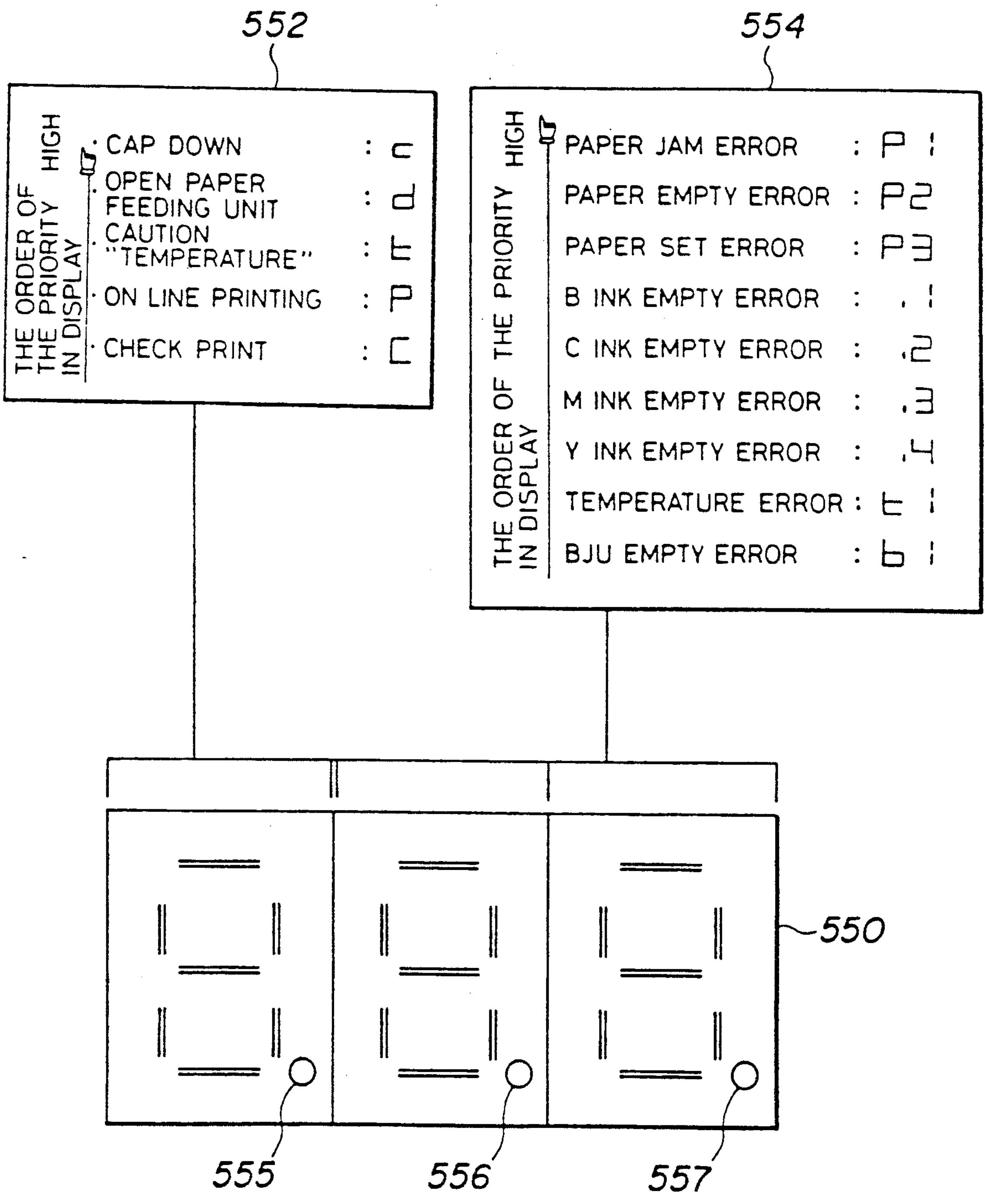
FIG. 8 is a diagram showing the display contents of a 7-segment display.

| Name | Meaning of ON State |
|---|---|
| 550 . . . 7-segment LED (3 units) | See FIG. 8. |
| 560 . . . POWER lamp | Power is ON. |
| 570 . . . ON LINE lamp | The ON LINE mode is selected. |
| 580 . . . BUSY lamp | Processing in progress upon depression of a switch. Command from the host system is being executed. |

FIG. 8 is a diagram for explaining the display contents of the 7-segment display 550. In this embodiment, of three digit positions, an upper digit position 552 is used as an error display section for displaying an error content, and a section 554 consisting of two lower digit positions is used as a display section for displaying the status and display corresponding to each error. Decimal points 555, 556 and 557 are respectively turned on when the apparatus is normally initialized, when a plurality of errors are present, and when the recording head assembly 130 is not mounted.

(5) Switching Operation Inside the Apparatus

Figure 9:
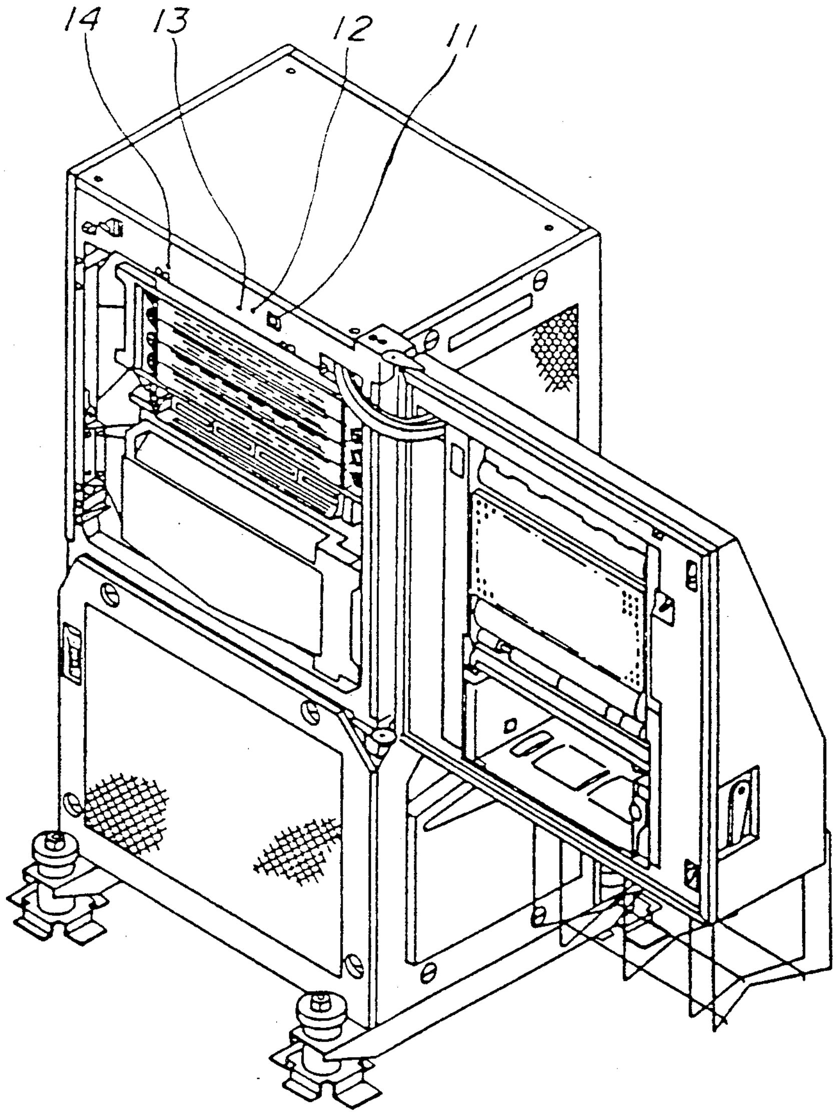
FIG. 9 is a perspective view showing an example of a switch and a display inside the apparatus of FIG. 1.

FIG. 9 shows an example of switches and displays arranged inside the apparatus. The correspondence between the reference numerals of the switches and the names, functions and effective times, and correspondence between the reference numerals of the displays and the meanings in the ON times are as shown in the following Table 6.

TABLE 6 a. Switches

| Name | Function | Effective Time |
|---|---|---|
| 11 . . . cap UP/DOWN switch | Attachment/detachment of cap 140 to head unit 110. The cap is opened upon single depression and closed upon second depression. | When all the following conditions are satisfied: OFF LINE mode is selected. BUSY mode is not set. |
| 12 . . . recovery switch | Used when printing error occurs due to nozzle clogging or air bubble formation in the head unit 110. Recovery operation is performed upon single depression. | When all the following conditions are satisfied: OFF LINE mode is selected. The cap is closed. Ink is present. BUSY mode is not set. |

b. Lamps

| Name | Meaning of ON State |
|---|---|
| 13 . . . recovery processing lamp | Recovery processing is being executed. |
| 14 . . . MC hard error lamp | Indicates hard error of the mechanical controller. |

2.2 Replenishment and Replacement of Expendables

The expendables are replenished or replaced as follows.

(1) Removal of Paper P

Removed as follows:

It is checked if the power source is ON.

The FF switch 520 is kept depressed until all the printed portion of the paper P is fed outside the flap 400.

The paper P is torn at a perforation.

The cut paper P is removed from the stacker 700.

It is checked if an error is displayed on the display panel 500.

(2) Replenishment of Ink

Ink is replenished as follows (See FIG. 3):

The paper feed unit 300 is opened.

The cap UP/DOWN switch 11 is depressed to move the cap 140, protecting the head unit 110, downward (once depressed, the cap is moved to a predetermined position even if the switch 11 is released).

The cartridge 120 is pulled.

A new cartridge is inserted. Cartridges are aligned from the left in the order: black, cyan, magenta and yellow cartridges 120B, 120C, 120M and 120Y.

The cap UP/DOWN switch 11 is depressed to move the cap 140 upward (once depressed, the cap is moved to the predetermined position even if the switch 11 is released).

The paper feed unit 300 is closed.

After the cap is moved upward, ink is supplied from its corresponding color cartridge to a fixed tank by a pump (neither shown). When the fixed tank is full, the pump is stopped and printing can be started. A fixed tank as disclosed in Japanese Patent Disclosure Nos. 244131/1983 to 244138/1983 can be used.

(3) Replacement of Drain Tank 800

Figure 10A:
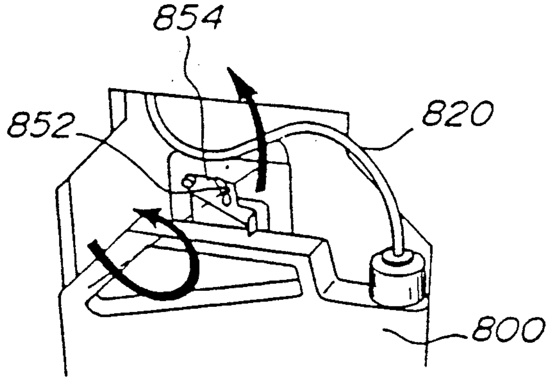
FIGS. 10A to 10C are diagrams showing an example of replacement procedures of a drain tank.
Figure 10B:
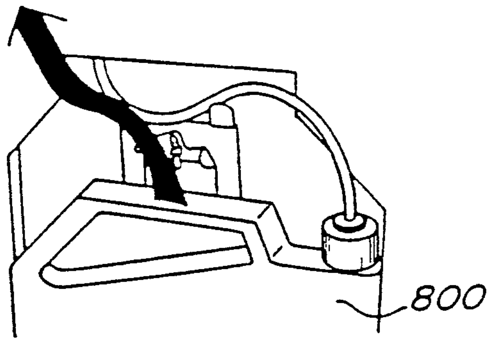
Figure 10C:
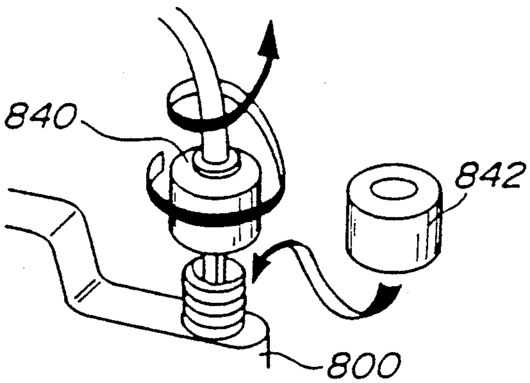

FIGS. 10A to 10C show an example of the procedures for replacing the drain tank 800. The tank 800 can be replaced as follows:

a. Loosen a screw 852 (FIG. 10A).

b. Move up a lever 854 (FIG. 10A).

c. Draw up the drain tank 800 (FIG. 10B).

d. Remove a drain tank cap 840 (FIG. 10C).

e. Mount a new drain tank in reverse order.

f. A sealing cap 842 of the new ink tank can be mounted on the old, removed drain tank.

In the drawings, a waste ink tube is indicated by 820.

2.3. Recovery in Printing Error

The causes of printing errors which can be fixed include the following:

(1) Ink in the distal end of the head (nozzle) has evaporated and the ink viscosity has become very high.

(2) Air is introduced into the nozzle.

(3) Air is introduced into a liquid chamber for storing ink in the head.

These problems can be fixed by the recovery operation.

In order to allow a recovery operation, the cap 140 must be mounted on the head 100. The recovery operation is initiated by depressing the internal recovery switch 12.

The recovery processing lamp 13 is ON while the above operations are performed.

3.1 Details of the Paper Feed Unit

Figure 11:
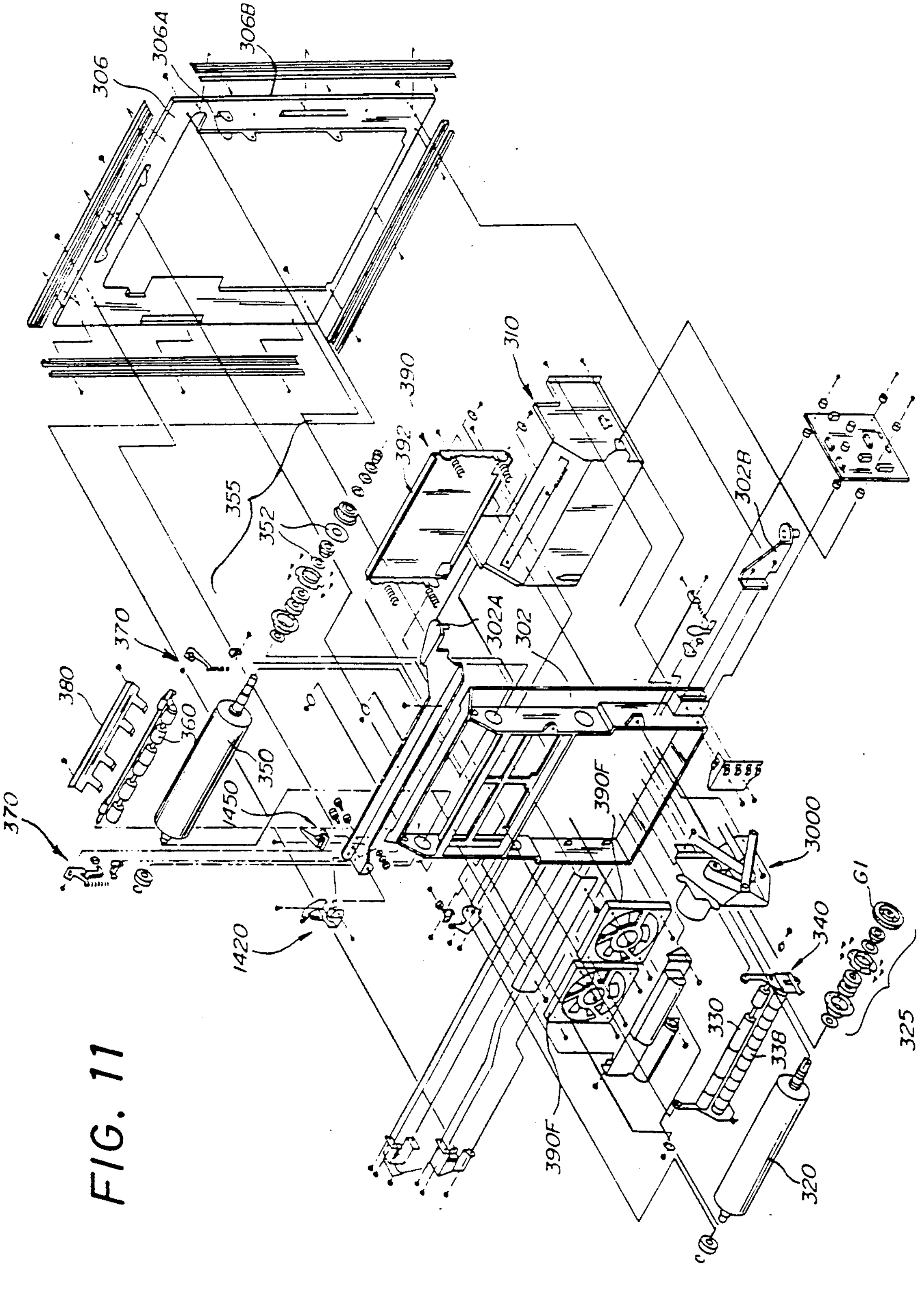
FIG. 11 is a view showing an example of the detailed construction of a paper feed unit.

FIG. 11 shows an example of the detailed configuration of the paper feed unit 300. The paper feed unit 300 mainly has a mounting base 302. A panel 306 opposes the recording system unit 100 when the unit 100 is connected. The paper deck section 310, the lower and upper paper feed mechanisms, the open/close mechanisms 340 and 370 therefor, the platen 392 and so on are exposed through a window 306A. A surface 306B opposing the unit 100 is a gap reference surface with respect to the head unit 110 to be described later.

Portions 302A and 302B have pivot shafts for pivoting the paper feed unit 300 with respect to the recording system unit 100. A sensor 1450 detects coupling with the recording system unit 100, and a lock mechanism 1420 ensures secure coupling.

A motor 3000 drives the lower and upper feed rollers 320 and 350. A transmission mechanism 325 for the lower feed roller 320 includes a pulley G1 for transmitting rotation of the motor 3000, a bearing, a retainer, and the like. A transmission mechanism 355 for the upper feed roller 350 includes a pulley G2, a bearing, a slip plate 352 such as a retainer, and so on.

(1) Paper Deck Section 310

Figure 12:
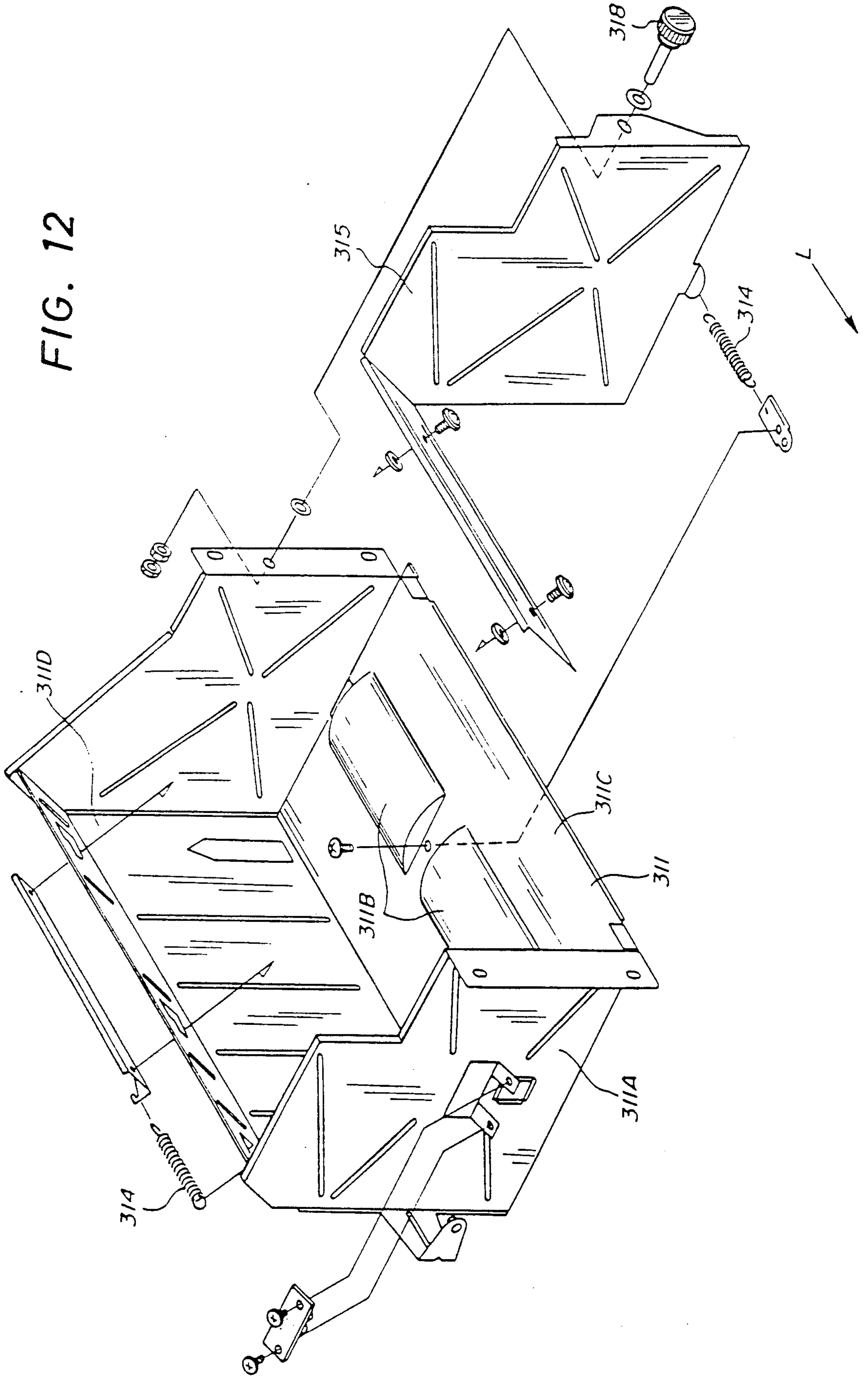
FIG. 12 is a view showing an example of the construction of a paper deck section.

FIG. 12 shows an example of the construction of the paper deck section 310. A stacker 311 stacks the recording paper P. The stacker 311 has a side plate 311A as a reference surface for regulating a convey path in an initial period, and a bottom plate 311C with projections 311B for stably stacking the paper when the paper feed unit 300 is opened or closed. In this embodiment, the bottom plate 311C is inclined with respect to a rear side plate 311D (side opposite to the paper mounting side) so that the recording paper is shifted toward the plate 311D. With this arrangement, when an impact acts upon open/close operation of the paper feed unit 300, removal of the paper from the stacker 311 can be prevented.

A press plate 315 presses the recording paper and urges it toward the side plate 311A by a spring 314, mounted between the plate 315 and the side plate 311A and biased in a direction indicated by L. A screw 318 is used for maintaining the press plate 315 in position. With this arrangement, the recording paper is regulated in position at the upstream side of the convey path and is stably conveyed.

(2) Lower Paper Feed Mechanism and Lower Roller Open/Close Mechanism

Figure 13:
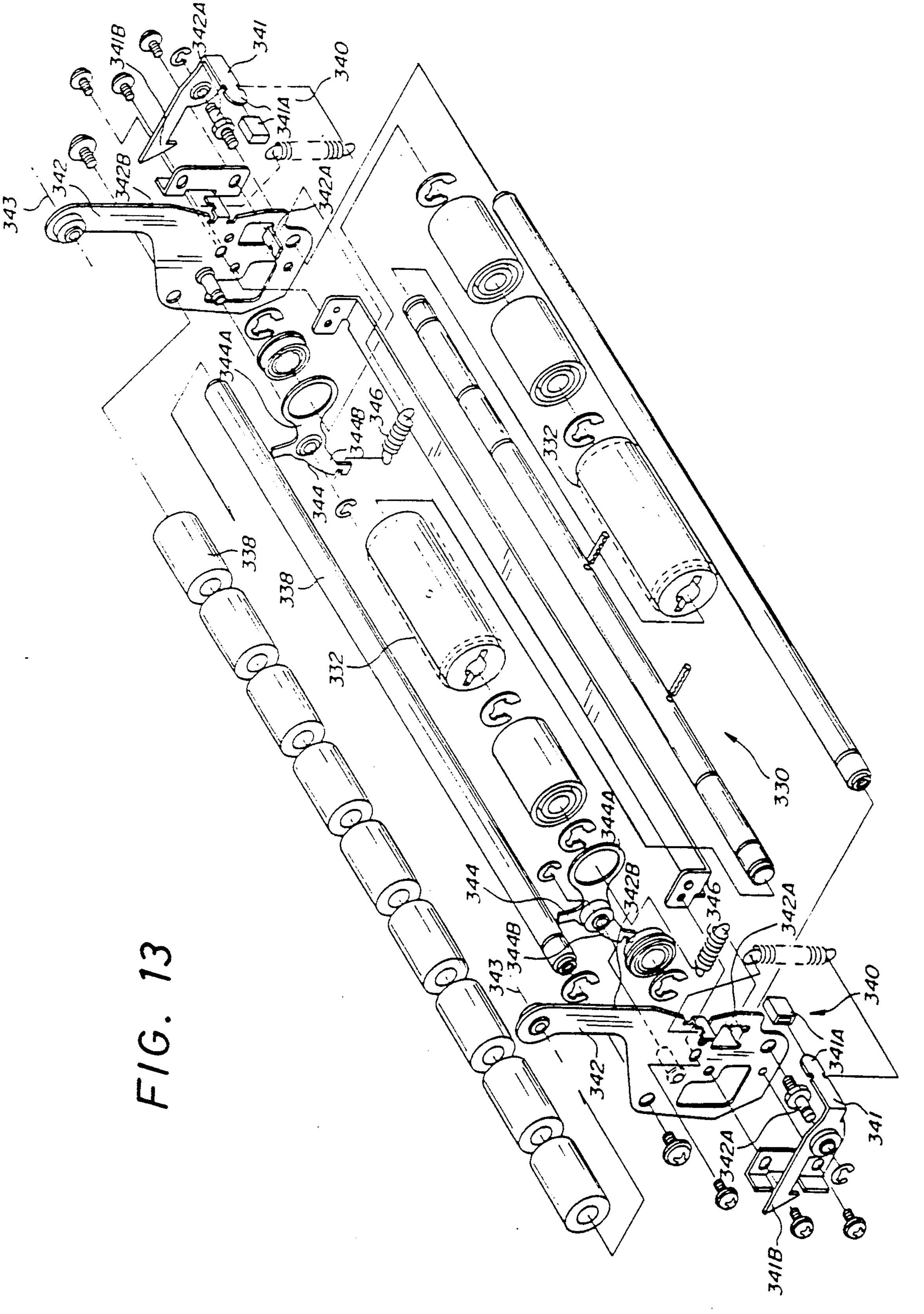
FIG. 13 is a view showing an example of the construction of a lower paper feed mechanism and a lower roller open/close mechanism.

FIG. 13 shows an example of the construction of the lower paper feed mechanism and the lower roller open/close mechanism.

Each pinch roller 330 for pressing the recording paper P toward the lower paper feed roller 320 has an elastic member 332 along its substantially central portion in the axial direction. A nipping amount is obtained between the member 332 and the roller 320 so as to clamp the recording paper P therebetween. An open/close lever 341 is used to open or close the pinch rollers 330 with respect to the feed roller 320.

Side plates 342 support the two ends of the series of pinch rollers 330, and are pivotal about a shaft 343. A pinch roller arm 344 at each end has arm portions 344A and 344B and is supported by a pin 345 projecting from the side plate 342 between the arm portions 344A and 344B. The arm 344 is pivotal about the pin 345. The pinch rollers 330 are supported by the arm portion 344A of the arm 344, and a spring 346 is mounted between the other arm portion 344B and a bent portion 342A of the side plate 342 so as to obtain a pressing force of the pinch rollers 330 against the feed roller 320. The side plate 342 has ramp preventive rollers 338 at a position immediately before the paper P is clamped between the lower paper feed roller 320 and the pinch rollers 330. When the rollers 338 are brought into contact with the paper P, the weight of the recording paper P up to the paper deck section 310 is supported, and the winding angle of the paper P around the roller 320 can be increased. When the open/close lever 341 is operated to pivot the side plate 342 around the shaft 343, the pinch rollers 330 and the rollers 338 can be separated from the feed roller 320.

The open/close lever 341 is pivotal about a pin 342A projecting from the pinch roller side plate 342. A button 341A, which is depressed to separate the pinch rollers 330 from the feed roller 320, is arranged at one end of the lever 341. A pawl portion 341B engageable with a lock pin on the base 320 is arranged at the other end of the lever 341. A spring 349 is mounted between a button 341A of the lever 341 and the side plate 342. The spring 349 applies a counter-clockwise biasing force so as to provide stable engagement.

The side of the side plate 342 facing the recording system unit 100 is a cam surface 342B which engages with the cap 140. When the cam surface 342B and the cap 140 engage with each other, the side plate 342 pivots clockwise and the feed roller 320 and the pinch rollers 330 engage. With this arrangement, even when the operator forgets to close the lower paper feed mechanism after setting the recording paper P, the lower paper feed mechanism is automatically closed upon movement of the cap 140 (to be described later). Therefore, jam of the recording paper P or the like at this portion can be prevented.

(3) Recording Surface Formation Section

Figure 14:
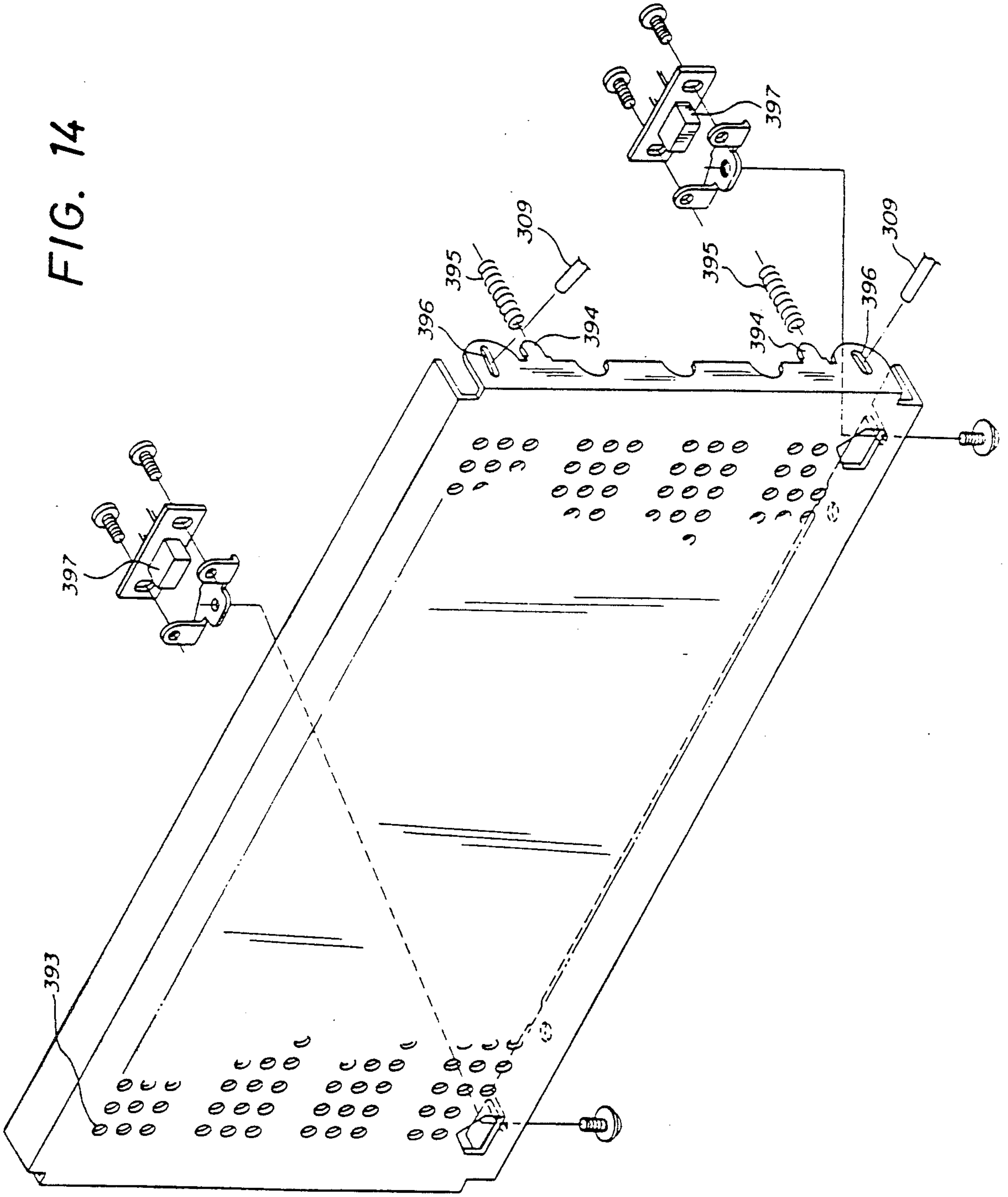
FIG. 14 is a view showing an example of the construction of a main part of a recording surface forming section including a platen.

FIG. 14 shows an example of the construction of the main part of the recording surface formation section 390 including the platen 392. Holes 393 are formed in the platen 392. The recording paper P is drawn by suction onto the platen surface by the fans 390F through these holes 393. Springs 395 serve to pivot the platen 392 with respect to the base 302 and the panel 306. Spring mount portions 394 are formed on the platen 392, and guide holes 396 receive pins 309 projecting from the base 302. Sensors 397 detect the recording paper P.

As will be described later, when the recording system unit 100 and the paper feed unit 300 are connected, a pin formed on the front surface of the recording head unit 110 abuts against the panel 306 with a reference surface. Next, the head assembly 130 pivots to keep the nozzle of the head unit 110 and the reference surface parallel to each other. At the same time, the platen 392 follows the pivotal movement of the assembly 130 through a projection formed on the assembly 130 side. Therefore, the nozzle and the recording surface of the recording paper P, regulated by the platen 392, face each other with a predetermined gap therebetween.

(4) Motor Unit

Figure 15:
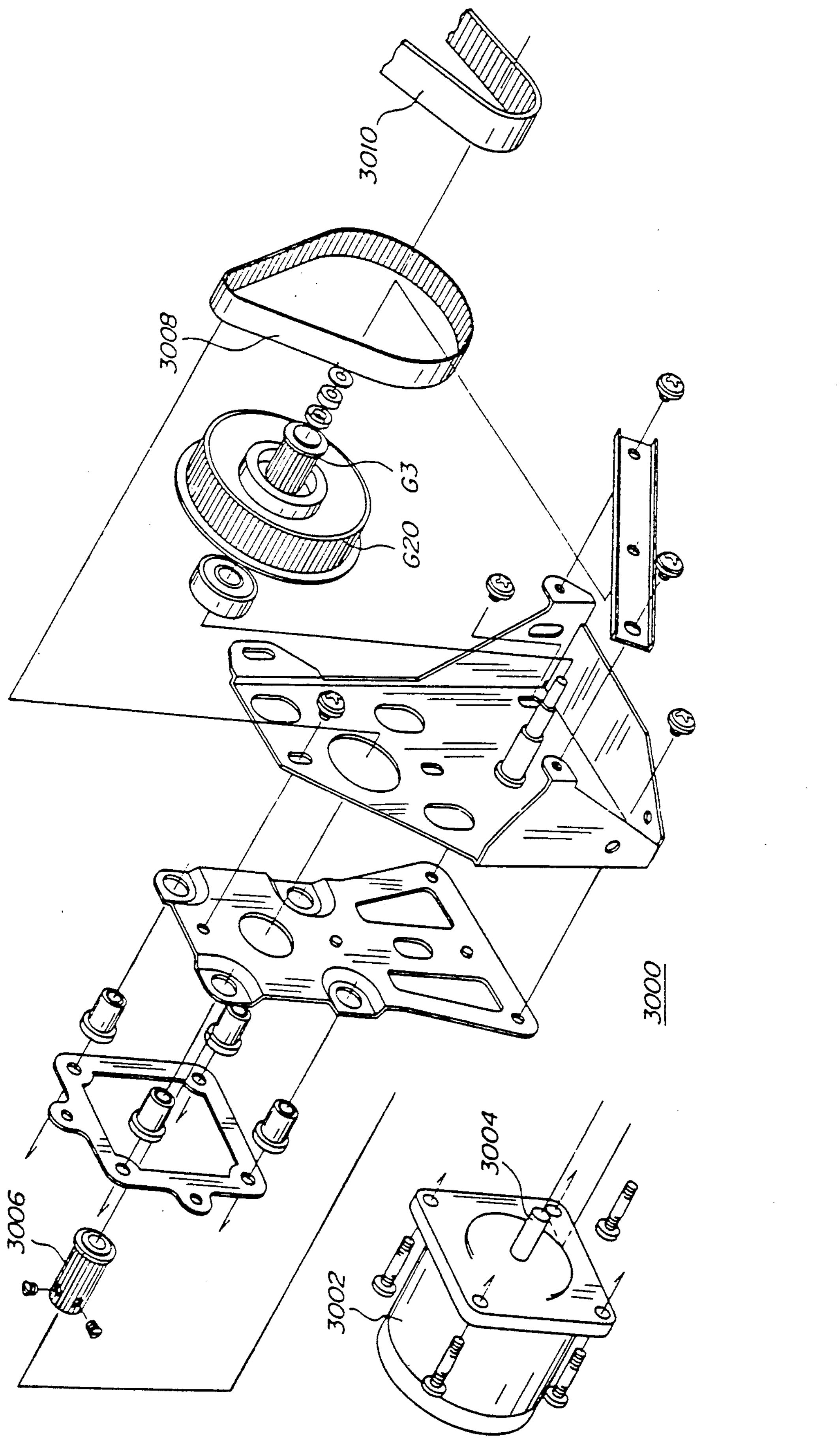
FIG. 15 is a diagram showing an example of the construction of a motor unit.

FIG. 15 shows an example of the construction of the motor unit 3000. Rotation of a rotating shaft 3004 of a motor 3002 is transmitted to a pulley G20, associated with the lower feed transmission mechanism 325, through a pulley 3006 and a belt 3008. A pulley G3 is concentrical with the pulley G20 and has a smaller diameter than the pulley G20. Rotation of the pulley G3 is transmitted to the pulley G2 of the upper feed roller transmission mechanism 355 through a belt 3010.

The gear tooth ratios of the respective pulleys are selected so that the rotational speed of the upper feed roller 350 is 2 to 3% higher than that of the lower feed roller 320.

(5) Upper Feed Roller and Its Transmission Mechanism

Figure 16:
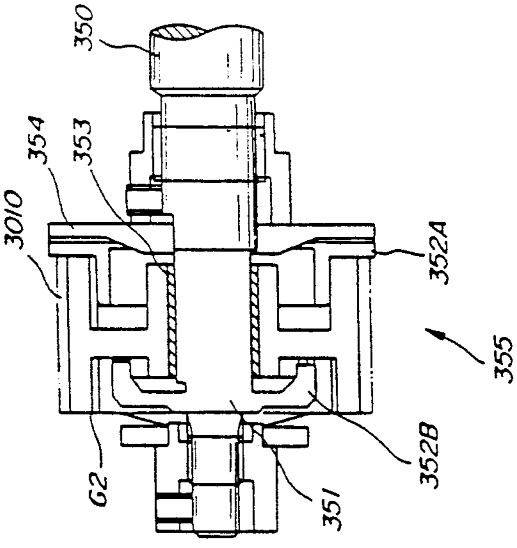
FIG. 16 is a view showing an example of the construction of an upper feed roller and its power transmission mechanism.

FIG. 16 shows an example of the construction of the upper feed roller 350, and its transmission mechanism 355. A bearing 353 is mounted on an extended shaft 351 of the roller 350 and rotatably holds the pulley G2. Slip plates 352A and 352B are mounted on the pulley G2 and the shaft 351, respectively, so as to allow sliding movement of a ring 354 and the pulley G2, which are fixed on the shaft 351. Next, rotational movement of the motor rotating shaft 3004 is transmitted to the roller 350 through the slip plates 352A and 352B, and the recording paper P is pulled upward by the upper feed roller 530 at a predetermined tension.

BEST AVAILABLE CO[illegible]

(6) Upper Pinch Roller and Paper Guide

Figure 17:
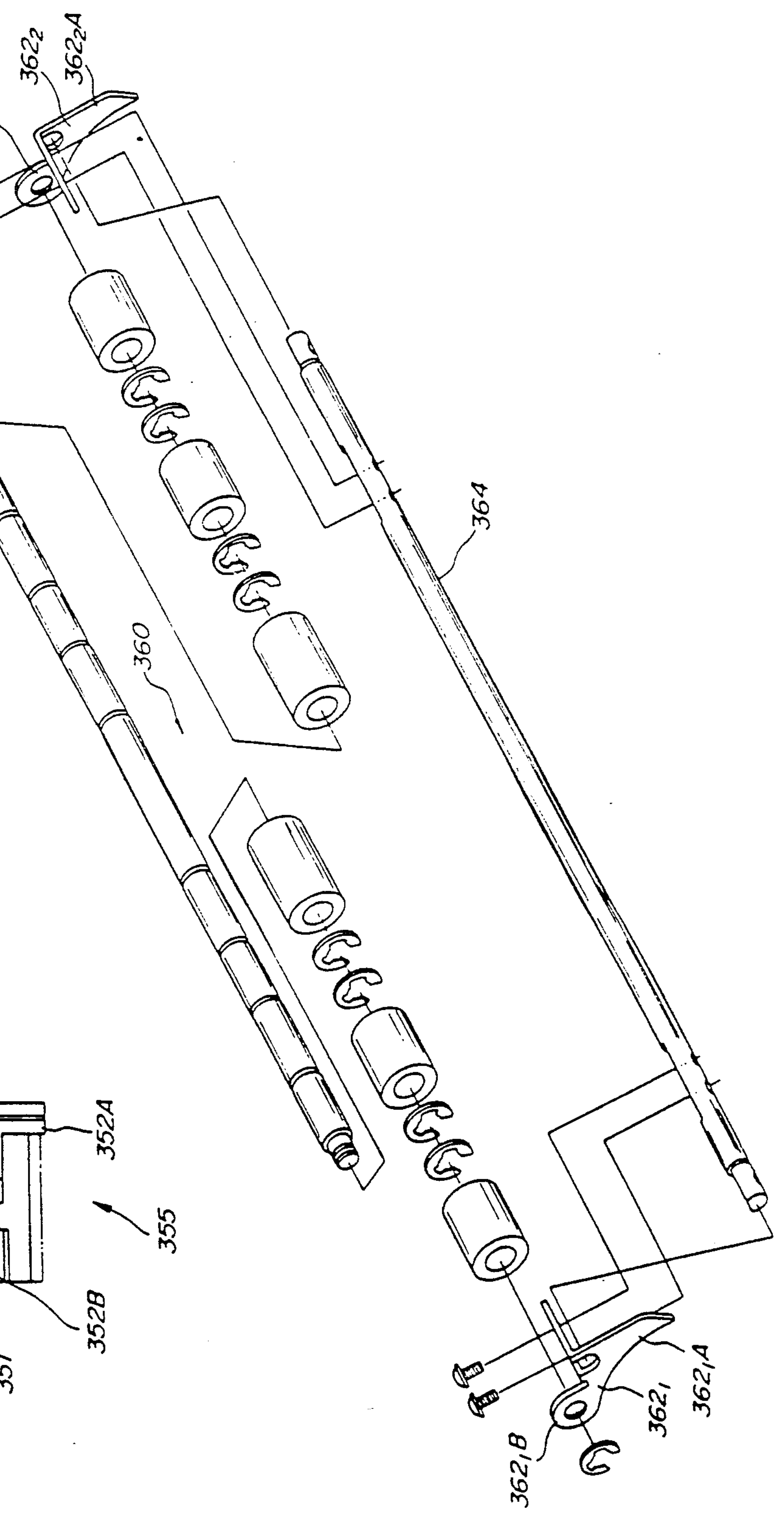
FIG. 17 is a view showing an example of the construction of a part including upper pinch rollers.

FIG. 17 shows an example of the construction of a portion including the upper pinch rollers 360. Members $362_1$ and $362_2$ have portions $362_{1A}$ and $362_{2A}$ for regulating the displacement of the recording paper P along its widthwise direction during its setting and conv[illegible] start periods. and portions $362_{1B}$ and $362_{2B}$ for ho[illegible]he two outermost pinch rollers 360, and the lik[illegible]. of these two types of members is biased to normall[illegible] press the pinch rollers 360 against the feed roller 350 by a spring 372 (FIG. 11) of the upper roller open/close mechanism 370, and opens the upper paper feed mechanism upon operation of an open/close lever 374. Movement of one of these members is transmitted to the other one of these members through a coupling lever 364. In this state, the operator can set the recording paper P.

When the recording paper P is set, the leading end of the paper is guided and located at a proper location on the convey path by the guide 380 and portions $362_{1A}$ and $363_{2A}$.

(7) Paper Feed Unit Cover

Figure 18:
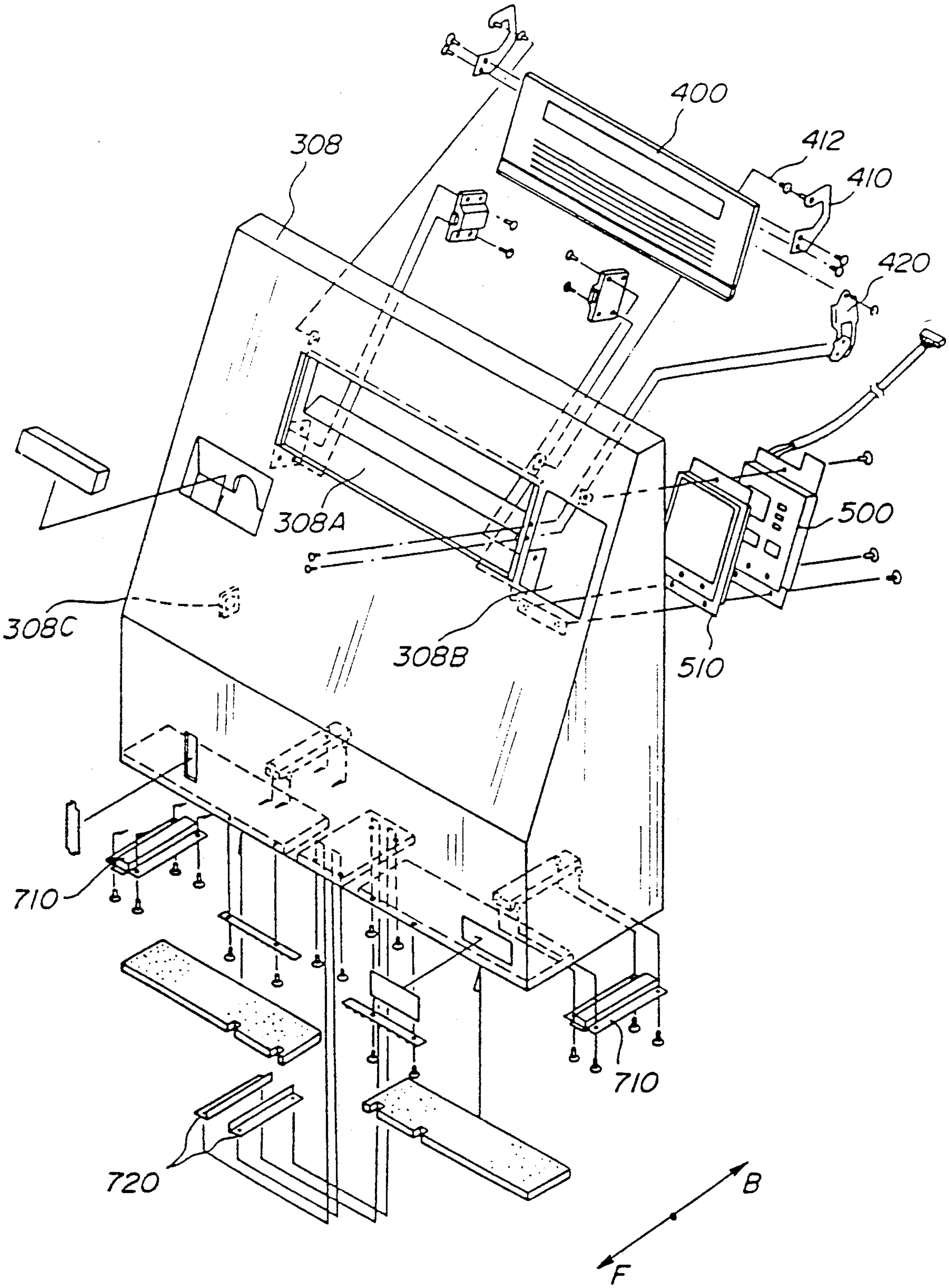
FIG. 18 is a view showing an example of the construction of a paper feed unit cover.

FIG. 18 shows an example of the construction of a portion including a paper feed unit cover 308. The portion has a feed-out port (mount port of the flap 400) 308A for the printed paper P, a mount port 308B for the display panel 500, and a mount port 308C for the handle lever 1400.

A flap lever 410 pivots the flap 400 about a shaft 412 so as to open the port 308A. An open/close control mechanism 420 controls the open/close operation of the port 308A.

A mounting member 510 is used to mount the display panel 500 in the mount port 308B.

Stacker rails 710 are arranged on the lower surface of the cover 308 and engage with abutting portions (to be described later) when the stacker 700 is moved and positioned in directions F and B. Members 720 have grooves for guiding the stacker 700, and receive corresponding mounting portions (to be described later) of the stacker 700.

(8) Flap Open/Close Operation

Figure 19A:
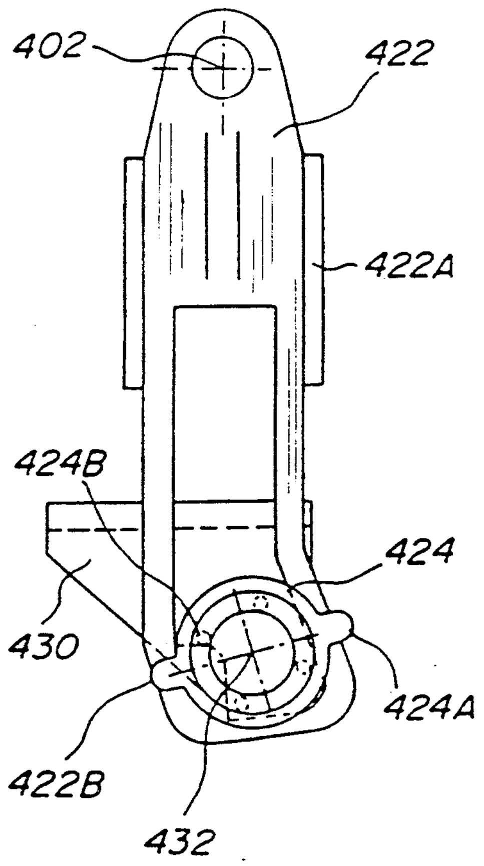
FIGS. 19A and 19B show a flap open/close mechanism.
Figure 19B:
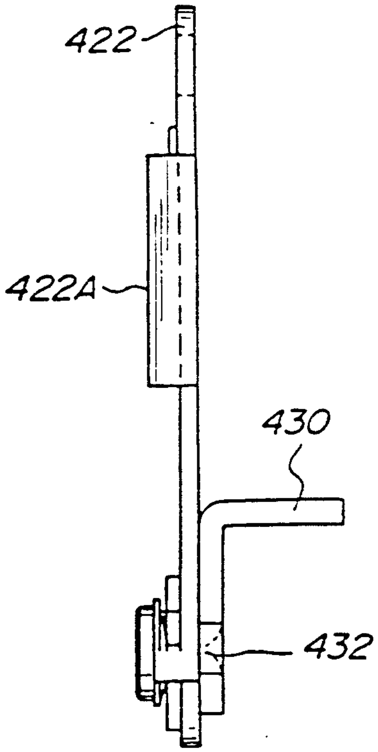

FIGS. 19A and 19B show an example of the construction of the flap open/close control mechanism 420. A flap stay 422 is pivotal about a shaft 402 on the flap 400 and has a bent portion 422A and a cam hole 422B. A rotor 424 is rotatable about a shaft 432 mounted on a base 430 fixed on the cover 308. The rotor 424 has a lug 424A engageable with the bent portion 422A, as well as a pin 424B engageable with the cam surface of the cam hole 422B.

Figures 20A, 20B, 20C:
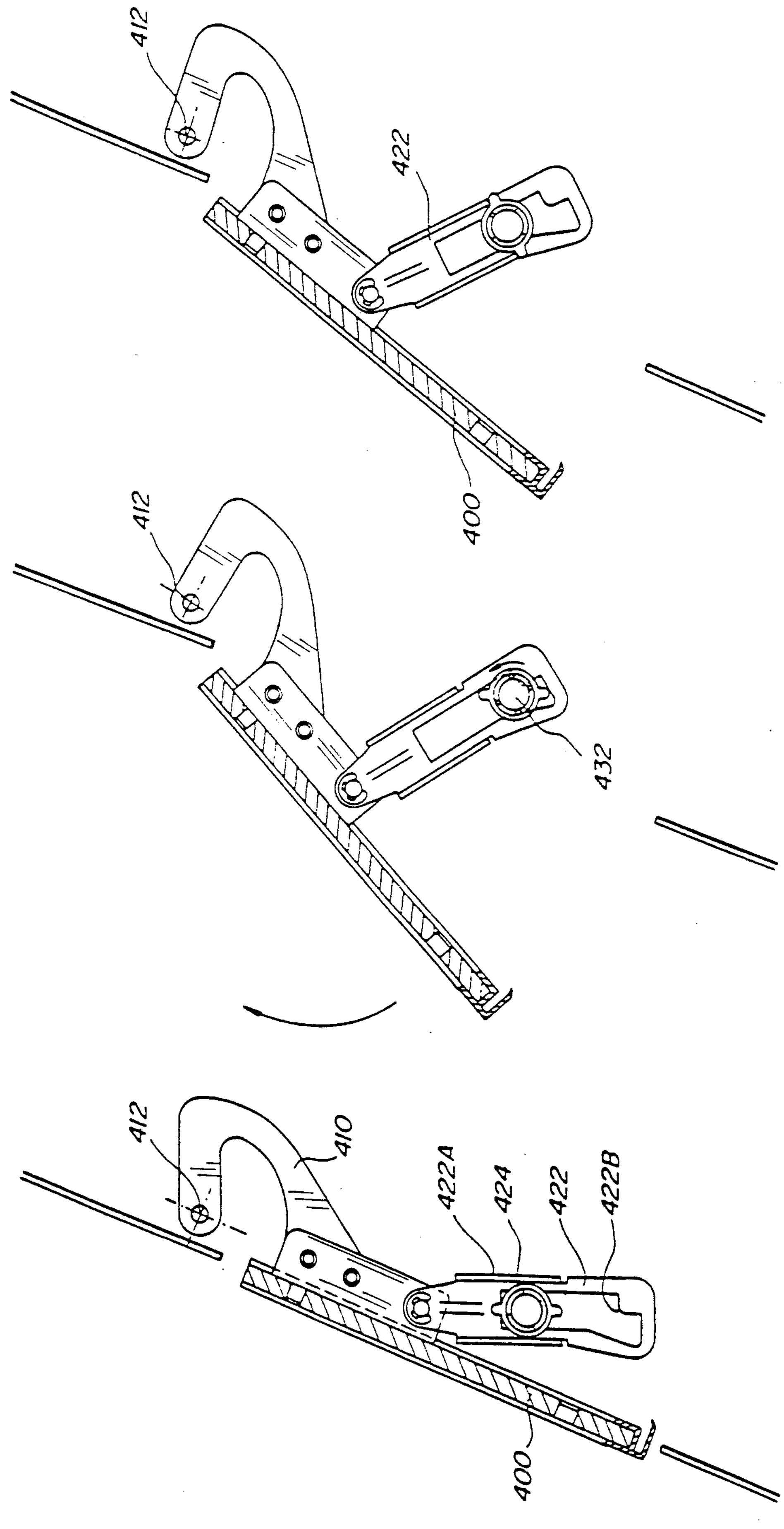
FIGS. 20A to 20C show a state wherein a feed-out port is closed, a state wherein a flap is pivoted to a predetermined position, and a state wherein the flap is closed to open the feed-out port.

FIGS. 20A, 20B and 20C respectively show a state wherein the port 308A is closed, a state wherein the flap 400 is pivoted to a predetermined position, and a state wherein the flap 400 is locked and the port 308A is opened.

When the flap 400 is pivoted clockwise from the state shown in FIG. 20A to the state shown in FIG. 20B, the cam hole 422B and the pin 424B engage with each other, and the rotor 424 rotates counterclockwise about the shaft 432 and reaches the state shown in FIG. 19A (note that the rotation direction in FIG. 19 is opposite to that shown in FIG. 20). When the flap 400 is pivoted in the closing direction to the state shown in FIG. 20C, the lug 424A of the rotor 424 and the bent portion 422A of the flap stay 422 engage with each other, whereupon further pivoting (counterclockwise) of the flap 400 is prevented. Thus, the flap 400 is locked, the port 308A is opened, and the printed paper P can be fed. During this feeding operation, even if the operator accidentally presses the flap 400 or vibration of the flap 400 occurs, the flap 400 is locked and the port 308A will not be closed.

When the port 308A is closed, the procedures described above are followed in the reverse order. Thus, the flap 400 is pivoted clockwise from the state shown in FIG. 20C, located in the position shown in FIG. 20B, released from the locked state, and is closed as shown in FIG. 20A.

(9) Mounting Procedures of Stacker

Figure 21:
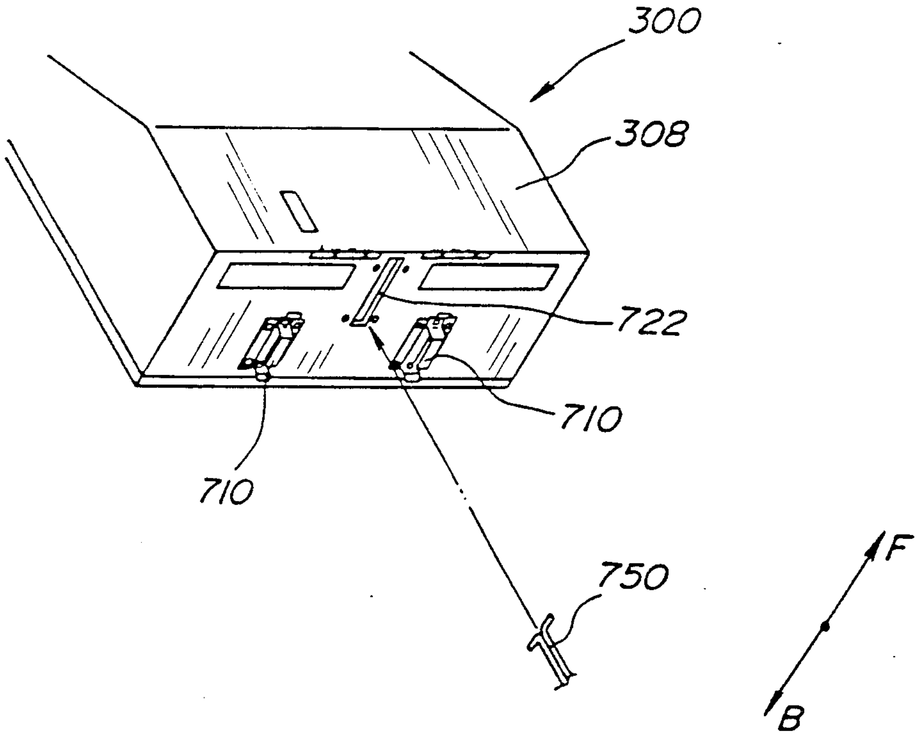
FIG. 21 is a perspective view showing a paper feed unit from below in order to explain the mounting state of a stacker.

FIG. 21 is a perspective view showing the paper feed unit 300 from below in order to explain mounting of the stacker 700. A guide groove 722 is formed by members 720 and receives a mounting portion 750 of the stacker 700.

When the stacker 700 is mounted, the mounting portion 750 is inserted into the groove 722 in the illustrated manner. Thereafter, the mounting portion 750 is pivoted through 90° so that it will not be disengaged from the groove 722. The abutting portions of the stacker 700 are engaged with the stacker rails 710.

In this state, the stacker 700 is movable in the directions F and B, so that it can be located in the F or B position in the operative or inoperative mode of the apparatus. Therefore, in the inoperative mode of the apparatus, the stacker 700 can be housed below the paper feed unit 300, and the overall size of the apparatus can be reduced.

(10) Structure of Stacker

Figure 22:
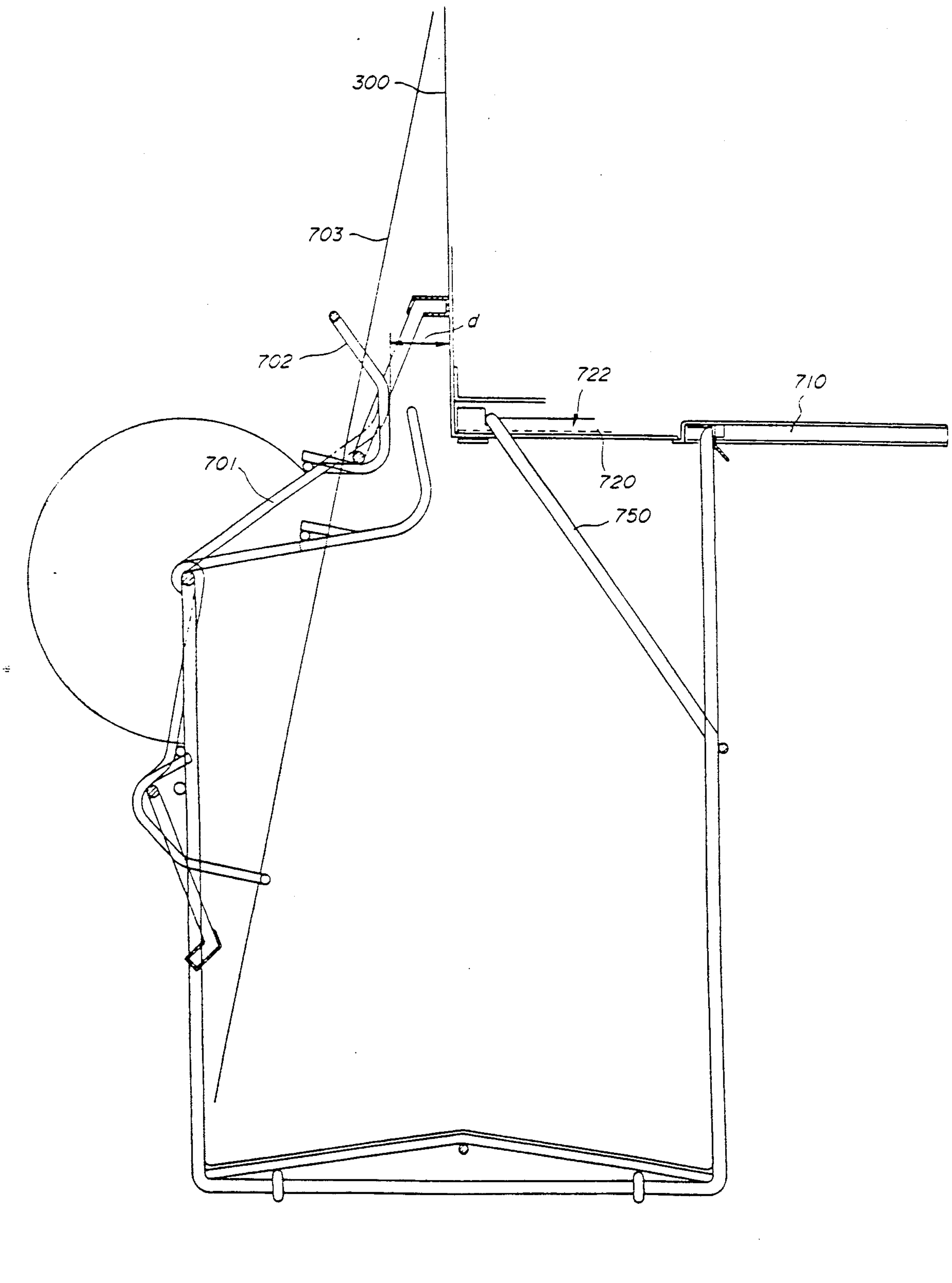
FIG. 22 is a longitudinal sectional view of a stacker arranged below the paper feed unit in a state wherein the stacker is used.

FIG. 22 shows a longitudinal section of the stacker 700 (during use or in the front projecting state) mounted below the paper feed unit 300.

As shown in FIG. 22, the stacker 700 has a support arm 701 pivotally supported on the upper portion of the stacker main body, and a guide member 702, which is bent, mounted on the arm 701. The support arm 701 abuts against the front surface of the paper feed unit 300 and sets the guide member 702 at a predetermined position when the stacker is used. In this set state, the guide member 702 is arranged to be inside a lower extended line 703 of the inclined surface of the paper feed unit 300. A horizontal distance d between the vertical front surface of the paper feed unit 300 and the guide member 702 is within a range of 10 to 25 mm. With this arrangement, continuous printed recording paper such as fan fold paper is fed out through the feed-out port. The paper then abuts against the bent portion of the guide member 702, drops into the stacker 700 through the gap between the guide member 702 and the front surface of the paper feed unit 300, and is stacked in the stacker 700. The distance d is set to fall within the range described above, so that the recording paper can be stably guided into the stacker without accidentally dropping outside it. The guide member 702 can be pivoted downward to be not used, as shown in FIG. 22.

3.2 Paper Feed Unit Lock Mechanism and Handle Lever (1) Lock Mechanism

Figure 23:
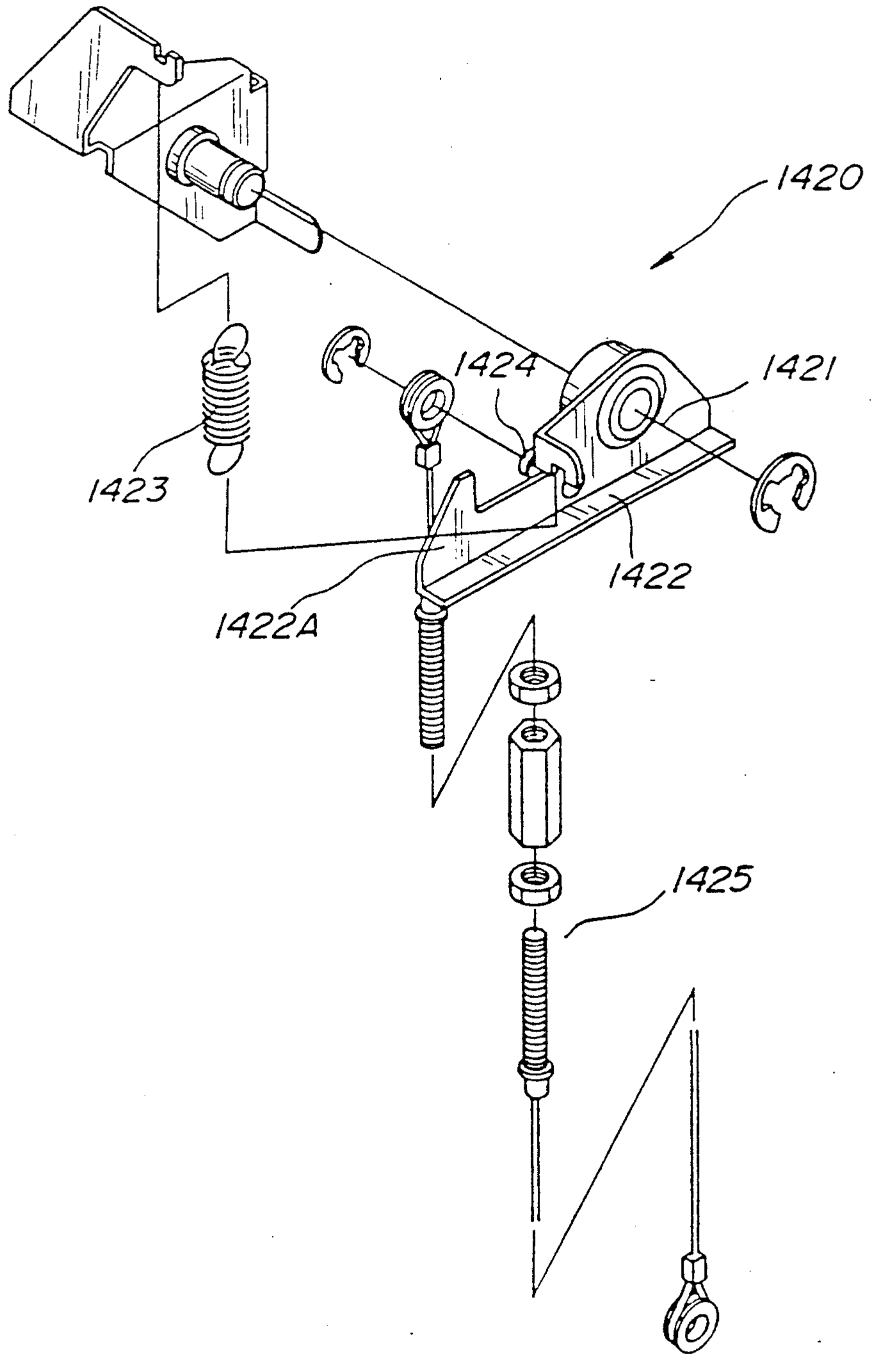
FIGS. 23 and 24 are views showing lock mechanisms mounted at upper and lower portions of the paper feed unit, respectively.
Figure 24:
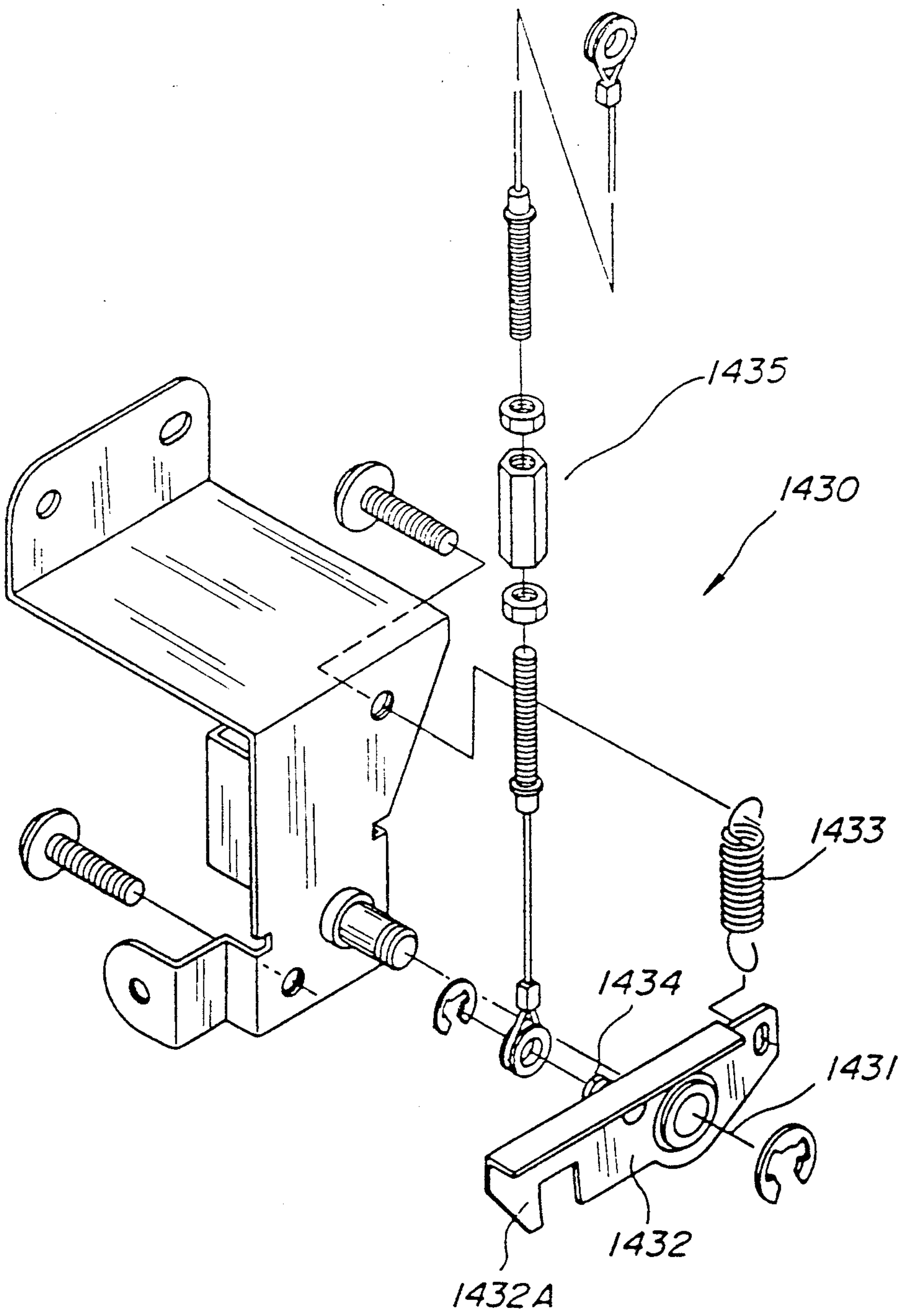

FIGS. 23 and 24 show lock mechanisms 1420 and 1430 arranged at the upper and lower portions of the paper feed unit 300. Lock levers 1422 and 1432 have pawls 1422A and 1432A which are pivotal about shafts 1421 and 1431 and engage with lock members arranged at the side of the recording system unit 100.

Springs 1423 and 1433 pivot the lock levers 1422 and 1432 in the locking direction. Pins 1424 and 1434 are respectively arranged between the shaft 1421 and the pawl 1422A and between the shaft 1431 and the pawl 1432A. The pins 1424 and 1434 are connected to the handle lever 1400 through wires 1425 and 1435, respectively. When the wires 1425 and 1435 are pulled downward and upward, respectively, upon operation of the handle lever 1400, the lock levers 1422 and 1432 are pivoted to release the locked state between the paper feed unit 300 and the recording system unit 100.

(2) Handle Lever

Figure 25:
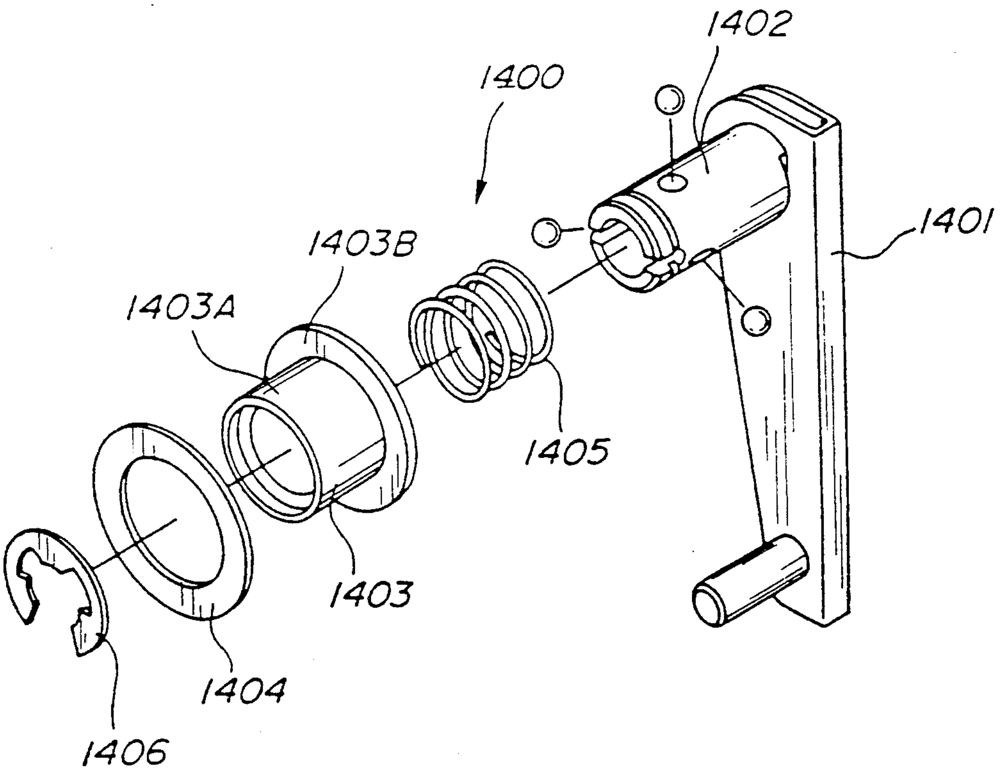
FIGS. 25 and 26 are views showing a handle lever and its power transmission mechanism.
Figure 26:
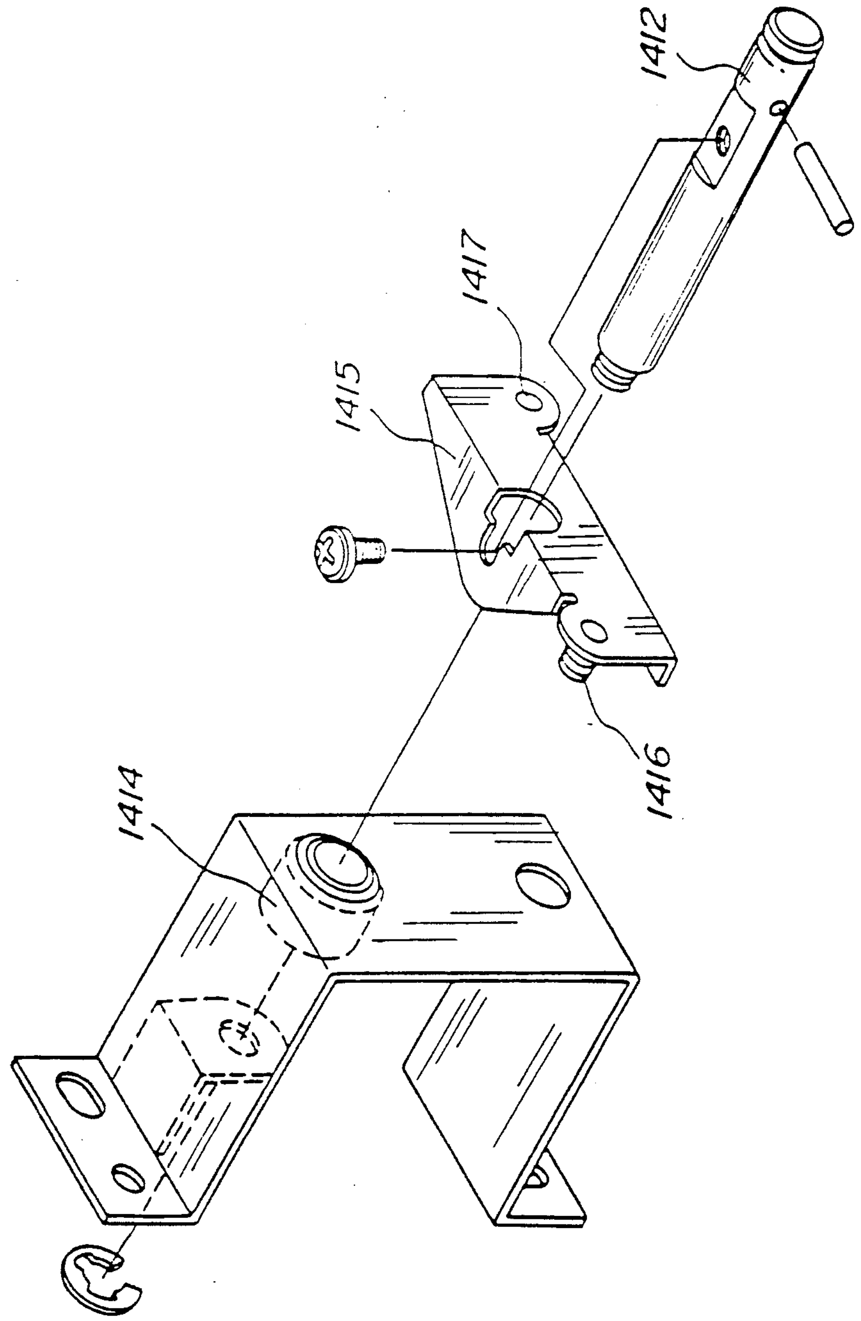

FIGS. 25 and 26 respectively show an example of the construction of the handle lever 1400 and its transmission section. An operation handle 1401 has a pin 1402 which can be connected to a transmission shaft 1412. A member 1403 has a mounting portion 1403A on the handle lever mounting hole 308C, and a flange portion 1403B. A sealing member 1404 is arranged on the flange portion 1403B. A spring 1405 applies a biasing force toward the hole 308C to the member 1403, so as to bring the sealing member 1404 in tight contact with the peripheral edge of the hole 308C. A stop ring 1406 prevents accidental removal of the pin 1402. In other words, when the handle lever 1400 is mounted, the sealing member 1404 provides a suitable seal against dust around the mounting hole 308C.

A transmission shaft 1412 is supported by a bearing 1414 and can pivot in response to operation of the handle lever 1400. A wire connecting member 1415 is fixed to the transmission shaft 1412, and has pins 1416 and 1417 which are connected to wires 1425 and 1435, respectively.

3.3 Controller Unit

Figure 27:
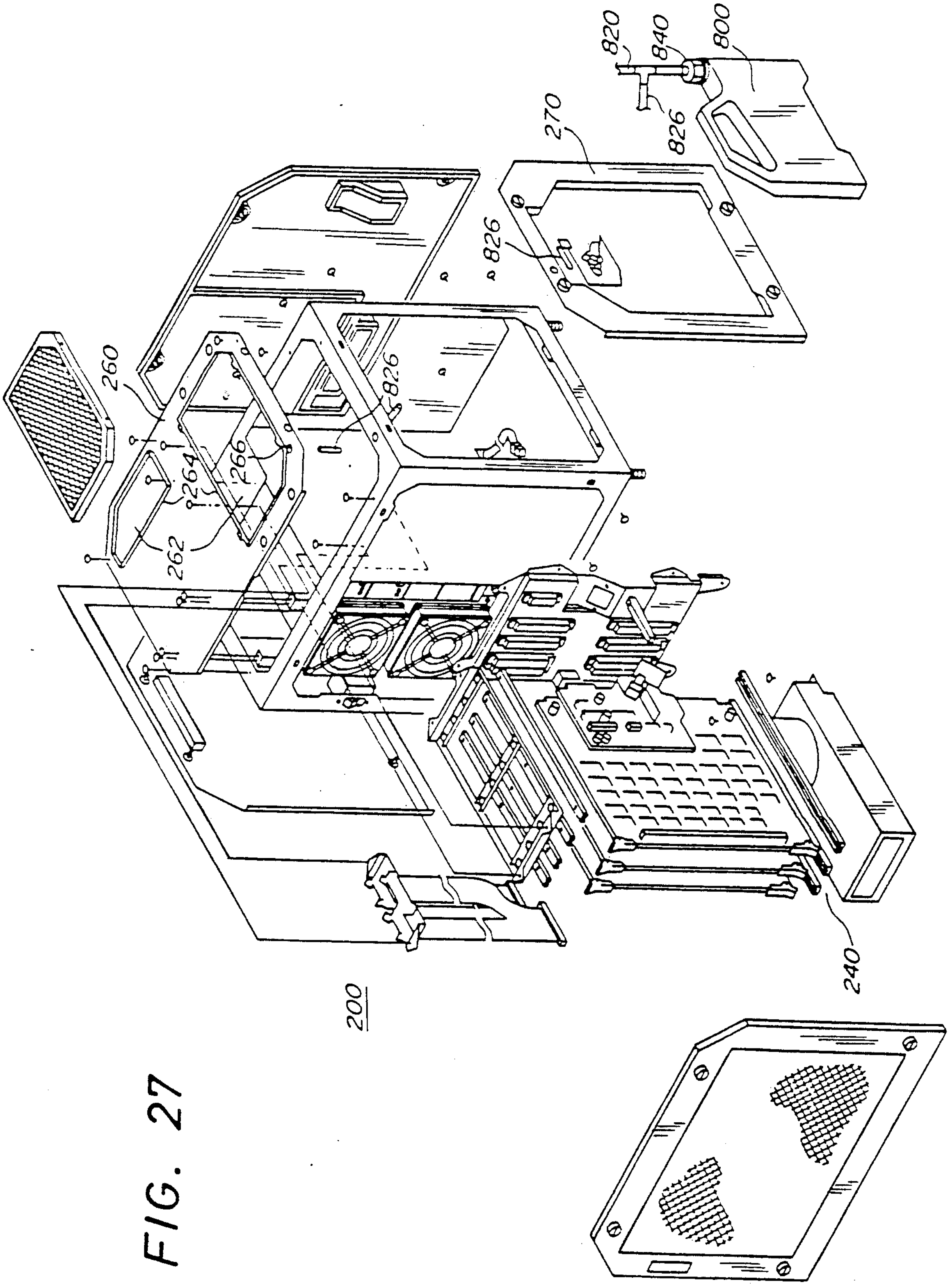
FIG. 27 is a diagram showing an example of the construction of a controller unit.

FIG. 27 shows an example of the construction of the controller unit 200. In this embodiment, the periphery of an opening 262 (for air flow or wire path) in a top plate 260 of the controller unit is bent to constitute a guide portion 264. Thus, even if ink leaks from the recording system unit 100, it will not flow into the controller unit 200. The leaked and collected ink is drained from the guide portion 264 through a hole 266 connected to a tube 826. The tube 826 is exposed outside the unit 200 through a side plate 270, and is connected to the waste ink tube 820. Ink flowing onto the top plate 260 can thereby be drained into the drain tank 800. In this manner, the interior of the controller unit 200 is protected from ink leakage from the recording system unit 100.

In this embodiment, the tube 826 is connected to the tube 820. However, if ink collected by the cap 140 is guided onto the top plate 260 and into the drain tank 800 through a tube connected to the hole 266, the tube construction can be simplified.

3.4 Recovery System (1) Cap Open/Close Mechanism

Figure 28:
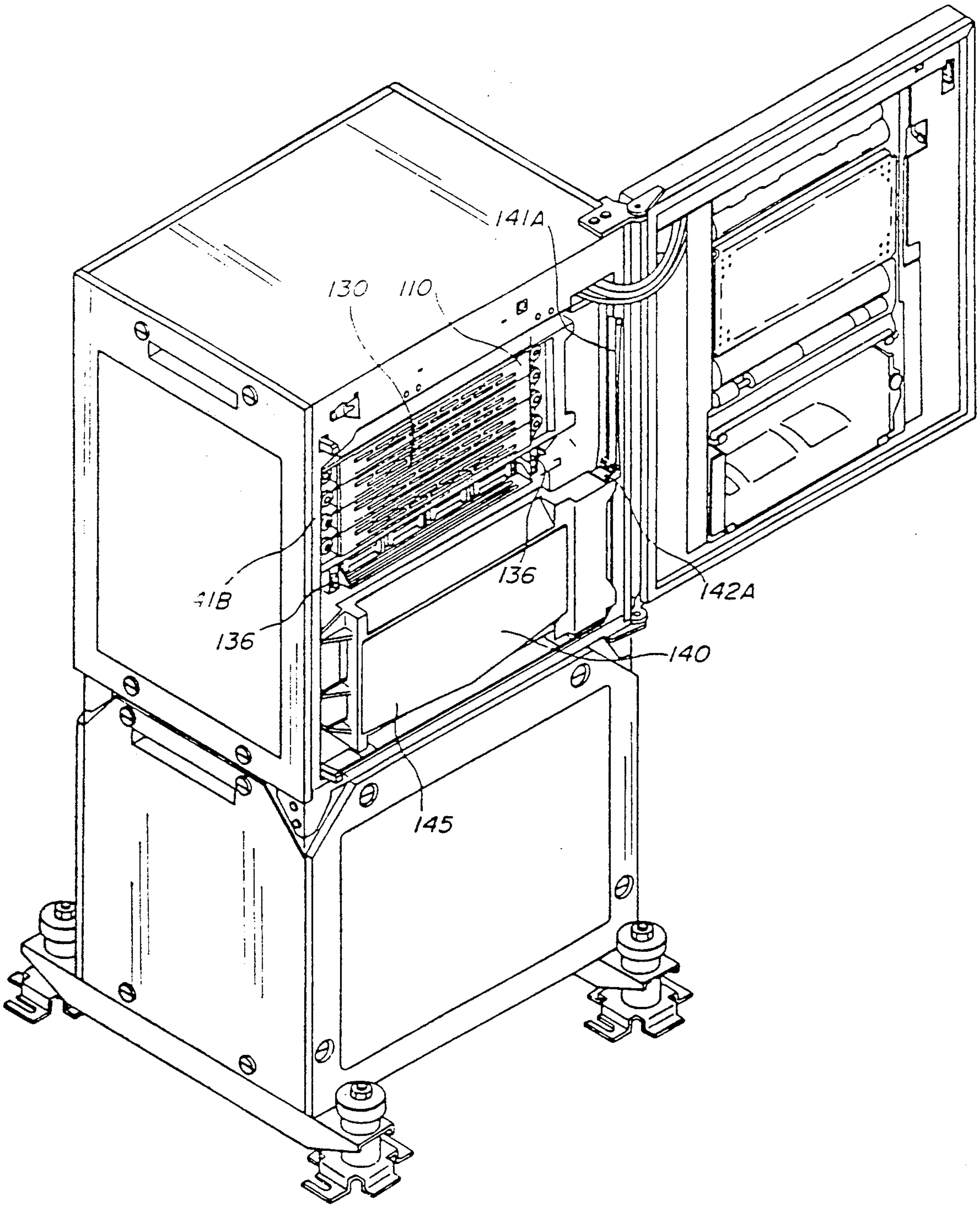
FIGS. 28 and 29 are views showing a cap respectively in the open and closed states with respect to a cap cover.
Figure 29:
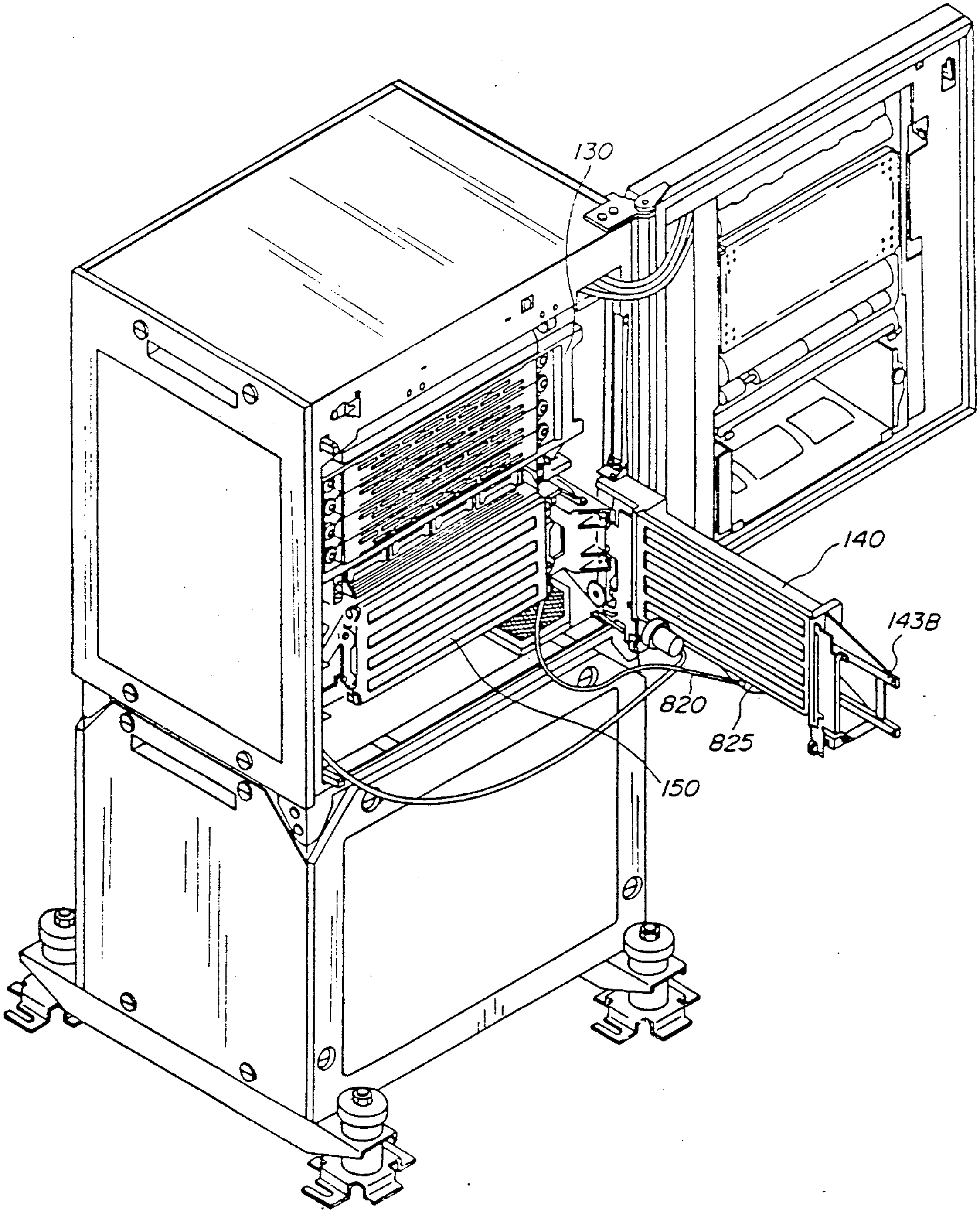

FIGS. 28 and 29 respectively show the closed and open states of the cap 140, with respect to the cap cover 150. Rails 141A and 141B guide the vertical movement of the cap 140. A hold member 142A holds the cap 140 such that it is pivotal about a vertical axis along the rail 141A. A member 143B engages or disengages with a slide member on the rail 141B. A waste ink reservoir 825 is arranged below the cap 140 and the tube 820 is connected to the reservoir 825.

With the arrangement described above, during a maintenance operation of the cap 140 or the like, a sufficient working area can be provided and the maintenance operation is facilitated. In addition, according to this embodiment, since the cap 140 is pivotal about a vertical axis, contamination of the head nozzle by mixing of the different colored inks at the cap can be prevented.

Referring to FIGS. 28 and 29, a cap rear surface 145 is engageable with the cam surface 342B of the pinch roller side plate 342 previously described. When the units 100 and 300 are connected with the pinch rollers 330 separated from the roller 320, the lower paper feed mechanism is closed upon downward movement of the cap 140.

(2) Cap Cover

Figure 30:
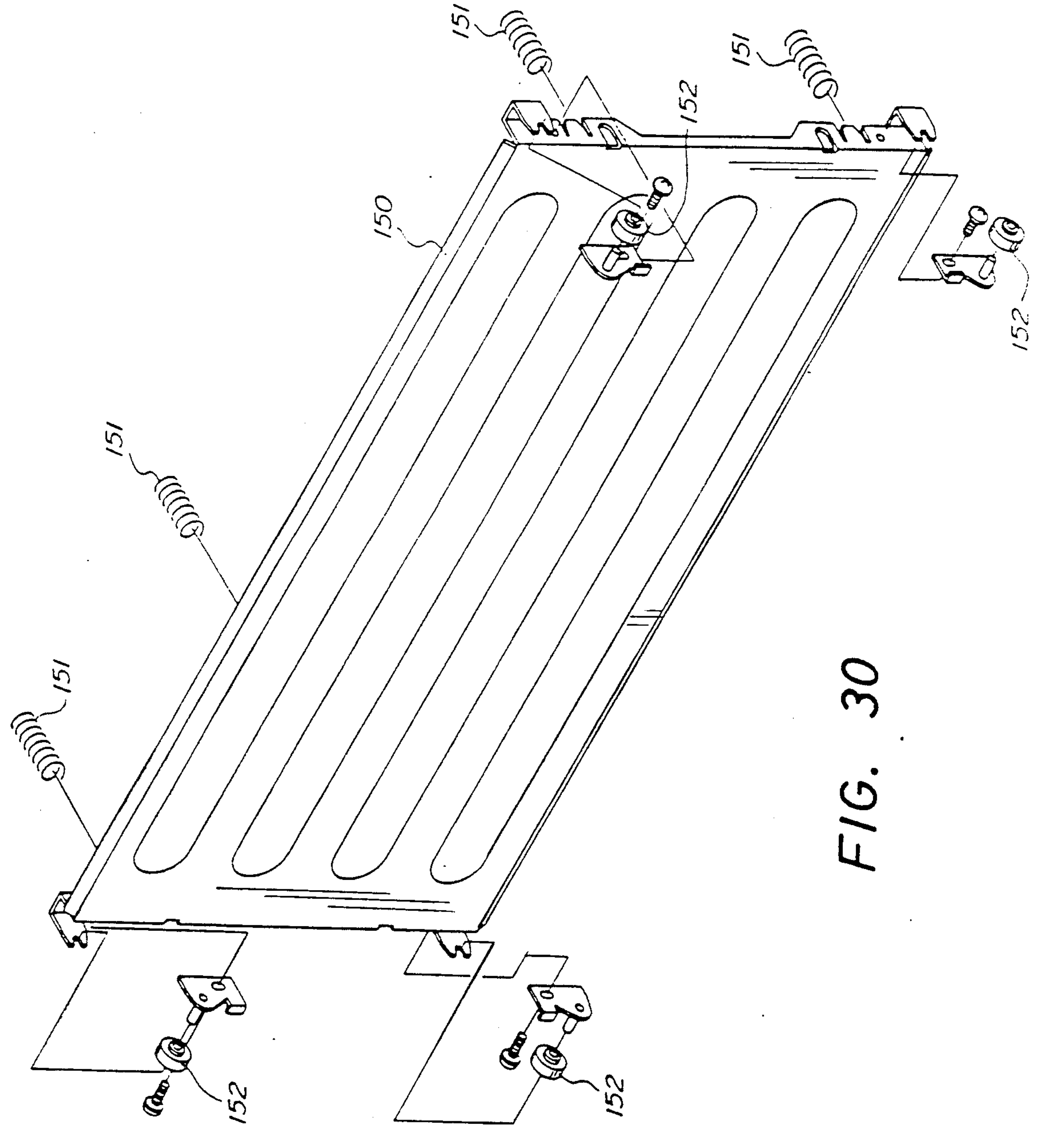
FIGS. 30 and 31 are perspective views showing an example of the cap cover.
Figure 31:
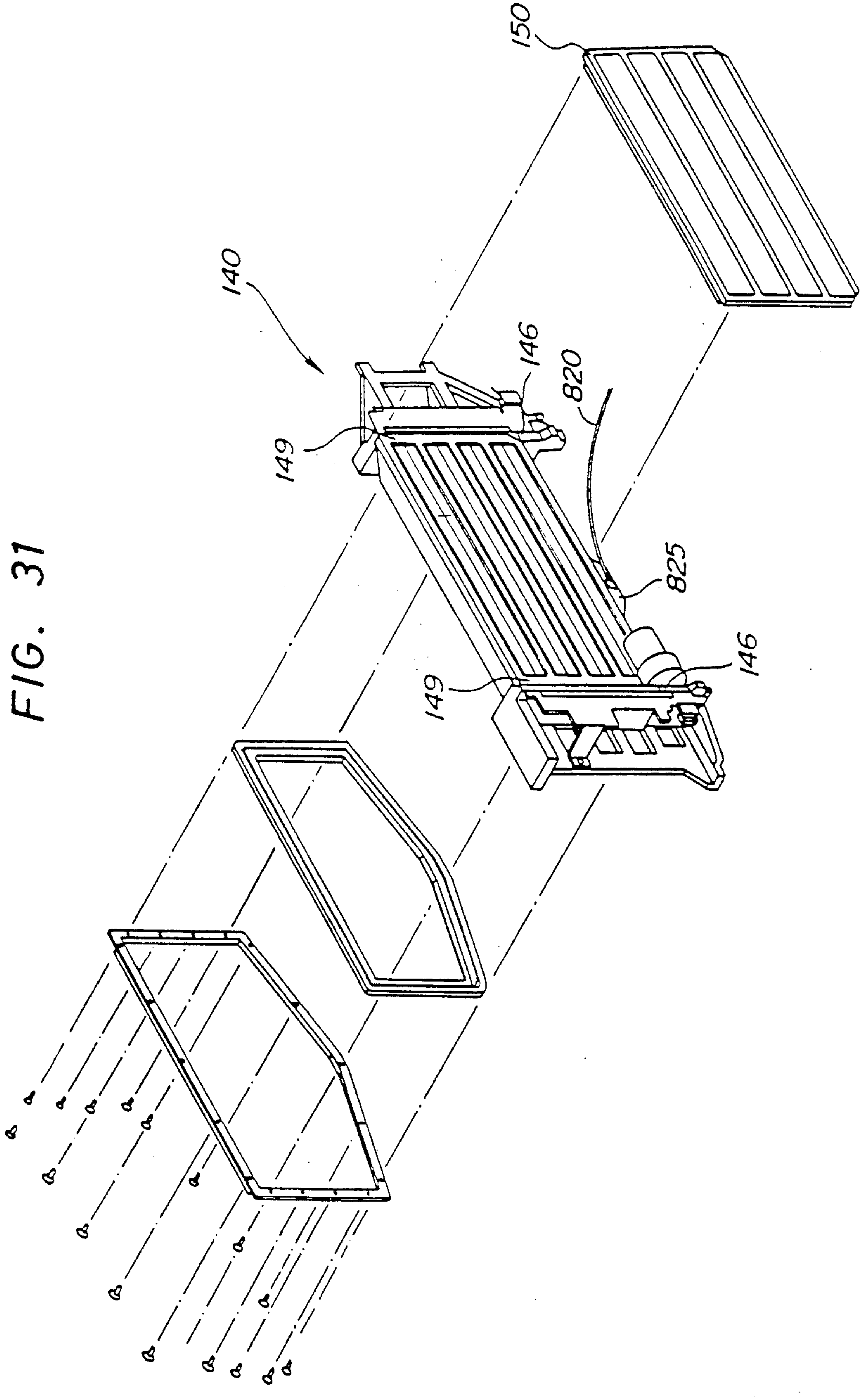

FIG. 30 is a perspective view showing an example of the construction of the cap cover 150, and FIG. 31 is a view showing the coupling relationship between the cap cover 150 and the cap 140. Springs 151 normally apply a biasing force to the cap cover 150 toward the cap 140. Rollers 152 are engageable with a portion 149 on the front surface of the cap 140.

Rollers 152 and the portion 149 are disengaged from each other when the cap 140 faces the cap cover 150. The cover 150 is moved toward the cap 140 by the biasing force of the springs 151, and the cap 140 is covered with the cap cover 150. Thus, the cap 140 is protected from dust or becoming dried out.

When the cap 140 is moved, the rollers 152 ride on the portion 149, and the cover 150 is withdrawn against the biasing force of the springs 151. Therefore, the cover 150 does not prevent movement of the cap 140.

(3) Capping of Head Unit

Figure 32:
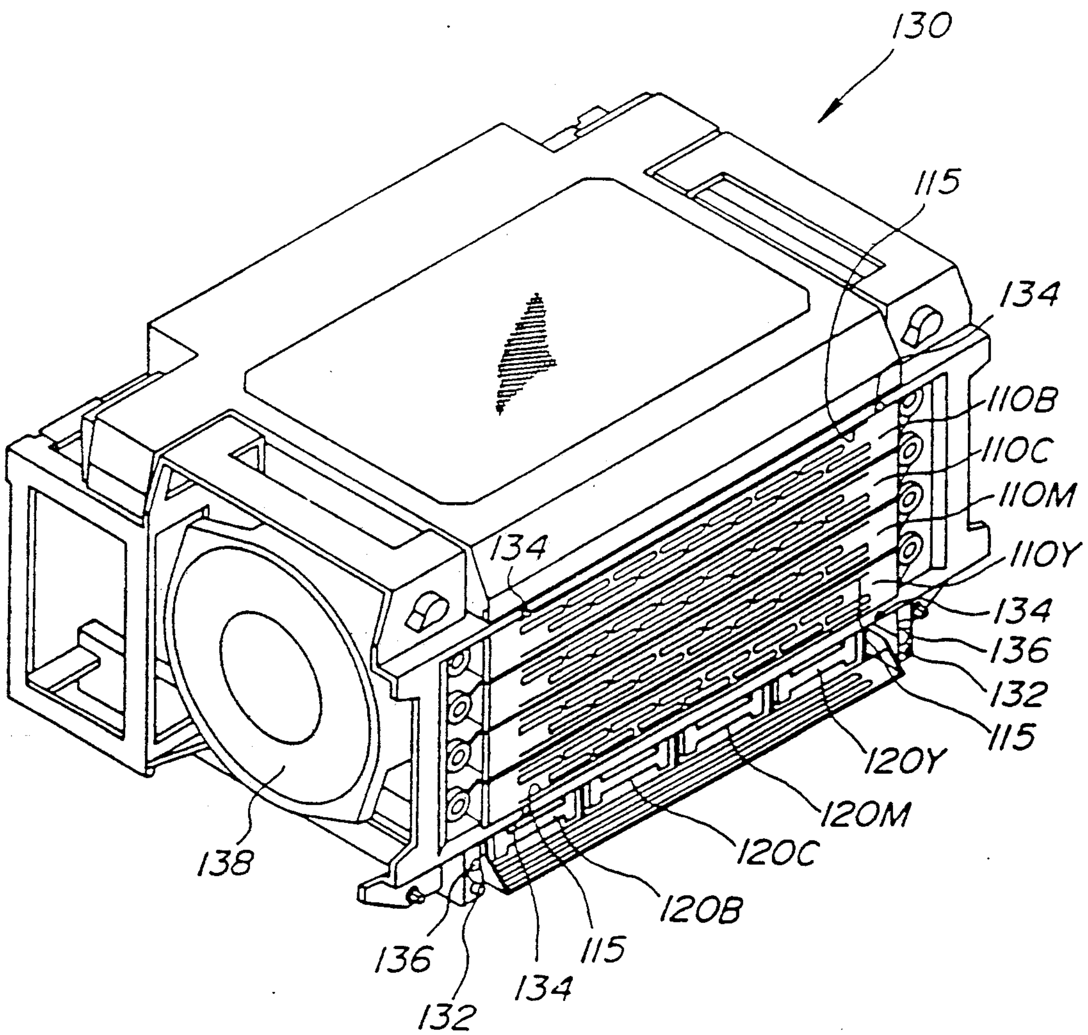
FIG. 32 is a view showing an example of the construction of a head assembly.

Capping processing of the head unit 110 can be performed following the procedures to be described later with reference to FIG. 38. In order to obtain a proper and stable engagement at the cap position, in this embodiment, recesses 146 are formed in the front surface of the cap, as shown in FIG. 31, and projections 136 which fit in the recesses 146 are formed in the head unit 110, as shown in FIG. 32. Since the head assembly 130 is biased toward the cap, as will be described later, when the cap 140 faces the head unit 110, the projections 136 fit into the recesses 146 and movement of the cap 140 in this position is prevented. Therefore, the cap 140 can be reliably and accurately positioned with respect to the head unit 110, and a proper recovery treatment can be performed.

3.5 Recording Head Assembly

FIG. 32 shows an example of the construction of the recording head assembly 130. As shown in FIG. 32, the assembly 130 has projections 132 engageable with the reference surface 306B, projections 134 engageable with the front surface of the platen 392, and projections 136 which fit into recesses 146 in the cap 140. A fan 138 backs up vacuum suction of the recording paper P to the platen 392 by the fans 390F.

Figure 33:
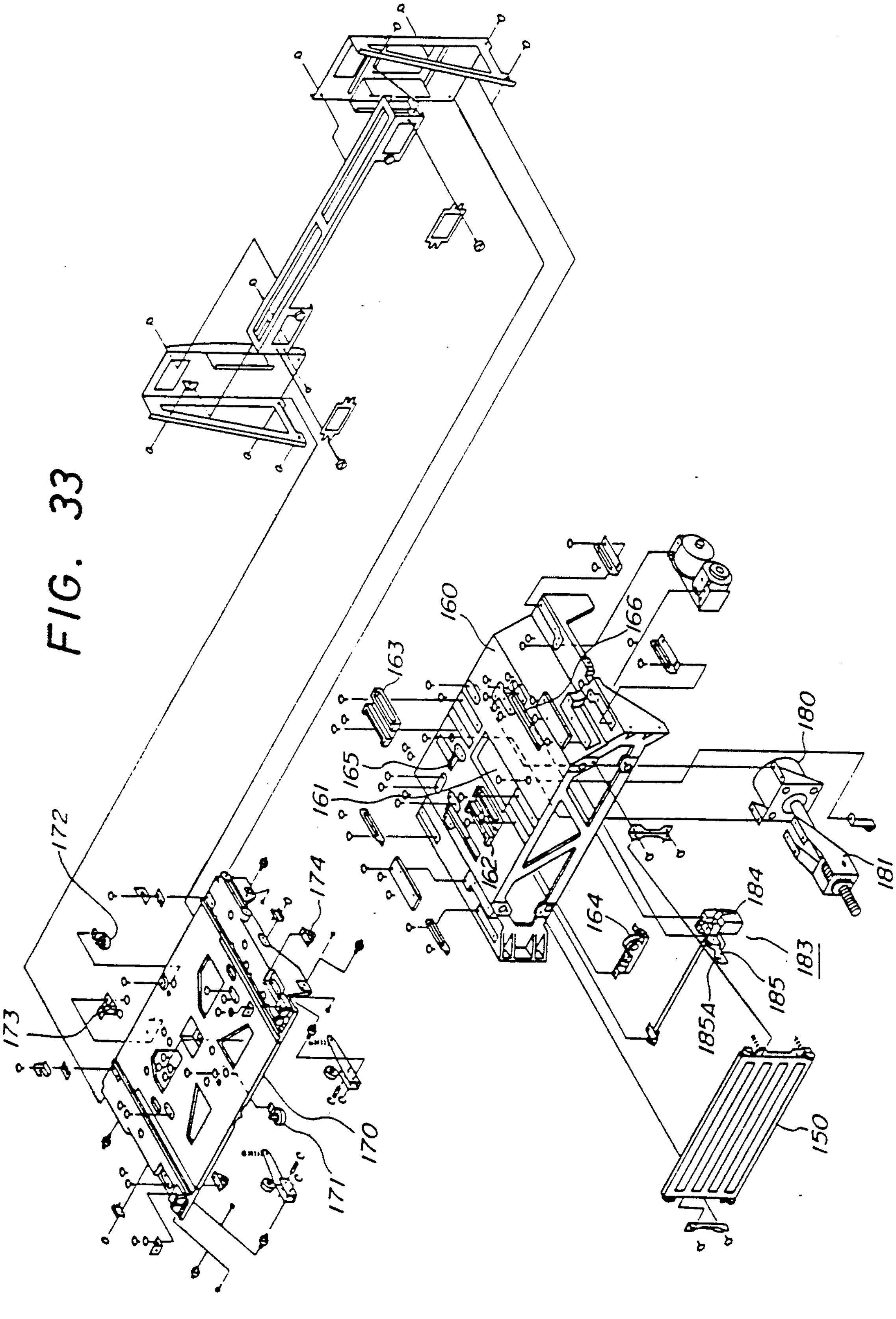
FIG. 33 is an exploded view of a support structure for a recording head assembly in a recording system unit.

The head assembly 130 is mounted on a movable base shown in FIG. 33.

3.6 Support Structure of Recording Head Assembly 130 in Recording System Unit FIG. 33 shows an exploded state of the support structure of the recording head assembly 130 inside the recording system unit 100. A movable base 170 is movable with respect to a stationary base 160. The recording head assembly 130 is fixed on the movable base 170.

A drive mechanism 180 including a motor (pulse motor) for driving the movable base 170 is fixed to the lower surface of the stationary base 160. A screw is fixed to the distal end of the motor shaft through a universal joint. A guide mechanism 181 for converting motor rotation to linear movement is coupled to the screw. The guide mechanism 181 projects upward from an opening 161 formed at substantially the center of the stationary base 160. A part of the projecting guide mechanism 181 is mounted on a lower portion of the movable base 170. Therefore, the movable base 170 is moved by the drive mechanism 180 through the guide mechanism 181.

The drive mechanism 180 is positioned with respect to the stationary base 160 such that the movable base 170 moves in a direction perpendicular to the recording surface (in the set mode) in the paper feed unit 300. The guide mechanism 181 is mounted on the movable base 170.

Guide rails 162 and 163 are fixed on the front and back of the opening 161 in the upper surface of the stationary base 160. The direction of these rails 162 and 163 coincides with the moving direction of the movable base 170. Guide rollers 171 and 172 having vertical shafts are mounted on the front and back of the lower surface of the movable base 170. The front guide roller 171 is located inside the front guide rail 162, and the rear guide roller 172 is located inside the rear guide rail 163, so that movement of the movable base 170 is regulated by these guide rails and guide rollers and the movable base 170 is moved on a predetermined path.

A first receiving roller 164 is arranged below the stationary base 160, and its upper portion projects upward through an opening 165. The axis of the roller 164 coincides with the moving direction of the movable base 170. A second receiving roller 173 is fixed to the lower surface of the movable base 170 so that it faces the first receiving roller 164 during the forward movement of the movable base 170 (forward movement up to a recording start position). The axis of the roller 173 is perpendicular to the axis of the first receiving roller 164. The front width of the front guide rail 162 is substantially equal to the diameter of the front roller 171. The rear width of the rear guide rail 163 is substantially equal to the diameter of the rear roller 172, and its front width is larger than the diameter of the rear roller 172. In the forward movement of the movable base 170, the front guide roller 171 is located at the front portion of the front guide rail 162, and the rear roller 172 is located at the front portion of the rear guide rail 163. Therefore, the movable base 170 can oscillate in a horizontal plane about the front roller 171. Since in this case the second receiving roller 173 on the movable base side is located on the first receiving roller 164 on the stationary base side, the oscillating movement of the base 170 is further facilitated. Upon this oscillating movement of the base 170, positioning of the assembly 130 with respect to the side reference surface of the paper feed unit by the positioning front surface portion of the recording head assembly 130 fixed to the movable base 170 can be performed easily and smoothly.

Figure 34:
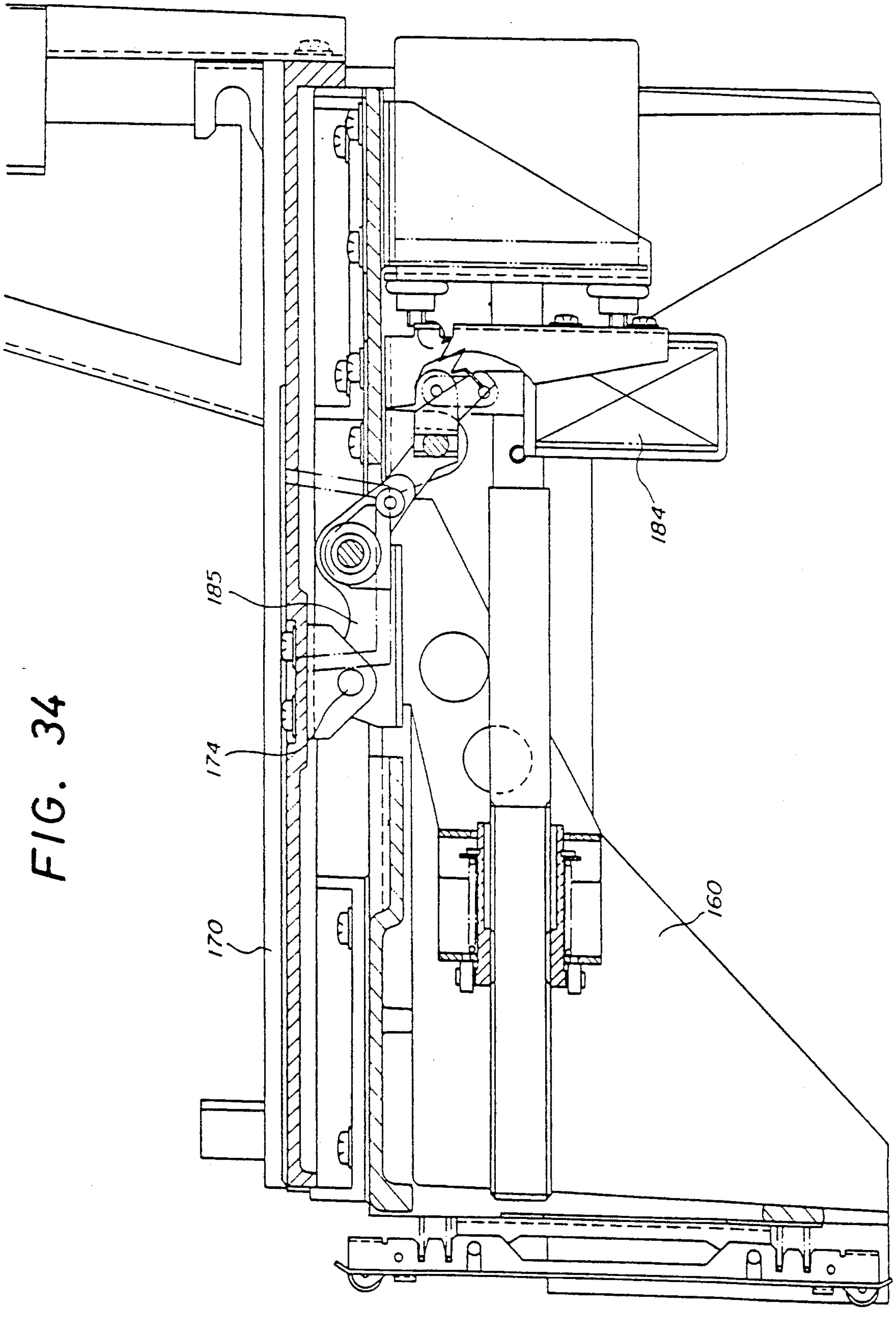
FIG. 34 is a sectional view showing an example of the coupled state between a stationary table and a movable table.

As shown in FIG. 34, a lock mechanism 183 for fixing the movable base 170 with respect to the stationary base 160 during reverse movement of the base 170 is fixed to the lower surface of the base 160. The lock mechanism 183 has a solenoid 184, and a lock lever 185 driven by the solenoid 184 and pivotal within a vertical plane. The lock lever 185 has a groove 185A at the pivoting distal end. The lock lever 185 projects to the upper side of the base 160 through the opening 166 formed in the base 160. An engaging pin 174 is fixed to the lower surface of the movable base 170. The engaging pin 174 is positioned such that it is located immediately above the pivoting distal end of the lock lever 185 during reverse movement of the movable base 170. Thus, during the reverse movement of the movable base 170, the solenoid 184 is actuated and the engaging pin 174 on the side of the movable base 170 is engaged with the groove 185A at the pivoting distal end of the lock lever 185. With this arrangement, the movable base 170 (and hence the recording head assembly 130) is reliably and securely supported by the stationary base 160 (e.g., the recording head assembly 130 is reliably fixed to the recording head unit 110 during transportation of the apparatus).

When the recording head unit 110 and the paper feed unit 300 are connected during the forward movement of the movable base 170, the oscillating movement of the base 170 serves to reliably abut the positioning projections 132 on the front surface of the recording head assembly 130 against the reference surface 306B of the paper feed unit 300. In this state, the platen 392 is spring-pressed against the projections 134 similarly arranged on the front surface of the head assembly 130. Thus, the recording surface of the recording paper P regulated by the platen 392 is reliably positioned with respect to the nozzle of the assembly 130.

4. Configuration of Control Section

Figure 35:
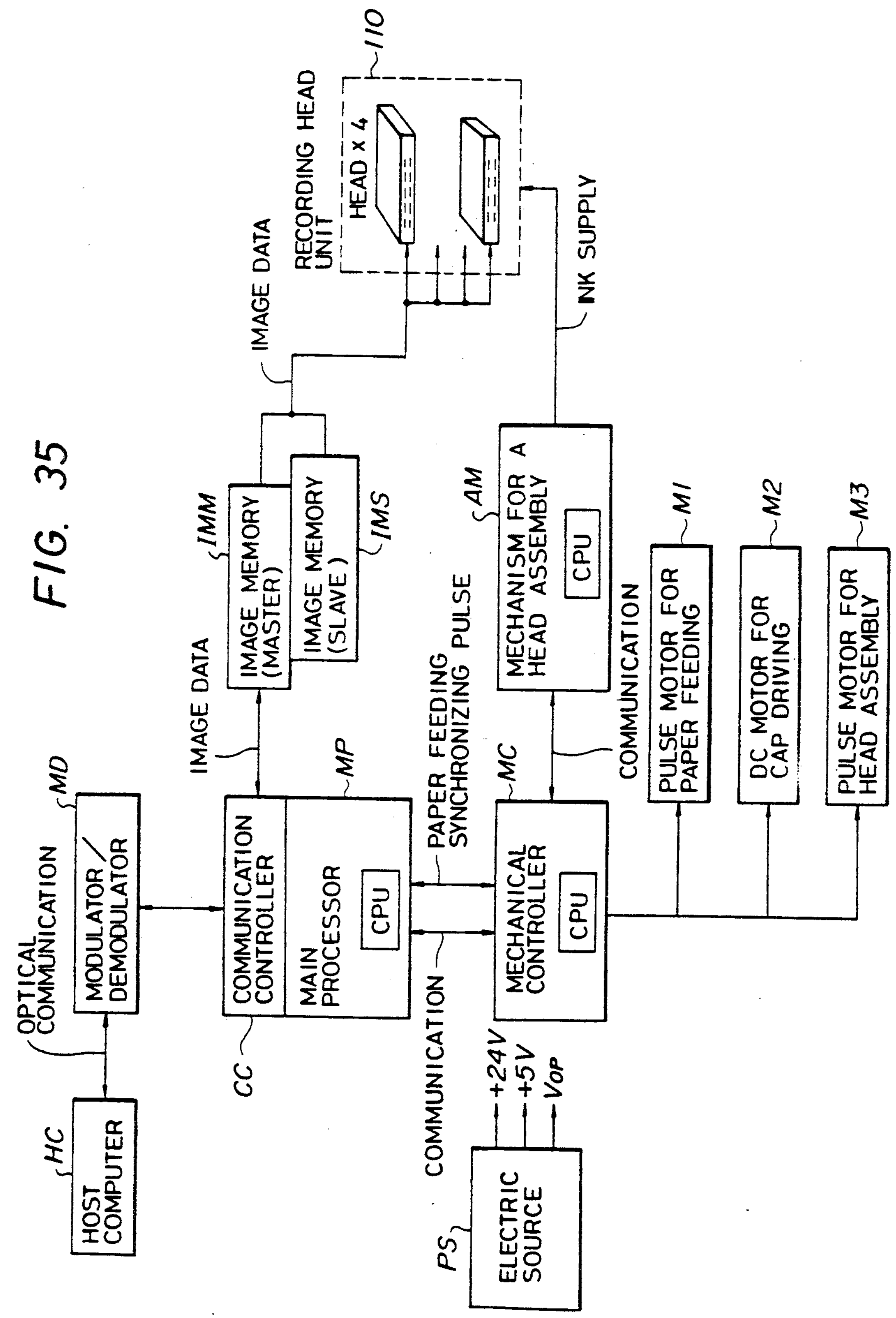
FIG. 35 is a block diagram showing an example of the electrical configuration of the overall image formation apparatus according to the present invention.

FIG. 35 is a block diagram showing the electrical configuration of the overall apparatus according to the present invention. Referring to FIG. 35, a host computer HC supplies image data to be printed through an optical fiber.

A modulator/demodulator MD performs conversion between photosignals and electrical signals.

A communication controller CC extracts only image data from data signals supplied from the host computer HC and supplies the image data to image memories IMM and IMS.

A main processor MP controls the overall apparatus and includes a CPU.

A mechanical controller MC includes a CPU. The mechanical controller MC performs communication with a head assembly mechanism to be described later, and also performs control operation of a pulse motor M1 for feeding fan fold paper, a DC motor M2 for vertically moving the cap, and a pulse motor M3 for horizontally (front-to-back) moving the head assembly.

The recording head unit has four recording heads (Y, M, C and B) which form an image on recording paper (fan fold paper) in accordance with image data supplied from the image memories IMM and IMS. Ink supply and recovery for each head is performed under the control of a head assembly mechanism AM.

In this embodiment, the respective blocks described above are assembled on separate printed circuits boards.

The image memories (master and slave memories) IMM and IMS have a total memory capacity of 1 megabyte.

The operation of the apparatus upon ON operation will be described briefly with reference to FIG. 36.

When power is supplied to the apparatus (step S1), the respective units having CPUs (MP, MC, and AM in FIG. 35) respectively perform various hardware checks including memory and port checks (step S2).

The main control of the apparatus is shifted to the main processor MP, and various system error checks including the following items are performed (step S3):

(1) Supply of recording paper
(2) Supply of ink
(3) Open/closed state of the door
(4) Mounting state of the recording head unit 110

When a "no error" state is confirmed (step S4), the ON LINE mode is set and communication with the host computer HC can be started (step S5).

When the amount of image data sent from the host computer HC and stored in the image memories IMM and IMS reaches a predetermined amount, the cap is moved down and the head assembly is moved forward to the printing position to perform printing (image formation) (step S6). During printing, further image data is received from the host computer HC (i.e., the image write and read is performed non-synchronously). This printing operation is continued unless an error occurs (step S7).

When a specific switch is depressed in the ON LINE mode in step S5, the apparatus is disconnected from the host computer HC and the OFF LINE mode is set (step S8).

Test printing, to be described in detail below, is then performed (step S9). The test pattern to be used in test printing is stored in a ROM (not shown). When a predetermined amount of the test pattern is printed, test printing is automatically stopped. In order to reset the apparatus in the ON LINE mode, the switch is depressed again (step S8 to S5).

When an error is detected in step S7, the apparatus is set in the OFF LINE mode (step S10). Such errors include paper jam, short supply of recording paper, and short supply of ink. When the cause of the error is removed (step S11), a specific reset switch is depressed to reset the apparatus in the ON LINE mode (step S12).

Figure 37:
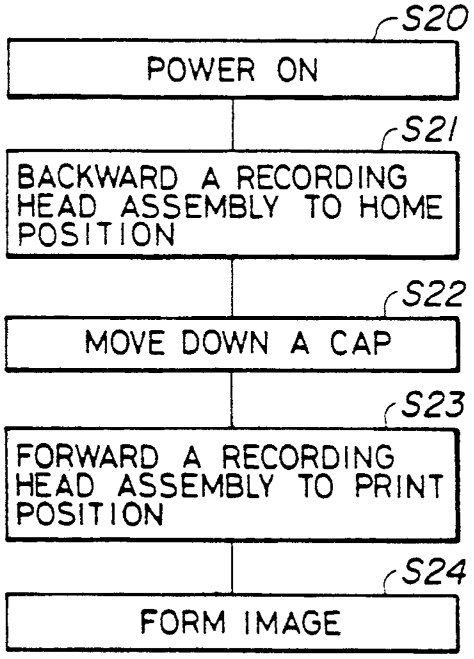

FIG. 37 is a flow chart for explaining the mode of operation of the apparatus when normal printing is performed.

When power is turned on (step S20), the recording head assembly is withdrawn to the home position (step S21) and the cap is moved downward (step S22). Thereafter, the recording head assembly is moved forward by the pulse motor, and stopped at the printing position corresponding to a preset number of pulses (step S23).

Head control for printing is then performed (step S24).

Figure 38:
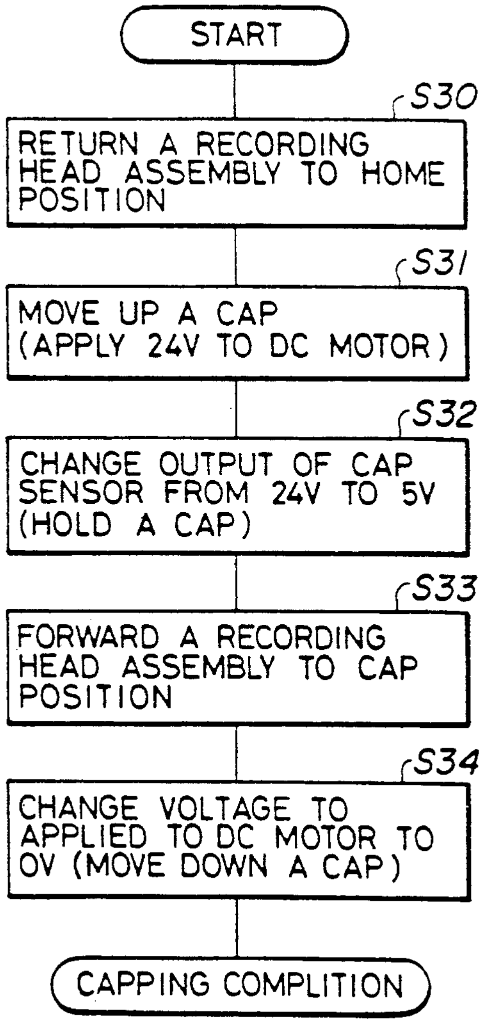

FIG. 38 is a flow chart showing the control sequence for covering the cap on the front surface of the recording head assembly.

The recording head assembly is withdrawn to the home position. When the assembly reaches the home position, a predetermined output is obtained from the home position sensor (step S30).

A voltage of +24 V is applied to the DC motor for cap drive to move the cap upward (step S31).

When the cap is moved upward and a sensor output indicates that the cap has reaches a predetermined position, the application voltage on the DC motor is changed to +5 V (step S32). Then, the cap is balanced with the DC motor torque and stopped.

Thereafter, a predetermined number of pulses are supplied to the recording head assembly drive pulse motor so as to move the assembly to the cap position (step S33).

Since the distal end of the recording head assembly is projected into the cap, the DC motor for driving the cap is disconnected from the power source (step S34). Thus, the cap is moved down by its own weight and engages with the recording head assembly. In this way, the capping operation is completed.

Communication between the host computer or host system and the image formation apparatus according to the present invention will be described below.

Data Format and Type (1) Command Data

Command data exchanged between the host system and the image formation apparatus includes:

Type 1 (No operand)

<FLAG><CLASS><N><CMD><FCS><FLAG> (N=1)

Type 2 (With operand)

<FLAG><CLASS><N><CMD><OPR><FCS><FLAG> (N=2)

Command data types sent from the host system to the image formation apparatus are shown in the following Table 7.

TABLE 7

| MEANING | CODE | OPERAND |
|---|---|---|
| start print | P | print speed |
| stop print | E | — |
| top of form | H | — |
| feed | F | — |
| status request | M | — |
| send command again | N | — |
| transmission error | W | — |
| initialize system | I | — |

Command data types sent from the image formation apparatus to the host system include are shown in the following Table 8.

TABLE 8

| MEANING | CODE | OPERAND |
|---|---|---|
| command/data received | A | status information |
| send command again | N | — |
| protocol error | X | status information |

(2) Image Data

The format of the image data is as follows:

<FLAG><CLASS><N><DH><yellow image data(111 words)><DT>
<DH><magenta image data(111 words)><DT>
<DH><cyan image data(111 words)><DT>

-continued

| |
|---|
| <DH><black image data(111 words)><DT><FCS><FLAG> |

(N = 452)

TABLE 9

| SYMBOL | NAME | DESCRIPTION | LENGTH |
|---|---|---|---|
| <FLAG> | : flag | = 10000001B | 1 Byte |
| <CLASS> | : class | 'C' = command, 'D' = data | 1 Byte |
| <N> | : data length | Data length (unsigned integer) in units of words from a position immediately after <N> to a position immediately before <FCS>. | 2 Bytes |
| <CMD> | : command data | 1st byte = 0, 2nd byte = command data | 2 Bytes |
| <OPR> | : operand | | 2 Bytes |
| <DH> | : data header | = 8000H | 2 Bytes |
| <DT> | : data terminator | = 0001H | 2 Bytes |
| <FCS> | : frame check sequence | 2's complement of the data sum of units of words from <N> (including it) to a position immediately before <FCS>. | 2 Bytes |

Communication Protocol

(1) Status

Before sending the command data and image data, the host system must send a status request command so as to check the status of the image formation apparatus. The host system need not send a status request command before sending specific command data ('M', 'N', 'W') such as a status request.

The status word consists of 16 bits and has the meanings described in the following Table 10.

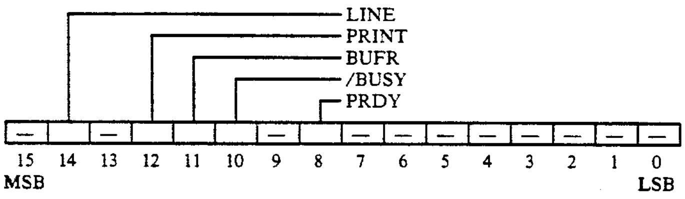

TABLE 10

| Bit | Meanings |
|---|---|
| 14 LINE | ON LINE mode when "1", and OFF LINE mode when "0". |
| 12 PRINT | Printing in progress when "1". |
| 11 BUFR | When "0", since image buffer for temporarily storing image data is full, no further data from host system can be received |
| 10 /BUSY | When "0", processing in progress in response to command or depression of a switch. |
| 8 PRDY | When "1", image data, E command, and F command can be received. |

Which bit of the status is to be checked is different in each command. The following Table 11 shows the states of the respective bits of the status words when execution of commands and image data input are enabled.

TABLE 11

| COMMAND/DATA | CLASS (C or D) | CODE | OPERAND | STATUS LINE | PRINT | BUFR | $\overline{\text{BUSY}}$ | PRDY |
|---|---|---|---|---|---|---|---|---|
| start print | 'C' | 'P' | print speed | 1 | 0 | — | 1 | — |
| stop print | 'C' | 'E' | — | 1 | 1 | — | — | 1 |
| top of form | 'C' | 'H' | — | 1 | 0 | — | 1 | — |
| feed | 'C' | 'F' | — | 1 | 1 | — | — | 1 |
| status request | 'C' | 'M' | — | — | — | — | — | — |
| send command again | 'C' | 'N' | — | — | — | — | — | — |
| transmission error (initialize) | 'C' | 'W' | — | — | — | — | — | — |
| initialize system | 'C' | 'I' | — | 1 | — | — | — | — |
| image data | 'D' | — | print data (4 colors) | 1 | 1 | 1 | — | 1 |

(2) Command Data

Figure 44:
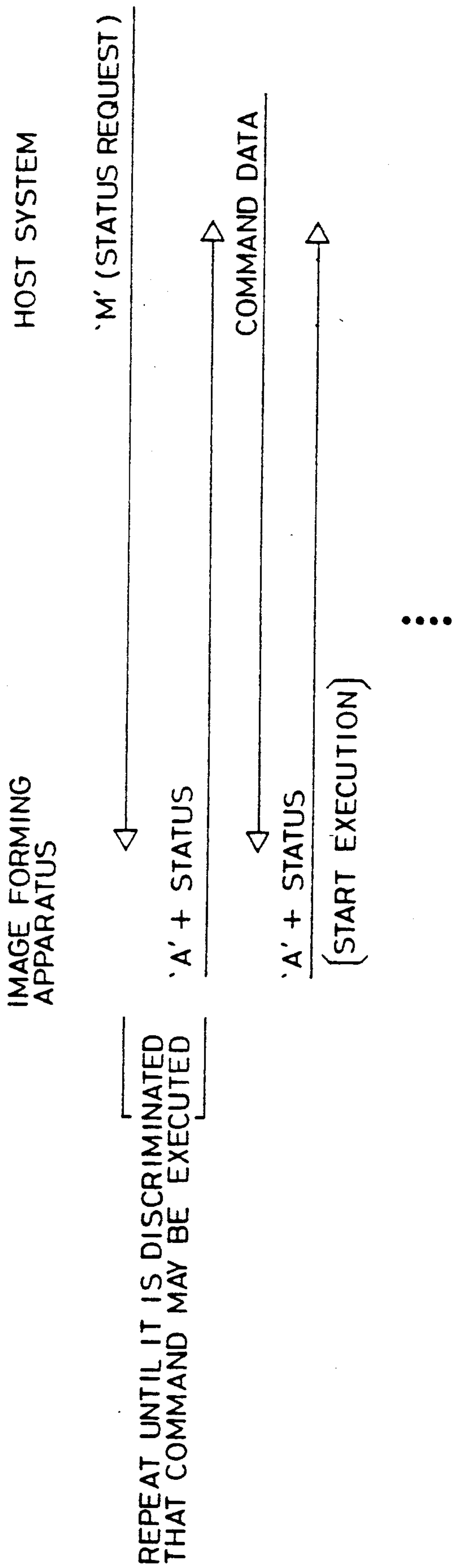
FIG. 44 is the protocol for command data reception.

The protocol for command data reception is as shown in FIG. 44.

(3) Image Data

Figure 45:
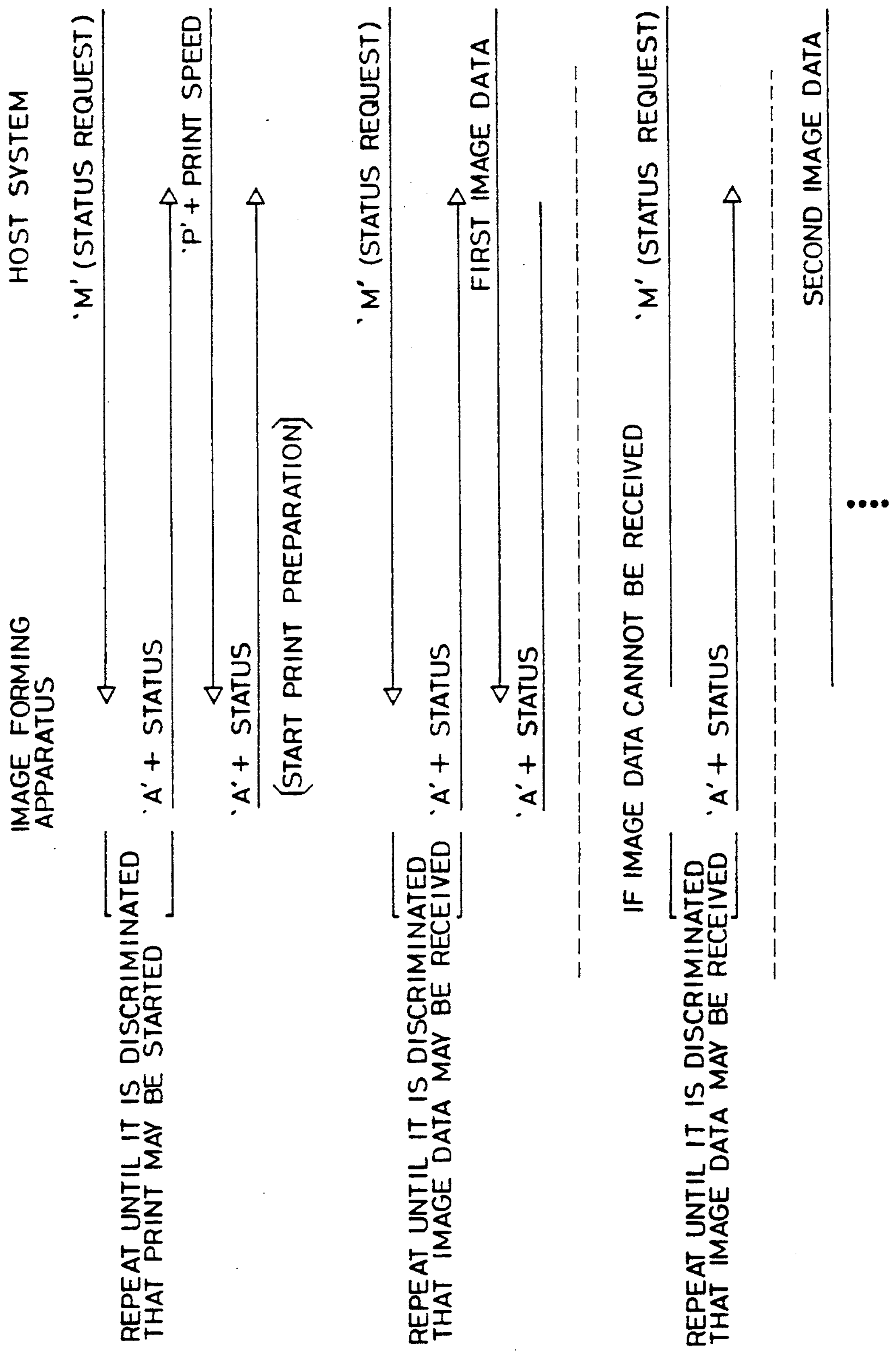
FIG. 45 is the protocol for the reception of a print start command to reception of image data.

The protocol for the reception of a print start command to reception of image data is as shown in FIG. 45.

Communication Error

Figure 46:
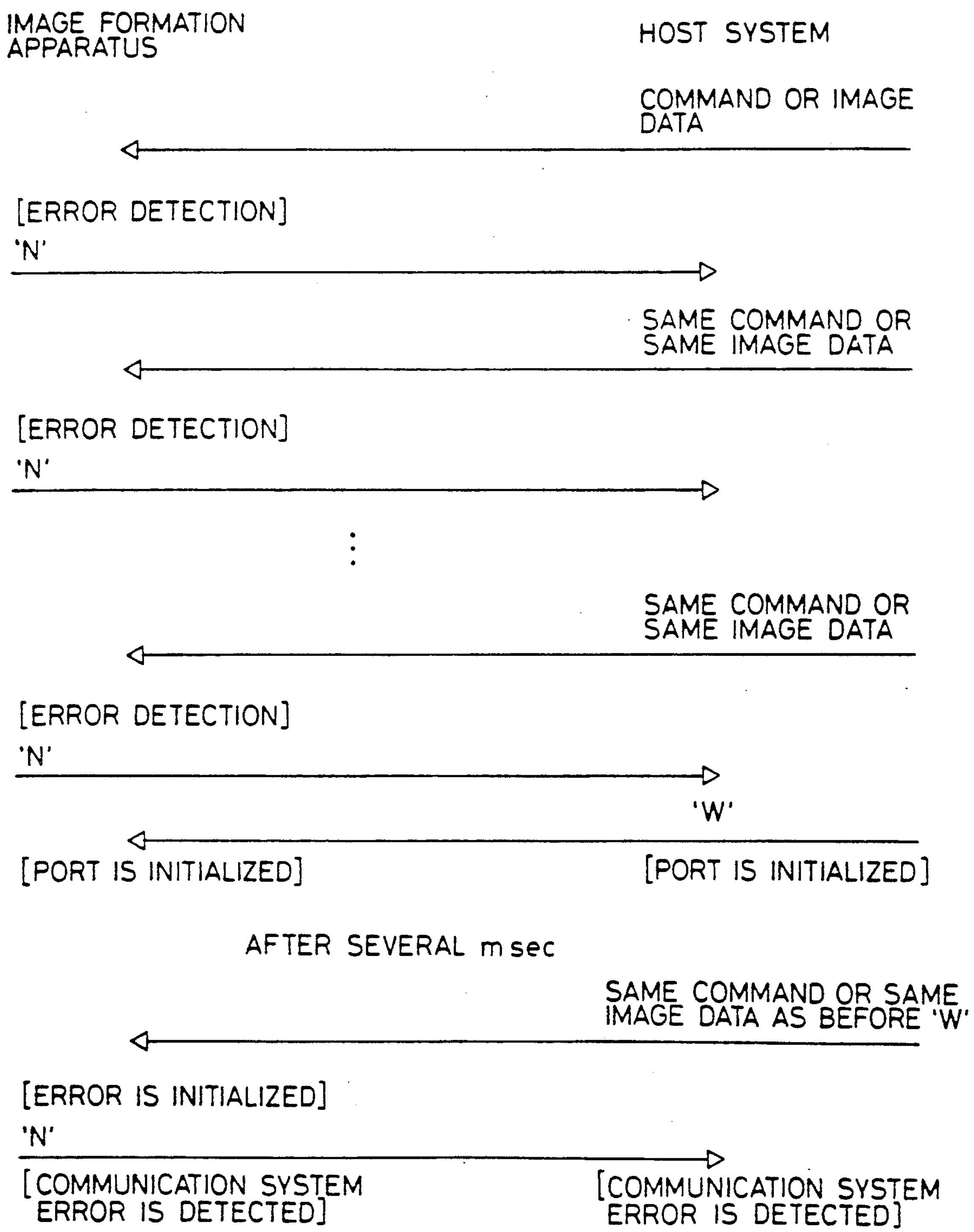
FIG. 46 is the protocol for detection of an error in hardware of the communication system.

When the process shown in FIG. 46 is executed to the end during communication between the host system and the image formation apparatus, the host system determines that there is an error in the hardware of the communication system and recovery processing must be performed.

When Data Transmission Speed Is Lower Than Printing Speed

The image data sent from the host system is temporarily stored in the buffer in the apparatus and is then printed. When the data transmission speed is lower than the printing speed and the buffer becomes empty, printing is interrupted. When more image data is sent and stored in the buffer, printing is resumed. If image data is not stored in the buffer within 3 minutes, the head is capped. When image data is sent and stored in the buffer after the head is capped, printing is resumed.

The types of and countermeasures for errors occurring in the image formation apparatus according to the present invention will be described below.

Paper, Head, Ink (1) Paper Jam

A paper jam occurs during printing or feeding of paper, or a paper jam is detected when the power is turned on.
Error Code: F1
State: OFF LINE mode is set.
Check printing cannot be performed.
Countermeasure is described in the following Table 12.

TABLE 12

| Image Formation Apparatus | Operator |
|---|---|
| If printing in progress, printing is stopped immediately. | |
| Error display | Paper feed unit is opened.<br>Bent or torn paper is removed.<br>Paper is reset (see 2.1.(3)) |
| If the paper is correctly set, the error display is stopped. | Paper feed unit is closed. |

(2) No Paper

Paper has been used up during printing or feeding of paper, or no paper is detected when the power is turned on.
Error Code: F2
State OFF LINE mode is set.
Check printing cannot be performed.
Countermeasure is described in the following Table 13.

TABLE 13

| Image Formation Apparatus | Operator |
|---|---|
| Error display | FF switch is kept depressed until all the remaining paper is output.<br>Paper feed unit is opened.<br>Paper is set (see 2.1.(3)). |
| If the paper is correctly set, the error display is stopped. | Paper feed unit is closed. |

When no paper is detected during printing, the image data in the buffer is printed first and then printing is interrupted.

(3) Paper Set Error

The paper is not set correctly.
Error Code F3
State: OFF LINE mode is set.
Check printing cannot be performed.

| Countermeasure | |
|---|---|
| Image Formation Apparatus | Operator |
| Paper feed is interrupted (paper feed by FF switch is continued). | |
| Error display | If paper feed unit is closed, it is opened.<br>The upper and lower rollers are opened to remove the paper.<br>Reset paper (2.1.(3)). |
| If the paper is set correctly, the error display is stopped. | Paper feed unit is closed. |

(4) No Ink

Ink is not supplied in an amount sufficient to perform printing.
Error Code: 1,2,3,4 (in the order of B, C, M and Y)
State: OFF LINE mode is set.
Check printing cannot be performed.
Recovery cannot be performed.
Countermeasure is described in the following Table 14.

TABLE 14

| Image Formation Apparatus | Operator |
|---|---|
| Error display | Paper feed unit is opened.<br>Cartridge tank is replaced. |
| When a sufficient amount of ink is supplied from cartridge tank to fixed tank, the error display is stopped. | Paper feed unit is closed. |

(5) Setting Error of Recording Heat Unit

When power is turned on, it is found that no recording head unit is set.
Error code: b1
State: OFF LINE mode is set.
Checking printing cannot be performed.
Recovery cannot be performed.
Countermeasure is described in the following Table 15.

TABLE 15

| Image Formation Apparatus | Operator |
|---|---|
| Error display | Power source switch is turned off. |

Temperature Abnormality

The apparatus has a temperature sensor and has the operation shown in the following Table 16 in accordance with the detected temperature.

TABLE 16

| Temperature | Temperature Range | Operation |
|---|---|---|
| Normal | 15° C. ≦ t <35° C. | Operates normally. |
| Caution | 15° C. < t or | Temperature caution display |

TABLE 16-continued

| Temperature | Temperature Range | Operation |
|---|---|---|
| required | 35° C. ≦ t <54° C. | provided on 7-segment display. P command, CHECK switch not accepted. Printing is not interrupted even if temperature reaches this range during printing. |
| Temperature abnormality | 54° C. ≦ t | Temperature abnormality error is displayed on 7-segment display. P command, CHECK switch not accepted. Printing is interrupted if temperature reaches this range during printing. Operation other than printing (FF switch or the like) can be performed. Printing resumed after temperature returns to normal temperature. |

t: Apparatus Temperature

Power Source

(1) Power Failure

A voltage drop of 115 V AC is detected.

Countermeasure is described in the folloting Table 17.

TABLE 17

| Image Formation Apparatus | Operator |
|---|---|
| Power supply to respective parts in the apparatus is stopped. Completely turned off. (When supply of 115 V AC is recovered, the state immediately before power source is turned on is obtained.) | Power source switch is turned off. |

(2) Overload

A current exceeding the rated current flows from the DC power supply in the apparatus.

Countermeasure is described in the following Table 18.

TABLE 18

| Image Formation Apparatus | Operator |
|---|---|
| Overload lamp inside controller is turned on. Power supply to the respective parts of apparatus is stopped. | Power source switch is turned off. |

The state is different in accordance with the cause of overload.

TABLE 19

| Cause | State |
|---|---|
| +5 V | The system is not started. |
| −5 V | |
| +24 V (motor) | Motor is not driven. |
| Vop | Ink is not ejected. |

(1) Mechanical Controller MC Hardware Error

An error which cannot be recovered has occurred in a mechanical part other than the recording head assembly.

Countermeasure is described in the following Table 20.

TABLE 20

| Image Formation Apparatus | Operator |
|---|---|
| MC hardware lamp is turned on. Supply of 24 V and Vop is stopped. | Power source switch is turned off. |

(2) Head Assembly Mechanism AM Hardware Error

An error which cannot be recovered has occurred in the recording head assembly.

Countermeasure is described in the following Table 21.

TABLE 21

| Image Formation Apparatus | Operator |
|---|---|
| Supply of 24 V and Vop is stopped. | Power source switch is turned off. |

Maintenance of the image formation apparatus according to the present invention will now be described.

Switches in Card Rack

Figure 39:
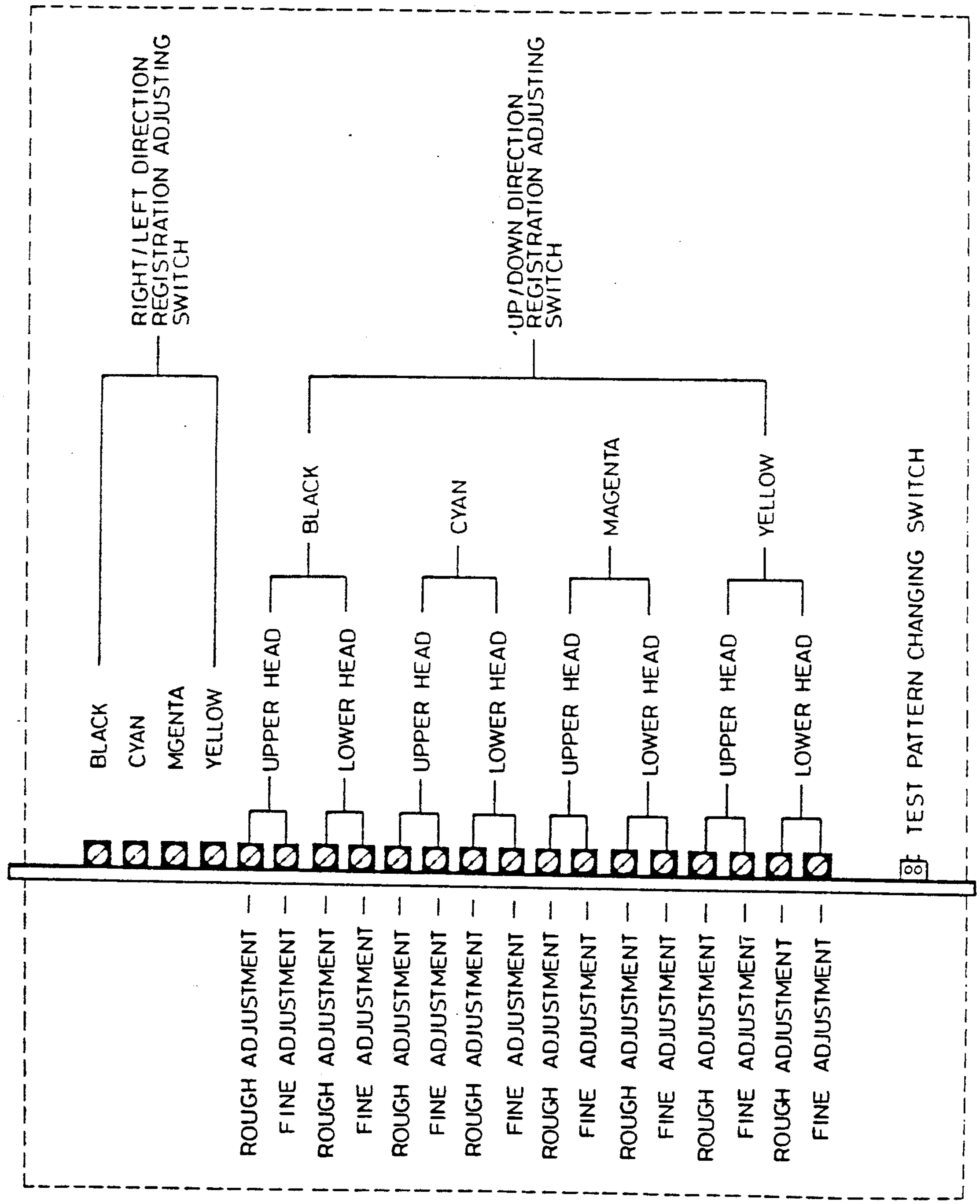
FIG. 39 is a table showing the arrangement of switches.

Switches used for maintenance are arranged on the board in the card rack. The arrangement used is as shown in FIG. 39.

Check Printing

(1) Purpose

Figure 40:
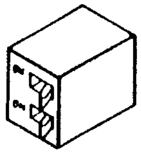
FIG. 40 is a table showing test patterns.
Figure 40:
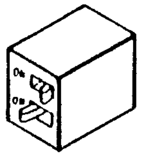
Figure 40:
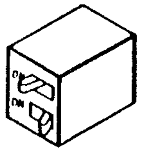
Figure 40:
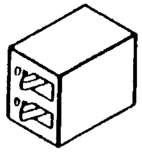

Four test patterns are available for the check printing functions. One of the four test patterns can be selected by a test pattern switch in the card rack. The test patterns are used for the purposes shown in FIG. 40.

(2) Function

Used to confirm that the apparatus is in the following states:

No error is present.

OFF LINE mode is selected.

BUSY lamp is not ON.

Head is capped.

Paper feed unit is closed.

One of the four patterns is selected using the test pattern switch in the card rack.

The CHECK switch on the display panel is depressed.

“C-” is displayed on the display panel, and the BUSY LED is turned on. After about 15 seconds, check printing is started.

After check printing is ended, if the apparatus is in the OFF LINE mode and no error has been produced, normal operation can be continued.

Registration Adjustment

Ink ejection positions of the respective colors are adjusted to eliminate color misregistration. A registration adjustment switch is used to change the ejection position, and printing shift is confirmed by the test pattern (number 0).

(1) Registration Adjustment Switch

A horizontal registration adjustment switch is used to adjust the printing position in a direction (horizontal) perpendicular to the paper feed direction. A vertical registration adjustment switch is used to adjust the printing position in a direction (vertical) parallel to the paper feed direction.

a. Horizontal Registration Adjustment Switch.

One switch is provided for each color.

When the indication value of each switch is increased, the printing position is shifted to the right (when the paper feeding direction is upward). When the indication value of each switch is decreased, the printing position is shifted to the left (when the paper feeding direction is downward).

Adjustment can be made in units of $\frac{1}{8}$ mm and within a range of $-\frac{7}{8}$ mm to $+\frac{7}{8}$ mm.

b. Vertical Registration Adjustment Switch

Each color head is vertically divided into two parts. For each color, therefore, two adjustment switches are provided for the upper and lower heads, respectively. The switch for the upper head does not influence the printing position of the lower head, and vice versa Each of the switches for the upper and lower heads further consists of two switch elements; one for coarse adjustment (adjustment in units of $\frac{1}{2}$ mm) and the other for fine adjustment (adjustment in units of 1/32 mm).

When the indication value of each switch is increased, the printing position is shifted downward (when the paper feeding direction is upward). When the indication value of each switch is decreased, the printing position is shifted upward (when the paper feeding direction is upward).

Adjustment can be made in units of 1/32 mm and within a range of $-4$ mm to $+(3+31/32)$ mm.

Figure 41:
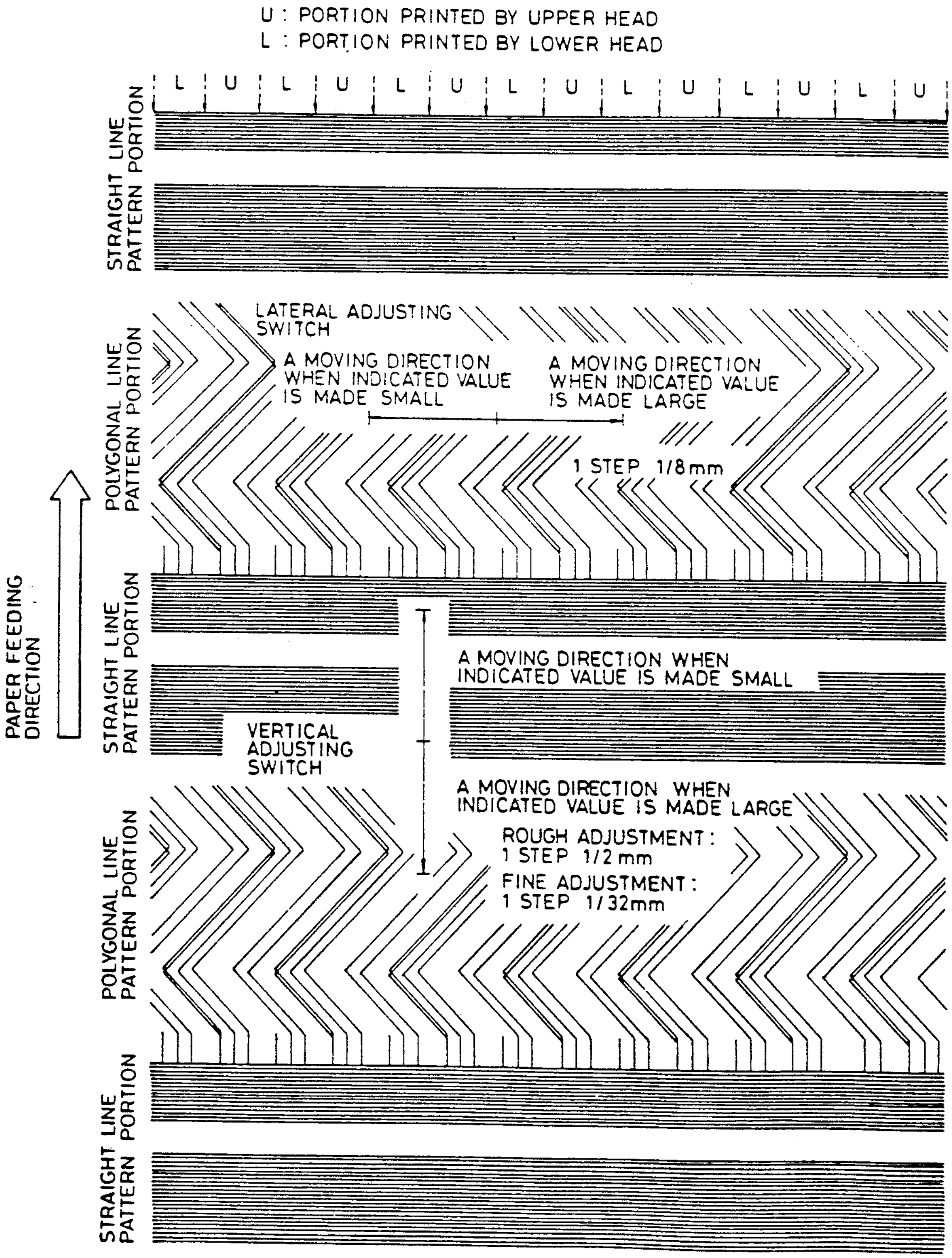
FIG. 41 is a view showing a registration adjustment process.

FIG. 41 shows the above relationship.

(2) Procedures of Adjustment

Step 1

All the horizontal registration adjustment switches are set at a reference position (7).

Step 2

All the vertical registration adjustment switches are set at reference position (coarse adjustment: 8, fine adjustment: 0).

Step 3

The test pattern switch is set at 0.

Step 4

The CHECK switch is depressed to perform check printing.

Step 5

The polygonal line pattern portion of the test pattern obtained in step 4 is checked.

Deviations of the cyan, magenta, and yellow lines from the black line to the right or left are measured.

Step 6

The horizontal registration adjustment switches of cyan, magenta and yellow are operated in accordance with the results obtained in step 5.

For example, if the cyan line is shifted from the black line by 2 dots (2/8 mm) to the left, the cyan horizontal registration adjustment switch is set to 9.

Step 7

The CHECK switch is depressed again to perform check printing. If adjustment is not sufficient, steps 5 and 6 are repeated.

When there is no more horizontal deviation of the lines of the respective colors from the black line, the process advances to step 8.

Step 8

The portion of the test pattern printed by the upper head in step 7 is checked.

Particular portions to be checked are a folded portion of the polygonal pattern, and a linear pattern.

The amounts and directions (upward or downward) of vertical deviations of the cyan, magenta and yellow lines from the black line are measured.

Step 9

The cyan, magenta and yellow color outputs are adjusted by operating the upper head vertical registration adjustment switches in accordance with the results obtained in step 8.

Step 10

The CHECK switch is depressed to perform check printing. If adjustment is still insufficient, steps 8 and 9 are repeated.

When there is no further vertical color misregistration for the portions printed by the upper heads, the process advances to step 11.

Step 11

The portions of the test pattern printed by the lower heads in step 10 are checked.

The amounts and directions (upward or downward) of vertical deviations of the cyan, magenta and yellow lines from the black line are measured.

Step 12

The lower head vertical registration adjustment switches for black, cyan, magenta and yellow are operated in accordance with the results obtained in step 11.

Step 13

The CHECK switch is depressed to perform check printing. If adjustment is not yet satisfactory, steps 11 and 12 are repeated.

Vop Adjustment

The head voltage (Vop) set for ejecting ink is different in each recording head unit (even in each unit for the same color).

Figure 42:
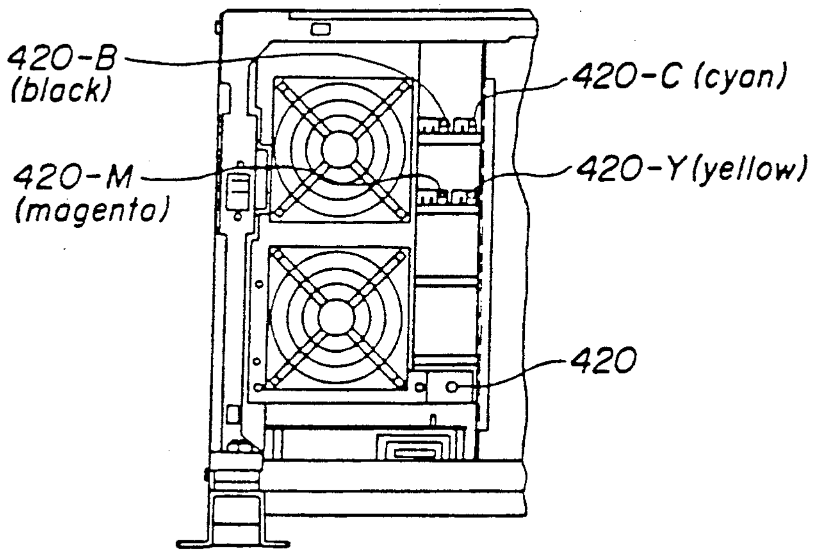
FIG. 42 is a view showing structure near a monitor terminal.
Figure 43:
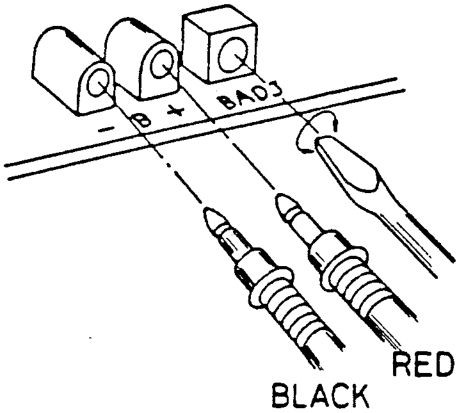
FIG. 43 is a view showing an example of a head voltage adjustment mechanism.

Therefore, when the recording head unit is replaced, Vop adjustment must be performed in the following manner (FIGS. 42 and 43).

Specified digital tester terminals are inserted into Vop monitor terminals of a replacement recording head unit (left (black) −, right (red) +).

While a Vop monitor switch is depressed, the volume is set at a voltage indicated at the upper portion of the recording head unit.

5. Modification of Recording Surface Forming Means

The recording surface positioned with respect to the recording head unit can be formed also in the following manner.

In the example described above, the fan 138 arranged in the assembly 130 is operated to blow air from the assembly 130 to the platen 392 in order to facilitate vacuum suction of the recording paper P toward the platen 392. However, the fan 138 can be operated in a reverse direction so as to draw the recording paper P to the front surface of the assembly 130. In this case, the height of the horizontal linear projections 115 at the upper and lower portions of the recording head is set higher than the height of the recording head. The operation of the fans 390F for drawing the recording paper P to the platen 392 is then stopped. With this arrangement, the recording paper P can be reliably drawn to the front surface of the assembly 130, and the linear projections 115 can keep an optimal distance between the surface of the recording paper P and the recording head. Thus, stable printing on the recording paper P can be performed. The fan 138 is continuously operated, whereas the recording head heater is controlled to keep the temperature in the assembly 130 constant in accordance with the detection result of the temperature sensor in the recording head assembly 130.

In summary, according to the present invention, when the convey system and the recording means are connected, the recording surface regulation member for the recording medium in the convey system can have an optimal positional relationship with the recording means, so that images of high quality can be formed.

What is claimed is:

1. An image forming apparatus comprising:

recording means for recording an image on a recording medium;

means for providing a reference surface;

oscillating means, coupled to said recording means, for oscillating said recording means toward and away from the recording medium, wherein said oscillating means permits said recording means to pivot so as to abut said reference surface following movement of said recording means toward the recording medium by said oscillating means; and fixing means for preventing oscillation of said recording means by said oscillating means and for fixing said recording means with respect to the recording medium only when said recording means is away from the recording medium.

2. An image forming apparatus according to claim 1, wherein said fixing means includes a member coupled to a side of said oscillating means.

3. An image forming apparatus according to claim 1, further including stationary support means engageable with said oscillating means.

4. An image forming apparatus according to claim 3, wherein said stationary support means includes motor means for driving said oscillating means.

5. An image forming apparatus according to claim 3, wherein said fixing means comprises a fixing device coupled to said stationary support means.

6. An image forming apparatus according to claim 5, wherein said fixing means includes a member disposed on said oscillating means and engageable with said fixing device coupled to said stationary support means.

7. An image forming apparatus comprising:

recording means for recording information on a recording medium;

means for providing a reference surface;

stationary support means for supporting said recording means;

oscillating means coupled between said stationary support means and said recording means for oscillating said recording means toward and away from the recording medium, wherein said oscillating means permits said recording means to pivot so as to abut said reference surface following movement of said recording means toward the recording medium by said oscillating means; and fixing means, coupled to said stationary support means, for preventing oscillation of said oscillating means and for fixing said recording means with respect to the recording medium only when said recording means is away from the recording medium.

8. An apparatus according to claim 7, further including motor means coupled to said stationary support means for causing said oscillating means to oscillate.

9. An image forming apparatus according to claim 1, wherein said recording means includes an ink jet recording head.

10. An image forming apparatus according to claim 1, wherein said recording means includes a plurality of full-line type ink jet recording heads.

11. An image forming apparatus according to claim 7, wherein said recording means includes an ink jet recording head.

12. An image forming apparatus according to claim 7, wherein said recording means includes a plurality of full-line type ink jet recording heads.

* * * * *

UNITED STATES PATENT AND TRADEMARK OFFICE

CERTIFICATE OF CORRECTION

PATENT NO. : 5,012,260 Page 1 of 6

DATED : April 30, 1991

INVENTOR(S) : Shigeru Yoshimura, et al.

It is certified that error appears in the above-identified patent and that said Letters Patent is hereby corrected as shown below:

Cover Page:

Attorney, Agent, or Firm: "Fitzpatrick, Cella, Harper, Scinto" should read --Fitzpatrick, Cella, Harper & Scinto--.

Figure 36:
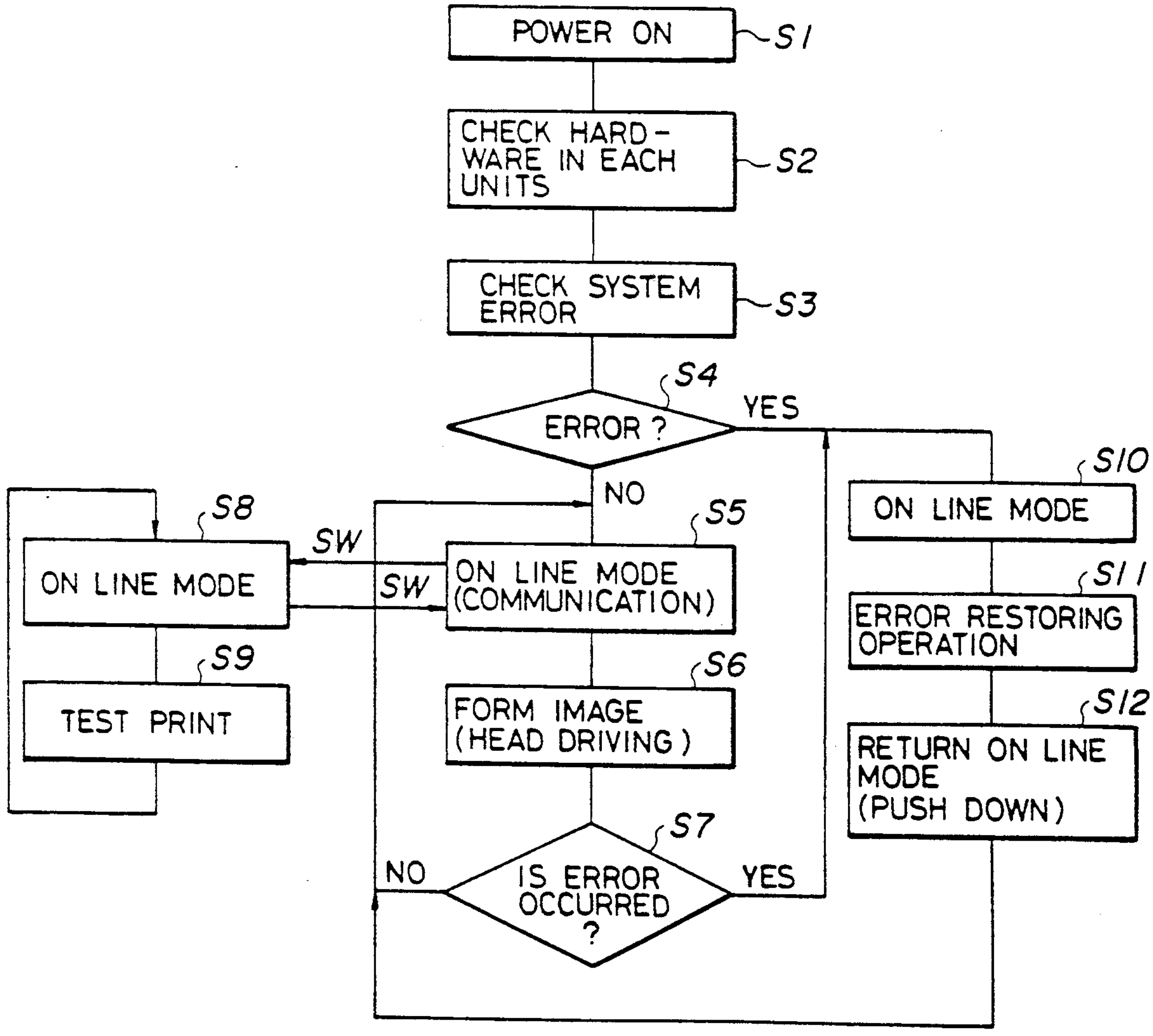
FIGS. 36, 37 and 38 are flow charts showing an example of the operation according to the present invention.

SHEET 35 OF THE DRAWINGS:

In Fig. 36, "UNITS" should read --UNIT-- in S2, and "IS" should read --HAS-- in S7.

SHEET 36 OF THE DRAWINGS:

In Fig. 38, "COMPLITION" should read --COMPLETION--.

SHEET 37 OF THE DRAWINGS:

In Fig. 39, "MGENTA" should read --MAGENTA--.

COLUMN 4:

Line 6, "feed-out" should read --feedout--.

Line 68, "following" should read --following Table 1.--.

COLUMN 6:

Line 12, "follows" should be deleted.

UNITED STATES PATENT AND TRADEMARK OFFICE

CERTIFICATE OF CORRECTION

PATENT NO. : 5,012,260
Page 2 of 6
DATED : April 30, 1991
INVENTOR(S) : Shigeru Yoshimura, et al.

It is certified that error appears in the above-identified patent and that said Letters Patent is hereby corrected as shown below:

COLUMN 7:

Line 48, "BUSY" should read --* BUSY--.

Line 49, "Paper" should read --* Paper--.

Line 50, "Head" should read --* Head--.

Line 51, "Error" should read --* Error--.

Line 59, "It" should read --* It--.

Line 60, "It" should read --* It--.

Line 61, "The" should read --* The--.

Line 62, "Paper" should read --* Paper--.

Line 65, "The" should read --* The--.

Line 67, "The" should read --* The--.

Line 68, "rollers 330" should read --roller 330--.

COLUMN 8:

Line 1, "The" should read --* The--.

Line 4, "The" should read --* The--.

UNITED STATES PATENT AND TRADEMARK OFFICE

CERTIFICATE OF CORRECTION

PATENT NO. : 5,012,260

Page 3 of 6

DATED : April 30, 1991

INVENTOR(S) : Shigeru Yoshimura, et al.

It is certified that error appears in the above-identified patent and that said Letters Patent is hereby corrected as shown below:

COLUMN 8:

Line 6, "An" should read --* An--.

Line 9, "The" should read --* The--.

Line 10, "It" should read --* It--.

Line 19, "follows" should be deleted.

COLUMN 9:

Line 52, "It" should read --* It--.

Line 53, "The" should read --* The--.

Line 56, "The" should read --* The--.

Line 57, "The" should read --* The--.

Line 58, "It" should read --* It--.

Line 63, "The" should read --* The--.

Line 64, "The" should read --* The--.

Line 68, "The" should read --* The--.

UNITED STATES PATENT AND TRADEMARK OFFICE
CERTIFICATE OF CORRECTION

PATENT NO. : 5,012,260 Page 4 of 6

DATED : April 30, 1991

INVENTOR(S) : Shigeru Yoshimura, et al.

It is certified that error appears in the above-identified patent and that said Letters Patent is hereby corrected as shown below:

COLUMN 10:

Line 1, "A" should read --* A--.

Line 4, "The" should read --* The--.

Line 8, "The" should read --* The--.

COLUMN 12:

Line 1, "counter-clockwise" should read --counterclockwise--.

Line 68, "530" should read --350--.

COLUMN 19:

Line 39, "(step S8" should read --(steps S8--.

COLUMN 20:

Line 52, "include" should be deleted.

UNITED STATES PATENT AND TRADEMARK OFFICE
CERTIFICATE OF CORRECTION

PATENT NO. : 5,012,260
DATED : April 30, 1991
INVENTOR(S) : Shigeru Yoshimura, et al.

It is certified that error appears in the above-identified patent and that said Letters Patent is hereby corrected as shown below:

COLUMN 21:

Line 5, insert before Table 9: --The meanings of symbols are described in the following Table 9.--.

COLUMN 25:

Line 30, "folloting" should read --following--.

Line 58, "The" should read --* The--.

COLUMN 26:

Line 47, "No" should read --* No--.

Line 48, "OFF" should read --* OFF--.

Line 49, "BUSY" should read --* BUSY--.

Line 50, "Head" should read --* Head--.

Line 51, "Paper" should read --* Paper--.

UNITED STATES PATENT AND TRADEMARK OFFICE

CERTIFICATE OF CORRECTION

PATENT NO. : 5,012,260 Page 6 of 6

DATED : April 30, 1991

INVENTOR(S) : Shigeru Yoshimura, et al.

It is certified that error appears in the above-identified patent and that said Letters Patent is hereby corrected as shown below:

COLUMN 28:

Line 63, "Specified" should read --* Specified--.

Line 66, "While" should read --* While--.

Signed and Sealed this

Fourteenth Day of June, 1994

Attest:

Bruce Lehman

BRUCE LEHMAN

Attesting Officer

Commissioner of Patents and Trademarks